US012717512B2

(12) United States Patent
Resch et al.

(10) Patent No.: US 12,717,512 B2
(45) **Date of Patent: *Aug. 25, 2026**

(54) WRITE REQUEST FULFILLMENT IN A STORAGE NETWORK

(71) Applicant: Pure Storage, Inc., Santa Clara, CA (US)

(72) Inventors: Jason K. Resch, Warwick, RI (US); Andrew D. Baptist, Mt. Pleasant, WI (US); Niall J. McShane, Arlington Heights, IL (US); Greg R. Dhuse, Chicago, IL (US); Thomas F. Shirley, Jr., Oconomowoc, WI (US); Gregory Palinckx, Cherry Hills Village, CO (US); Russell P. Kennedy, Broomfield, CO (US); S. Christopher Gladwin, Chicago, IL (US); Robert C. McCammon, Downer Grove, IL (US); James Sherer, Lake Zurich, IL (US)

(73) Assignee: Everpure, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/008,046

(22) Filed: Jan. 2, 2025

(65) Prior Publication Data

US 2025/0138747 A1 May 1, 2025

Related U.S. Application Data

(63) Continuation of application No. 17/818,067, filed on Aug. 8, 2022, now Pat. No. 12,197,768, which is a (Continued)

(51) Int. Cl.

| | |
|---|---|
| ***G06F 7/00*** | (2006.01) |
| ***G06F 3/06*** | (2006.01) |
| ***G06F 17/00*** | (2019.01) |

(52) U.S. Cl.

CPC .......... *G06F 3/0655* (2013.01); *G06F 3/0604* (2013.01); *G06F 3/067* (2013.01)

(58) Field of Classification Search

None

See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Tuan A Pham

(74) *Attorney, Agent, or Firm* — Katz Ruby & Carle LLP; Bruce E. Stuckman

(57) ABSTRACT

A processing system of a storage network operates by receiving a write request associated with a data object; identifying dispersed storage error encoding parameters; and determining a number of available storage units. When the number of available storage units is determined to exceed a first number, the processing system operates by: determining a first write threshold number in accordance with the dispersed storage error encoding parameters; dispersed error encoding the data object to produce a first write threshold number of encoded data slices; and writing, to available storage units, the first write threshold number of encoded data slices. When the number of available storage units is determined to not exceed the first number, the processing system operates by: determining a second write threshold number in accordance with the dispersed storage error encoding parameters associated, wherein the second write threshold number is less than the first write threshold number; dispersed error encoding the data object to produce (Continued)

a second write threshold number of encoded data slices; and writing, to the available storage units, the second write threshold number of encoded data slices.

16 Claims, 54 Drawing Sheets

Related U.S. Application Data continuation-in-part of application No. 16/547,921, filed on Aug. 22, 2019, now Pat. No. 11,442,921, which is a continuation-in-part of application No. 15/978,596, filed on May 14, 2018, now Pat. No. 10,402,395, which is a continuation-in-part of application No. 14/794,723, filed on Jul. 8, 2015, now Pat. No. 10,049,120.

(60) Provisional application No. 62/046,444, filed on Sep. 5, 2014.

(56) References Cited

U.S. PATENT DOCUMENTS 5,485,474 A 1/1996 Rabin
5,774,643 A 6/1998 Lubbers
5,802,364 A 9/1998 Senator
5,809,285 A 9/1998 Hilland
5,890,156 A 3/1999 Rekieta
5,987,622 A 11/1999 Lo Verso
5,991,414 A 11/1999 Garay
6,012,159 A 1/2000 Fischer
6,058,454 A 5/2000 Gerlach
6,128,277 A 10/2000 Bruck
6,175,571 B1 1/2001 Haddock
6,192,472 B1 2/2001 Garay
6,256,688 B1 7/2001 Suetaka
6,272,658 B1 8/2001 Steele
6,301,604 B1 10/2001 Nojima
6,356,949 B1 3/2002 Katsandres
6,366,995 B1 4/2002 Vilkov
6,374,336 B1 4/2002 Peters
6,415,373 B1 7/2002 Peters
6,418,539 B1 7/2002 Walker
6,449,688 B1 9/2002 Peters
6,567,948 B2 5/2003 Steele
6,571,282 B1 5/2003 Bowman-Amuah
6,609,223 B1 8/2003 Wolfgang
6,718,361 B1 4/2004 Basani
6,760,808 B2 7/2004 Peters
6,785,768 B2 8/2004 Peters
6,785,783 B2 8/2004 Buckland
6,826,711 B2 11/2004 Moulton
6,879,596 B1 4/2005 Dooply
7,003,688 B1 2/2006 Pittelkow
7,024,451 B2 4/2006 Jorgenson
7,024,609 B2 4/2006 Wolfgang
7,080,101 B1 7/2006 Watson
7,103,824 B2 9/2006 Halford
7,103,915 B2 9/2006 Redlich
7,111,115 B2 9/2006 Peters
7,140,044 B2 11/2006 Redlich
7,146,644 B2 12/2006 Redlich
7,171,493 B2 1/2007 Shu
7,222,133 B1 5/2007 Raipurkar
7,240,236 B2 7/2007 Cutts
7,272,613 B2 9/2007 Sim
7,636,724 B2 12/2009 De La Torre
2002/0062422 A1 5/2002 Butterworth
2002/0166079 A1 11/2002 Ulrich
2003/0018927 A1 1/2003 Gadir
2003/0037261 A1 2/2003 Meffert
2003/0065617 A1 4/2003 Watkins
2003/0084020 A1 5/2003 Shu
2004/0024963 A1 2/2004 Talagala
2004/0122917 A1 6/2004 Menon
2004/0215998 A1 10/2004 Buxton
2004/0228493 A1 11/2004 Ma
2005/0100022 A1 5/2005 Ramprashad
2005/0114594 A1 5/2005 Corbett
2005/0125593 A1 6/2005 Karpoff
2005/0131993 A1 6/2005 Fatula, Jr.
2005/0132070 A1 6/2005 Redlich
2005/0144382 A1 6/2005 Schmisseur
2005/0229069 A1 10/2005 Hassner
2006/0047907 A1 3/2006 Shiga
2006/0136448 A1 6/2006 Cialini
2006/0156059 A1 7/2006 Kitamura
2006/0224603 A1 10/2006 Correll, Jr.
2007/0079081 A1 4/2007 Gladwin
2007/0079082 A1 4/2007 Gladwin
2007/0079083 A1 4/2007 Gladwin
2007/0088970 A1 4/2007 Buxton
2007/0174192 A1 7/2007 Gladwin
2007/0214285 A1 9/2007 Au
2007/0234110 A1 10/2007 Soran
2007/0283167 A1 12/2007 Venters, III
2009/0094251 A1 4/2009 Gladwin
2009/0094318 A1 4/2009 Gladwin
2010/0023524 A1 1/2010 Gladwin
2011/0055170 A1 3/2011 Mark
2011/0286594 A1 11/2011 Resch
2011/0289283 A1 11/2011 Baptist
2011/0289383 A1* 11/2011 Dhuse .................. H04L 9/0894 714/763
2011/0289577 A1* 11/2011 Resch ................ G06F 11/1092 726/10
2012/0198066 A1* 8/2012 Grube .................... H04L 9/085 709/225
2012/0226933 A1 9/2012 Baptist
2012/0254692 A1 10/2012 Resch
2012/0291099 A1 11/2012 Grube
2013/0046973 A1 2/2013 Resch

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner distributed computing system 10 data 92 partitioning 164 data partition #1 (chunk set)

data partition #2 data partition #3 data partition #x encoding and grouping function 166

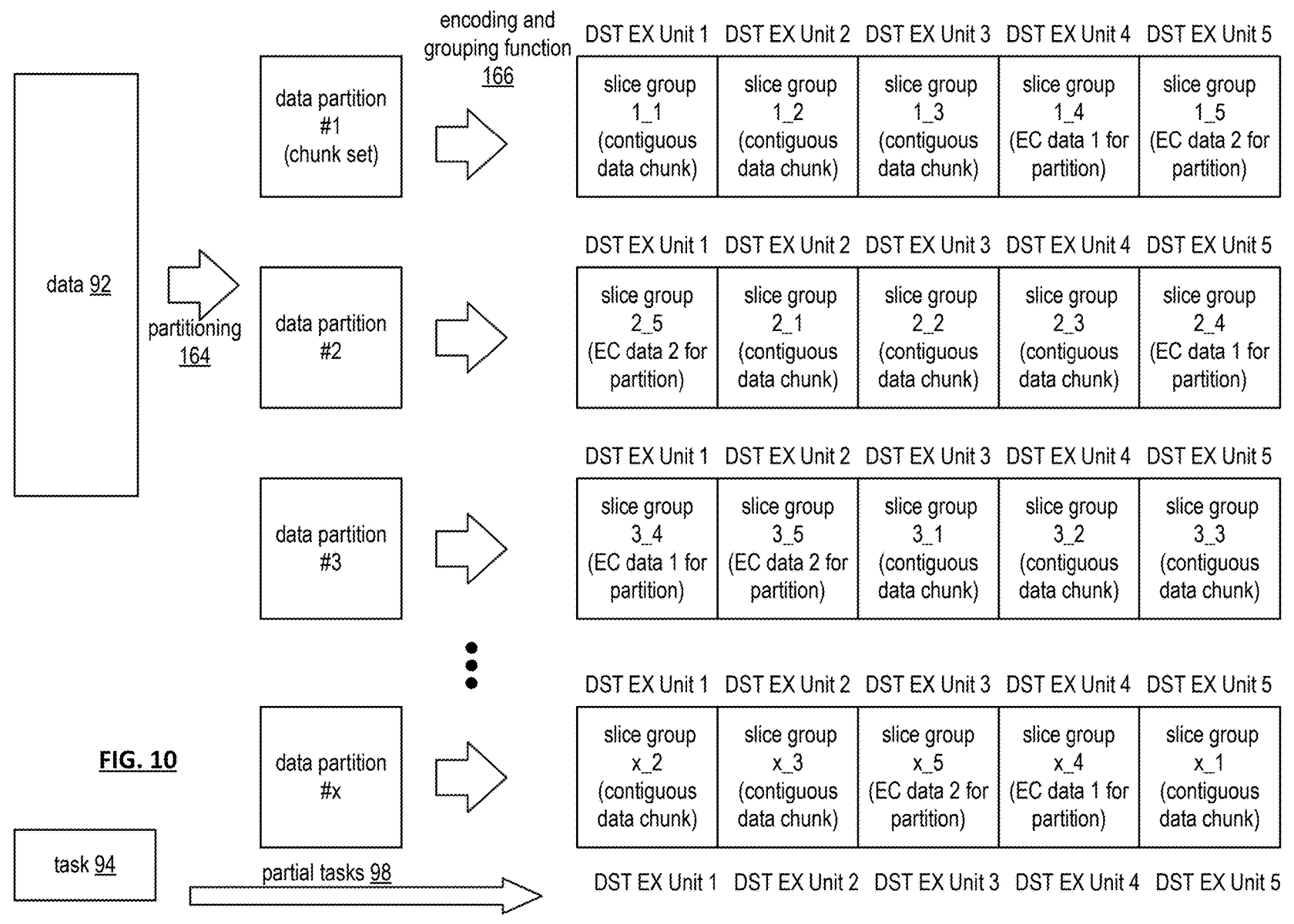

DST EX Unit 1 | DST EX Unit 2 | DST EX Unit 3 | DST EX Unit 4 | DST EX Unit 5
--- | --- | --- | --- | ---
slice group 1_1 (contiguous data chunk) | slice group 1_2 (contiguous data chunk) | slice group 1_3 (contiguous data chunk) | slice group 1_4 (EC data 1 for partition) | slice group 1_5 (EC data 2 for partition)

DST EX Unit 1 | DST EX Unit 2 | DST EX Unit 3 | DST EX Unit 4 | DST EX Unit 5
--- | --- | --- | --- | ---
slice group 2_5 (EC data 2 for partition) | slice group 2_1 (contiguous data chunk) | slice group 2_2 (contiguous data chunk) | slice group 2_3 (contiguous data chunk) | slice group 2_4 (EC data 1 for partition)

DST EX Unit 1 | DST EX Unit 2 | DST EX Unit 3 | DST EX Unit 4 | DST EX Unit 5
--- | --- | --- | --- | ---
slice group 3_4 (EC data 1 for partition) | slice group 3_5 (EC data 2 for partition) | slice group 3_1 (contiguous data chunk) | slice group 3_2 (contiguous data chunk) | slice group 3_3 (contiguous data chunk)

DST EX Unit 1 | DST EX Unit 2 | DST EX Unit 3 | DST EX Unit 4 | DST EX Unit 5
--- | --- | --- | --- | ---
slice group x_2 (contiguous data chunk) | slice group x_3 (contiguous data chunk) | slice group x_5 (EC data 2 for partition) | slice group x_4 (EC data 1 for partition) | slice group x_1 (contiguous data chunk)

DST EX Unit 1 DST EX Unit 2 DST EX Unit 3 DST EX Unit 4 DST EX Unit 5 task 94 partial tasks 98

FIG. 10

Figure 19:
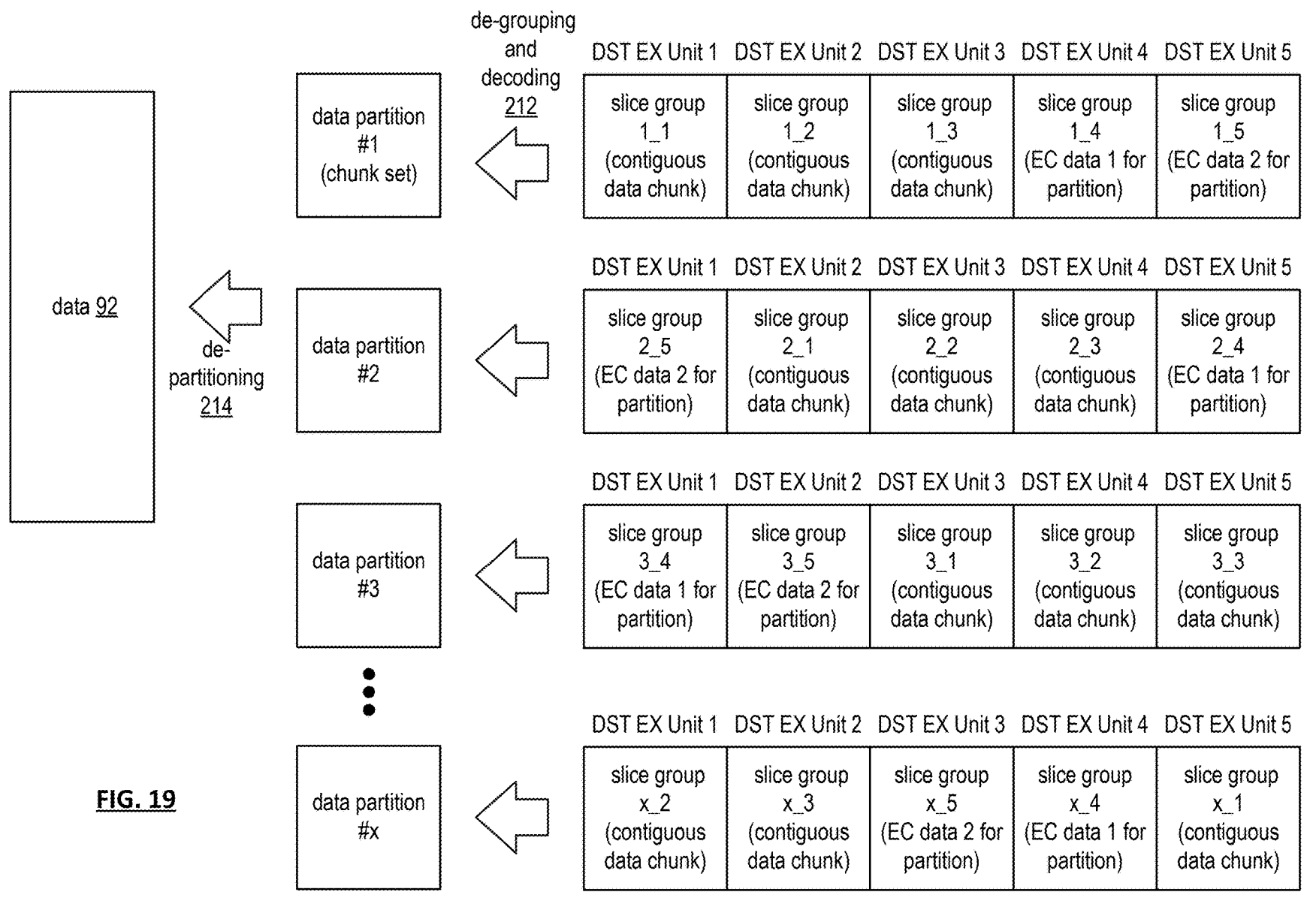

| DST EX Unit 1 | DST EX Unit 2 | DST EX Unit 3 | DST EX Unit 4 | DST EX Unit 5 |
|---|---|---|---|---|
| slice group 1_1 (contiguous data chunk) | slice group 1_2 (contiguous data chunk) | slice group 1_3 (contiguous data chunk) | slice group 1_4 (EC data 1 for partition) | slice group 1_5 (EC data 2 for partition) |
| slice group 2_5 (EC data 2 for partition) | slice group 2_1 (contiguous data chunk) | slice group 2_2 (contiguous data chunk) | slice group 2_3 (contiguous data chunk) | slice group 2_4 (EC data 1 for partition) |
| slice group 3_4 (EC data 1 for partition) | slice group 3_5 (EC data 2 for partition) | slice group 3_1 (contiguous data chunk) | slice group 3_2 (contiguous data chunk) | slice group 3_3 (contiguous data chunk) |
| slice group x_2 (contiguous data chunk) | slice group x_3 (contiguous data chunk) | slice group x_5 (EC data 2 for partition) | slice group x_4 (EC data 1 for partition) | slice group x_1 (contiguous data chunk) |

de-grouping and decoding 212 data partition #1 (chunk set)

data partition #2 data partition #3

••• data partition #x de-partitioning 214 data 92

FIG. 19 data 92
segment processing 142
data segments 152
control 160
segment security processing 144
control 160
control module 116
control 160
error encoding 146
control 160
slicing 148
control 160
per slice security processing 150
encoded slices per data segment 218
dispersed error encoding 112 data 92 encoding, slicing & pillar grouping 224

| DST EX Unit 1 | DST EX Unit 2 | DST EX Unit 3 | DST EX Unit 4 | DST EX Unit 5 |
|---|---|---|---|---|
| pillar 1 slice of seg 1 | pillar 2 slice of seg 1 | pillar 3 slice of seg 1 | pillar 4 slice of seg 1 | pillar 5 slice of seg 1 |
| pillar 1 slice of seg 2 | pillar 2 slice of seg 2 | pillar 3 slice of seg 2 | pillar 4 slice of seg 2 | pillar 5 slice of seg 2 |
| pillar 1 slice of seg 3 | pillar 2 slice of seg 3 | pillar 3 slice of seg 3 | pillar 4 slice of seg 3 | pillar 5 slice of seg 3 |
| ••• | | | | |
| pillar 1 slice of seg x | pillar 2 slice of seg x | pillar 3 slice of seg x | pillar 4 slice of seg x | pillar 5 slice of seg x |

FIG. 23

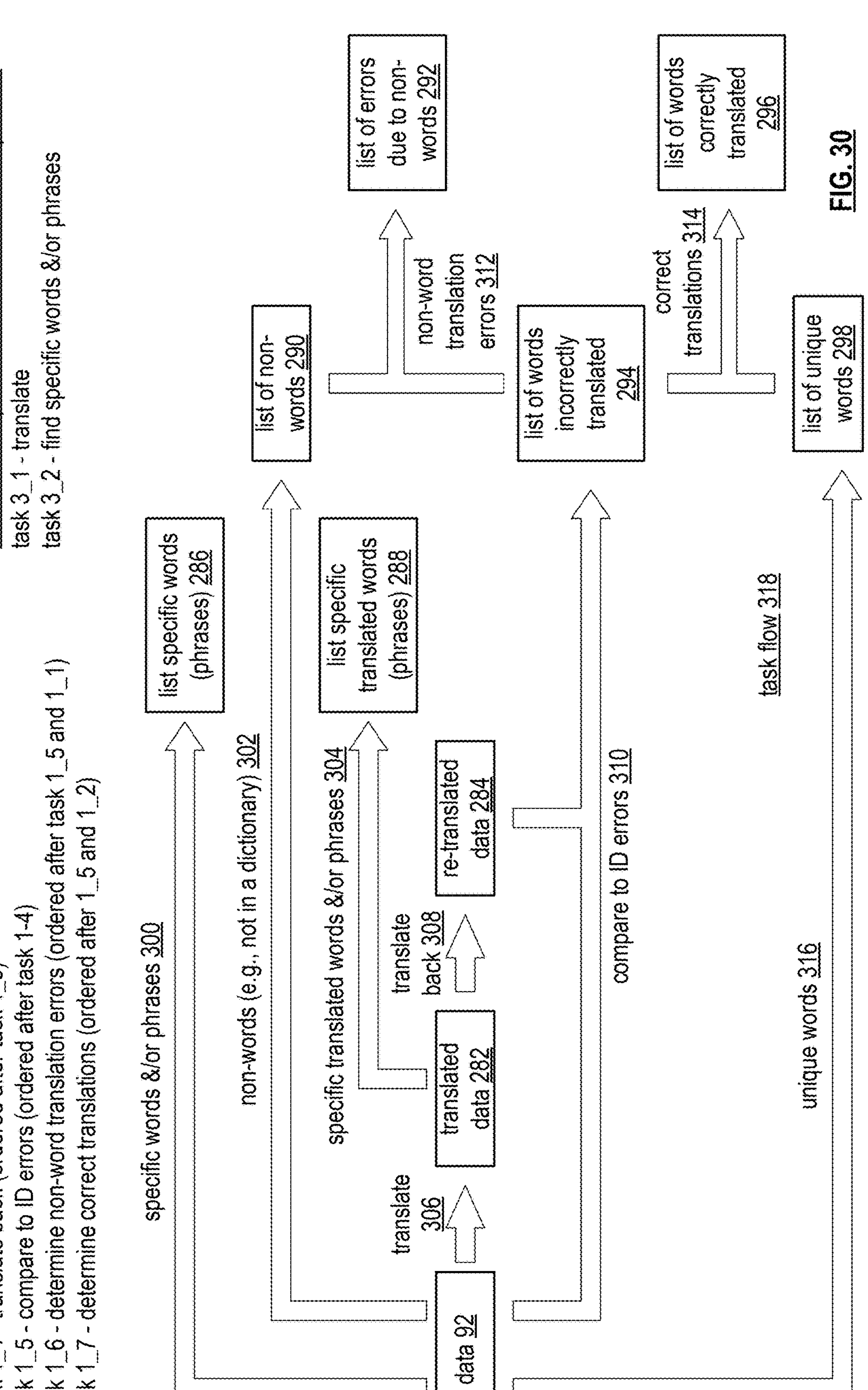
Task 1 - translation analysis task 1_1 - identify non-words (non-ordered)
task 1_2 - identify unique words (non-ordered)
task 1_3 - translate (non-ordered)
task 1_4 - translate back (ordered after task 1_3)
task 1_5 - compare to ID errors (ordered after task 1-4)
task 1_6 - determine non-word translation errors (ordered after task 1_5 and 1_1)
task 1_7 - determine correct translations (ordered after 1_5 and 1_2)
Task 2 - find specific words &/or phrases
Task 3 - find specific translated words &/or phrases
task 3_1 - translate
task 3_2 - find specific words &/or phrases
specific words &/or phrases 300
list specific words (phrases) 286
non-words (e.g., not in a dictionary) 302
list of non-words 290
specific translated words &/or phrases 304
list specific translated words (phrases) 288
translate 306
translated data 282
translate back 308
re-translated data 284
compare to ID errors 310
list of words incorrectly translated 294
non-word translation errors 312
list of errors due to non-words 292
correct translations 314
list of words correctly translated 296
unique words 316
list of unique words 298
task flow 318
data 92
FIG. 30

DST allocation info 242 data partition info 320: data ID; No. of partitions; Addr. info for each partition; format conversion indication

| task execution info 322 | | | | intermediate result info 324 | | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

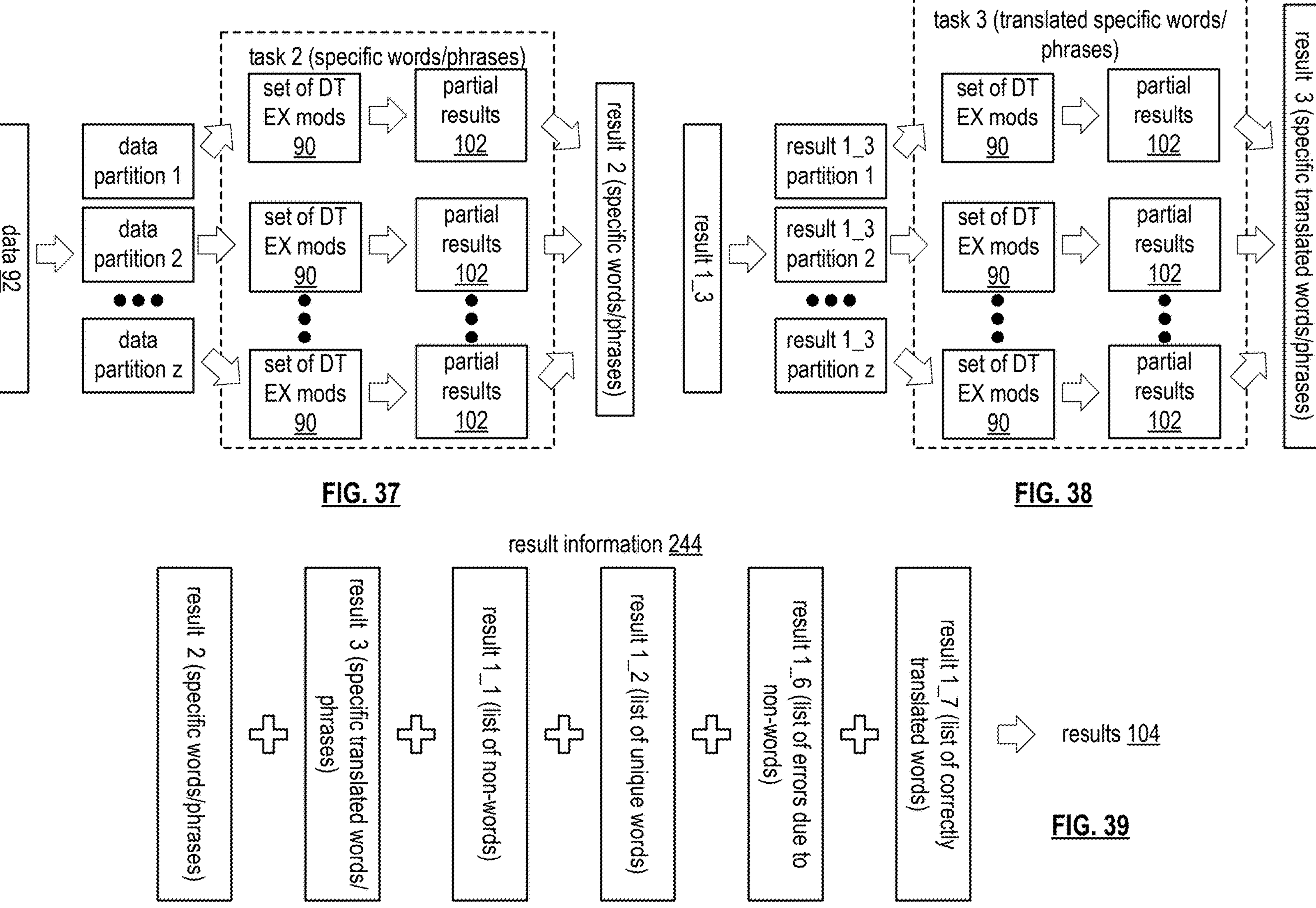

data 92
data partition 1
data partition 2
data partition z
task 2 (specific words/phrases)
set of DT EX mods 90
partial results 102
result 2 (specific words/phrases)
FIG. 37
result 1_3
result 1_3 partition 1
result 1_3 partition 2
result 1_3 partition z
task 3 (translated specific words/ phrases)
result 3 (specific translated words/phrases)
FIG. 38
result information 244
result 2 (specific words/phrases)
result 3 (specific translated words/ phrases)
result 1_1 (list of non-words)
result 1_2 (list of unique words)
result 1_6 (list of errors due to non-words)
result 1_7 (list of correctly translated words)
results 104
FIG. 39

WRITE REQUEST FULFILLMENT IN A STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 17/818,067, entitled "Facilitating Write Requests in a Storage Network", filed Aug. 8, 2022, issued as U.S. Pat. No. 12,197,768 on Jan. 14, 2025, which is a continuation-in-part of U.S. Utility application Ser. No. 16/547,921, entitled "Data Access In A Dispersed Storage Network With Consistency", filed Aug. 22, 2019, issued as U.S. Pat. No. 11,442,921 on Sep. 13, 2022, which is a continuation-in-part of U.S. Utility application Ser. No. 15/978,596, entitled "Facilitating Data Consistency in a Dispersed Storage Network", filed May 14, 2018, issued as U.S. Pat. No. 10,402,395 on Sep. 3, 2019, which is a continuation-in-part of U.S. Utility application Ser. No. 14/794,723, entitled "Consistency Based Access of Data in a Dispersed Storage Network", filed Jul. 8, 2015, issued as U.S. Pat. No. 10,049,120 on Aug. 14, 2018, which claims priority pursuant to 35 U.S.C. § 119 (e) to U.S. Provisional Application No. 62/046,444, entitled "Facilitating Data Consistency in a Dispersed Storage Network", filed Sep. 5, 2014, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE DISCLOSURE

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 10 is a diagram of an example of converting data into slice groups in accordance with the present disclosure;

FIG. 19 is a diagram of an example of converting slice groups into data in accordance with the present disclosure;

FIG. 23 is a diagram of an example of converting data into pillar slice groups for storage in accordance with the present disclosure;

FIG. 30 is a diagram of a specific example of the distributed computing system performing tasks on stored data in accordance with the present disclosure;

FIG. 32 is a diagram of an example of DST allocation information for the example of FIG. 30 in accordance with the present disclosure;

FIGS. 33-38 are schematic block diagrams of the DSTN module performing the example of FIG. 30 in accordance with the present disclosure;

FIG. 39 is a diagram of an example of combining result information into final results for the example of FIG. 30 in accordance with the present disclosure;

DETAILED DESCRIPTION OF THE DISCLOSURE

Figure 1:
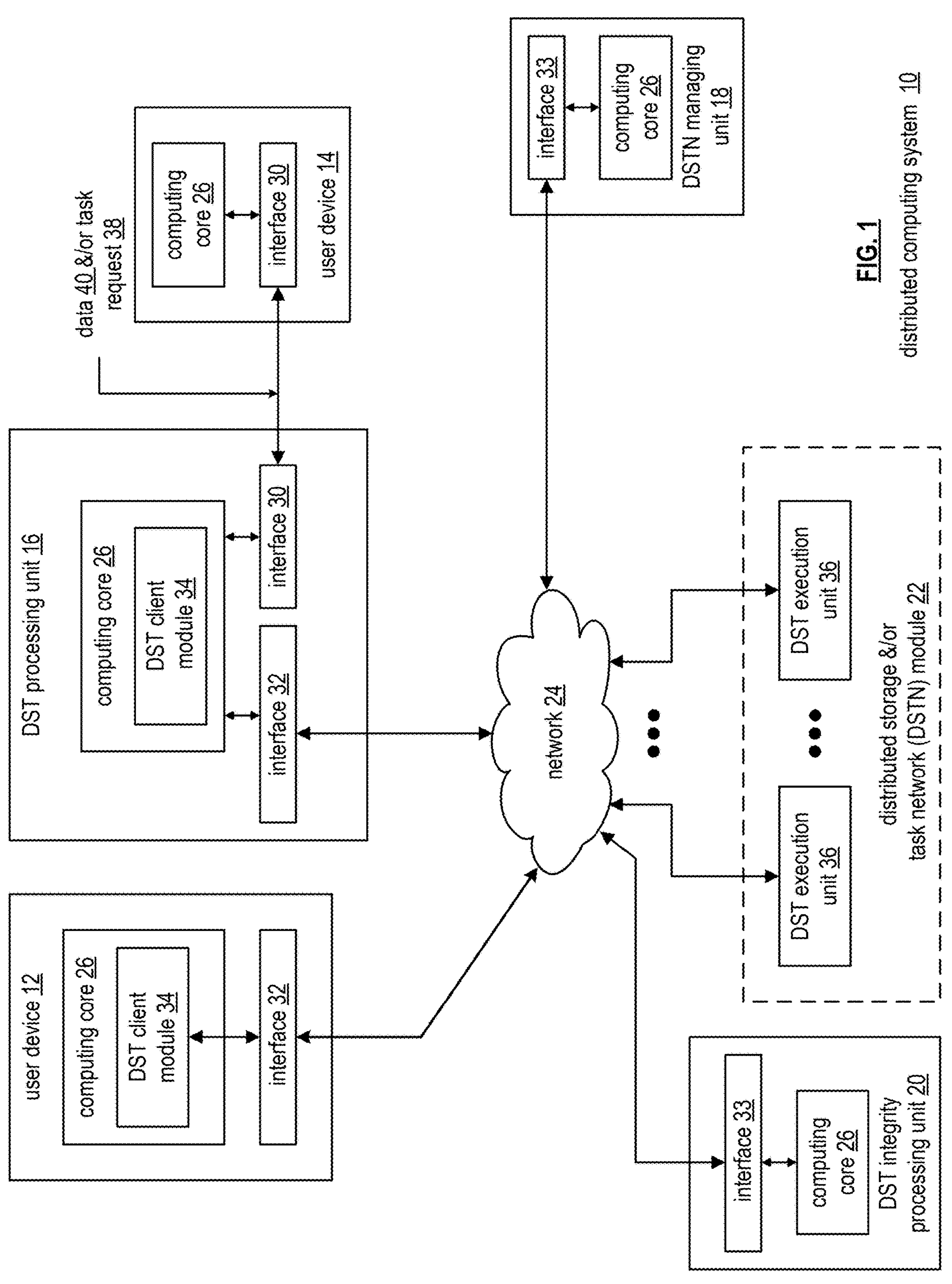
FIG. 1 is a schematic block diagram of an example of a distributed computing system in accordance with the present disclosure.

FIG. 1 is a schematic block diagram of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
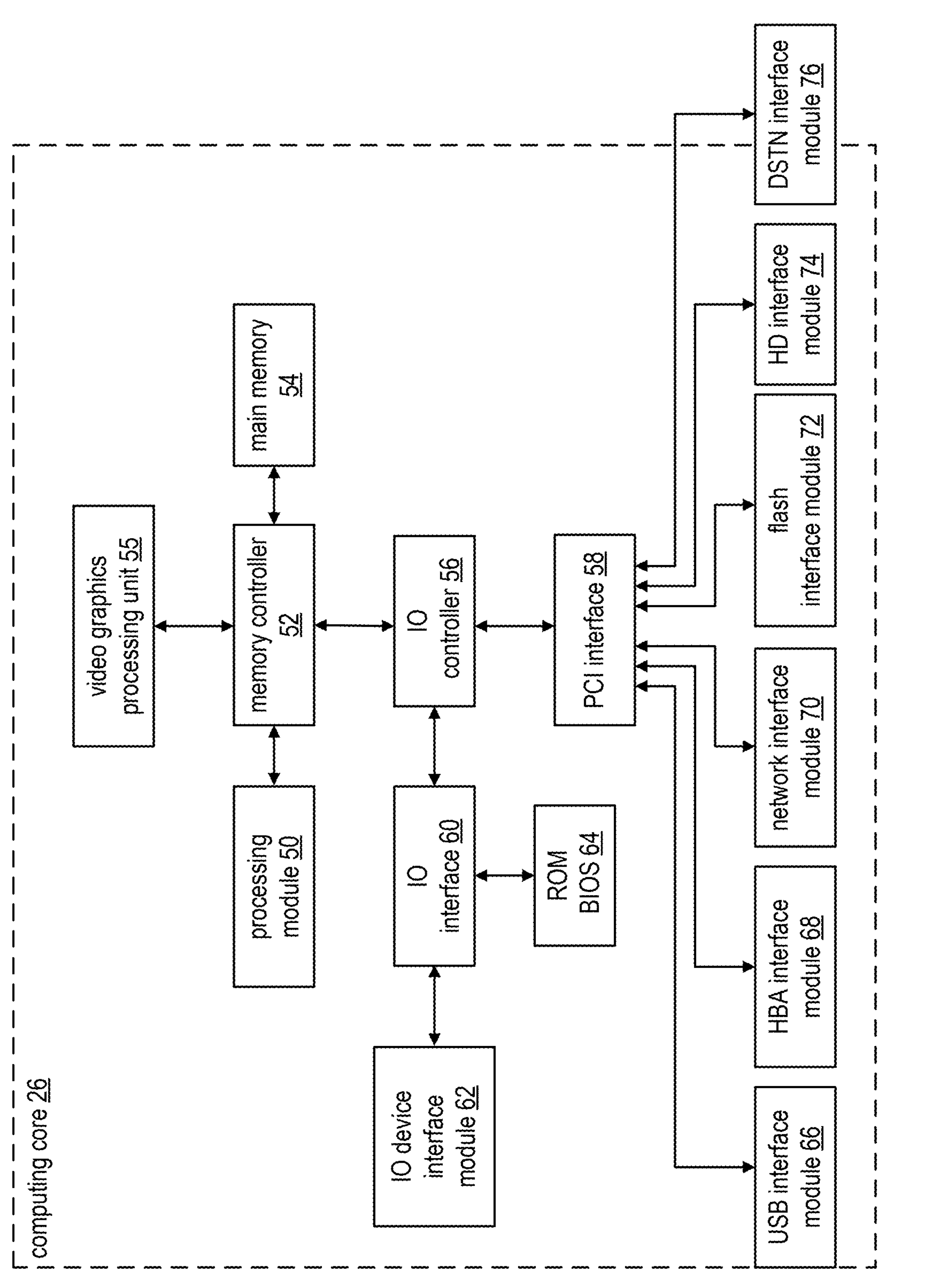
FIG. 2 is a schematic block diagram of an example of a computing core in accordance with the present disclosure.

FIG. 2 is a schematic block diagram of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
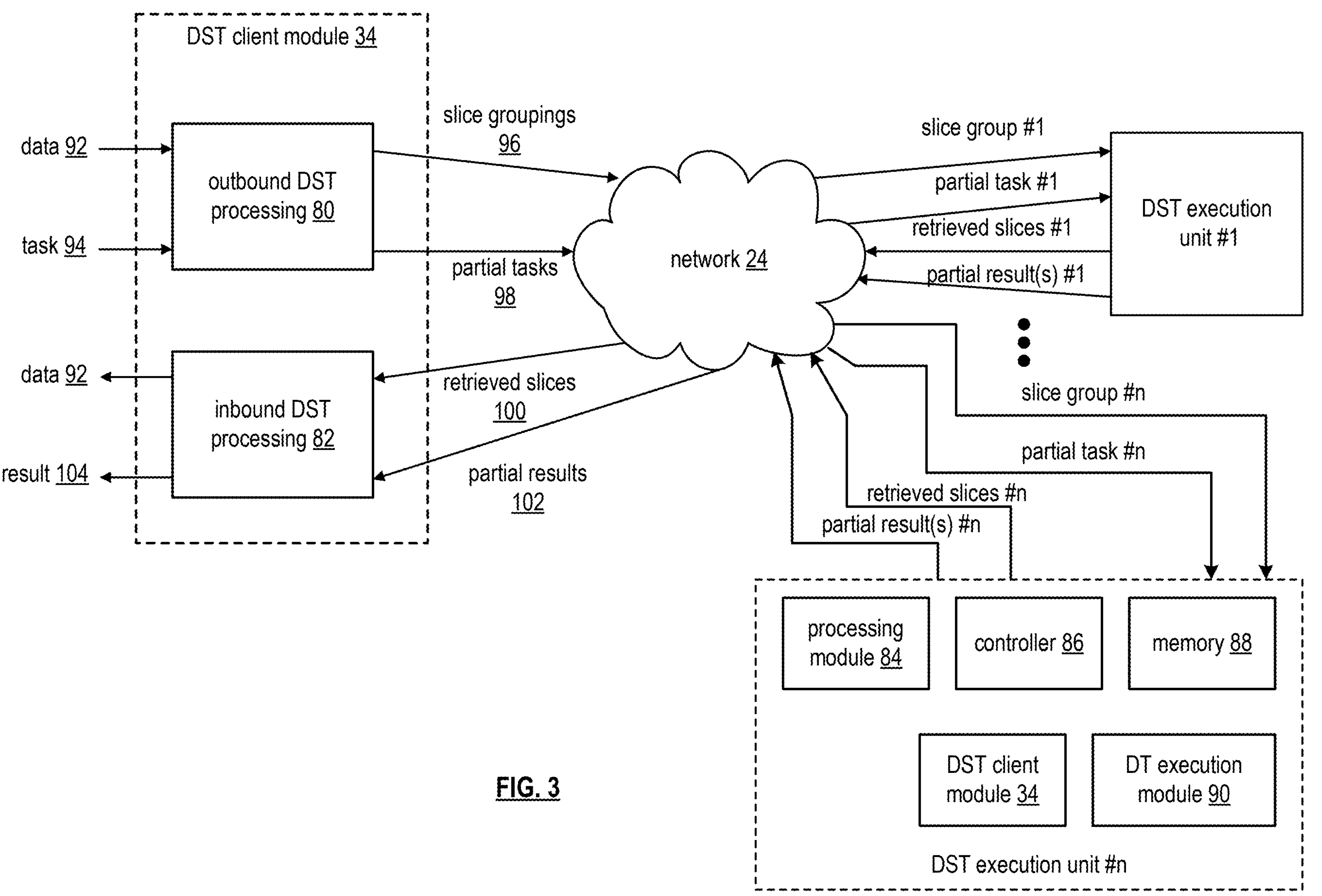
FIG. 3 is a diagram of an example of a distributed storage and task processing in accordance with the present disclosure.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-*n* that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-*n* includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-*n* of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
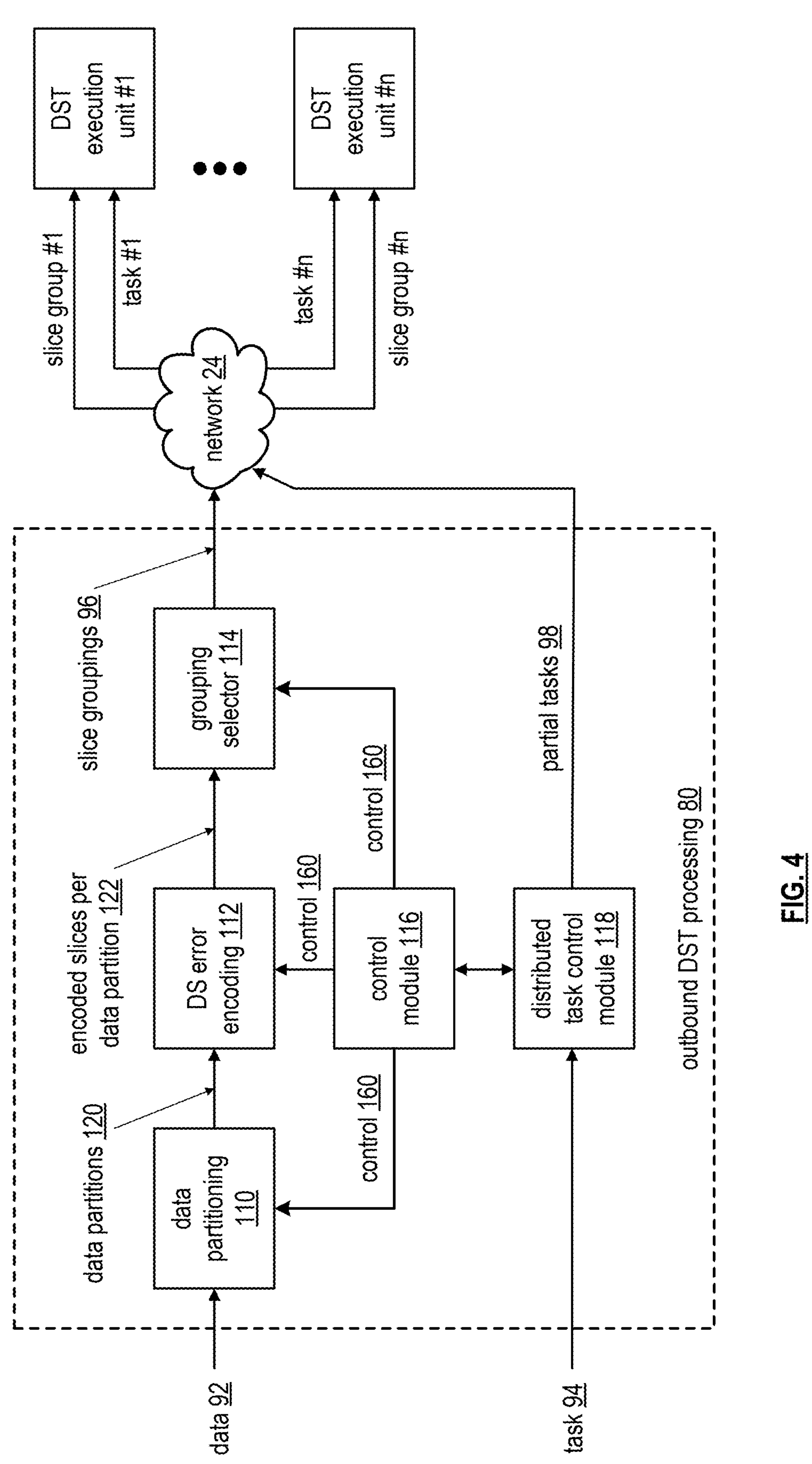
FIG. 4 is a schematic block diagram of an example of an outbound distributed storage and/or task (DST) processing in accordance with the present disclosure.

FIG. 4 is a schematic block diagram of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the group selecting module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
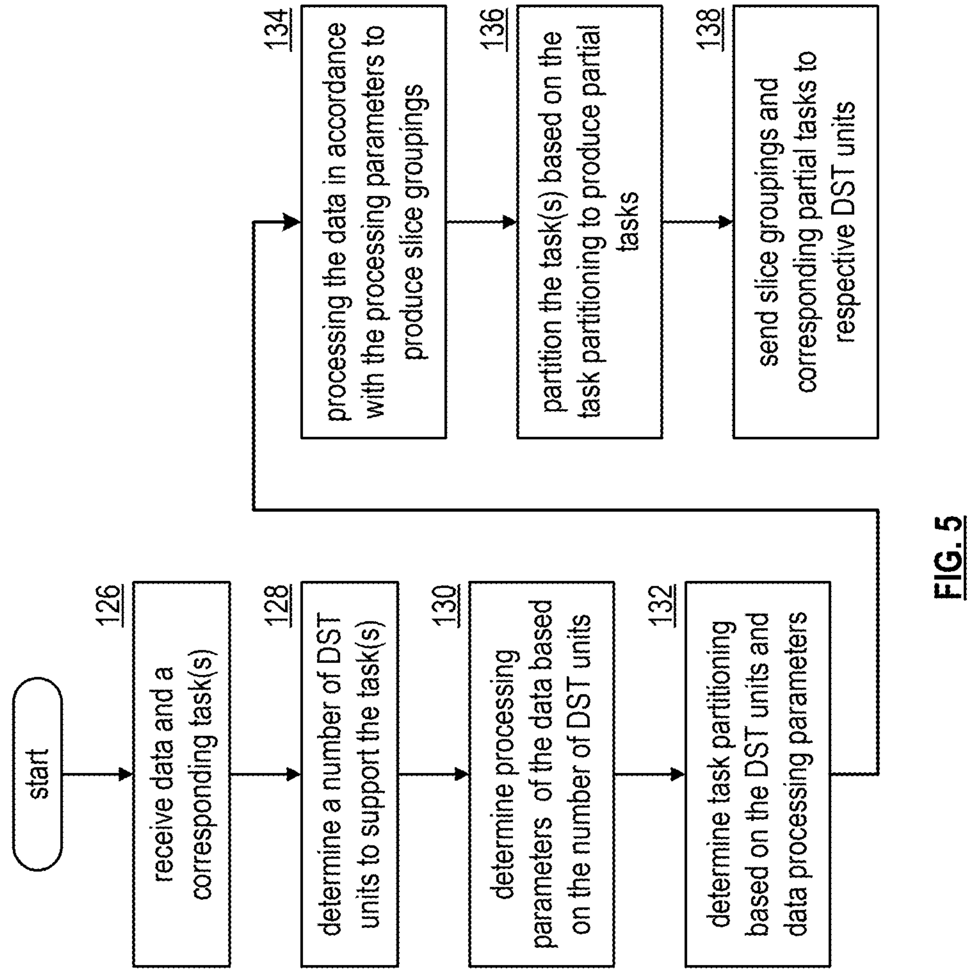
FIG. 5 is a logic diagram of an example of a method for outbound DST processing in accordance with the present disclosure.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
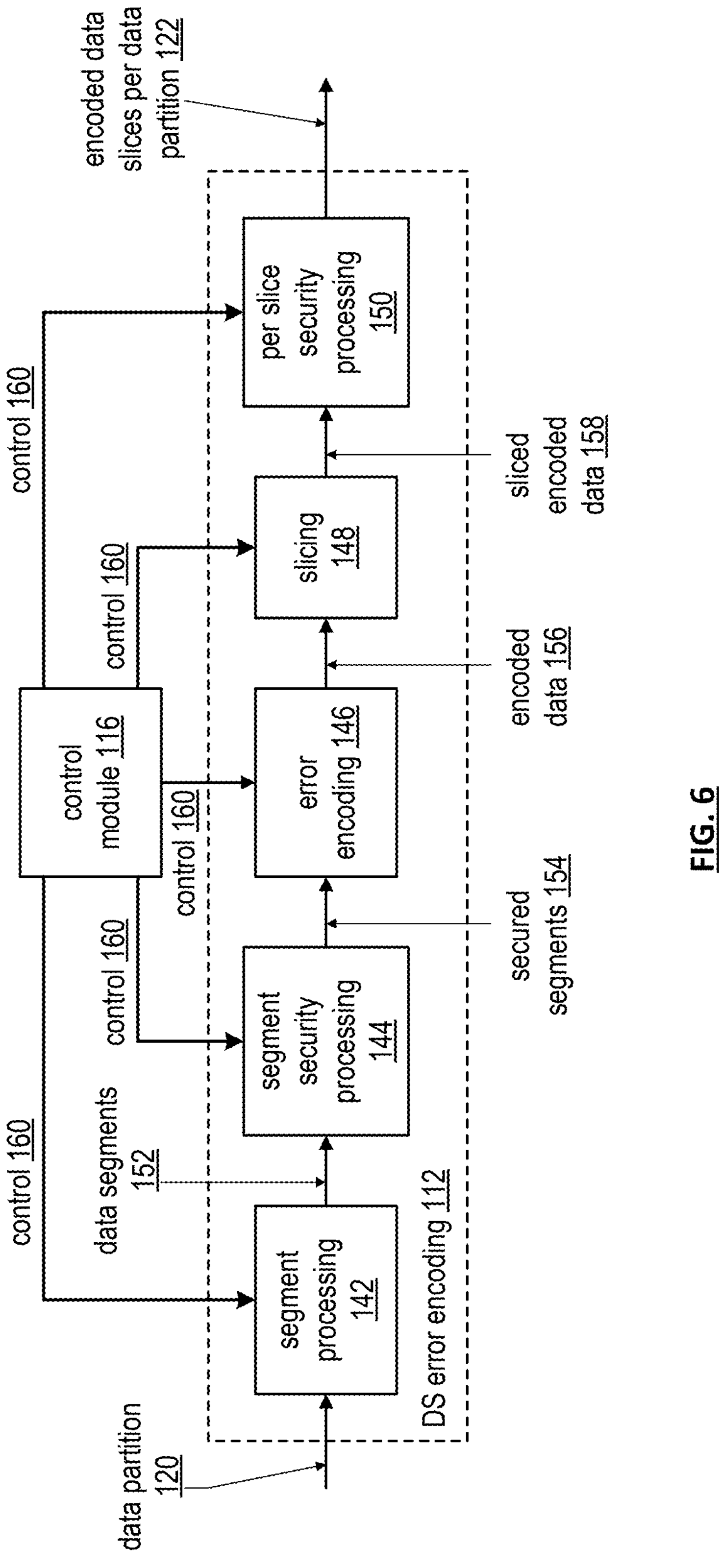
FIG. 6 is a schematic block diagram of an example of a dispersed error encoding in accordance with the present disclosure.

FIG. 6 is a schematic block diagram of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
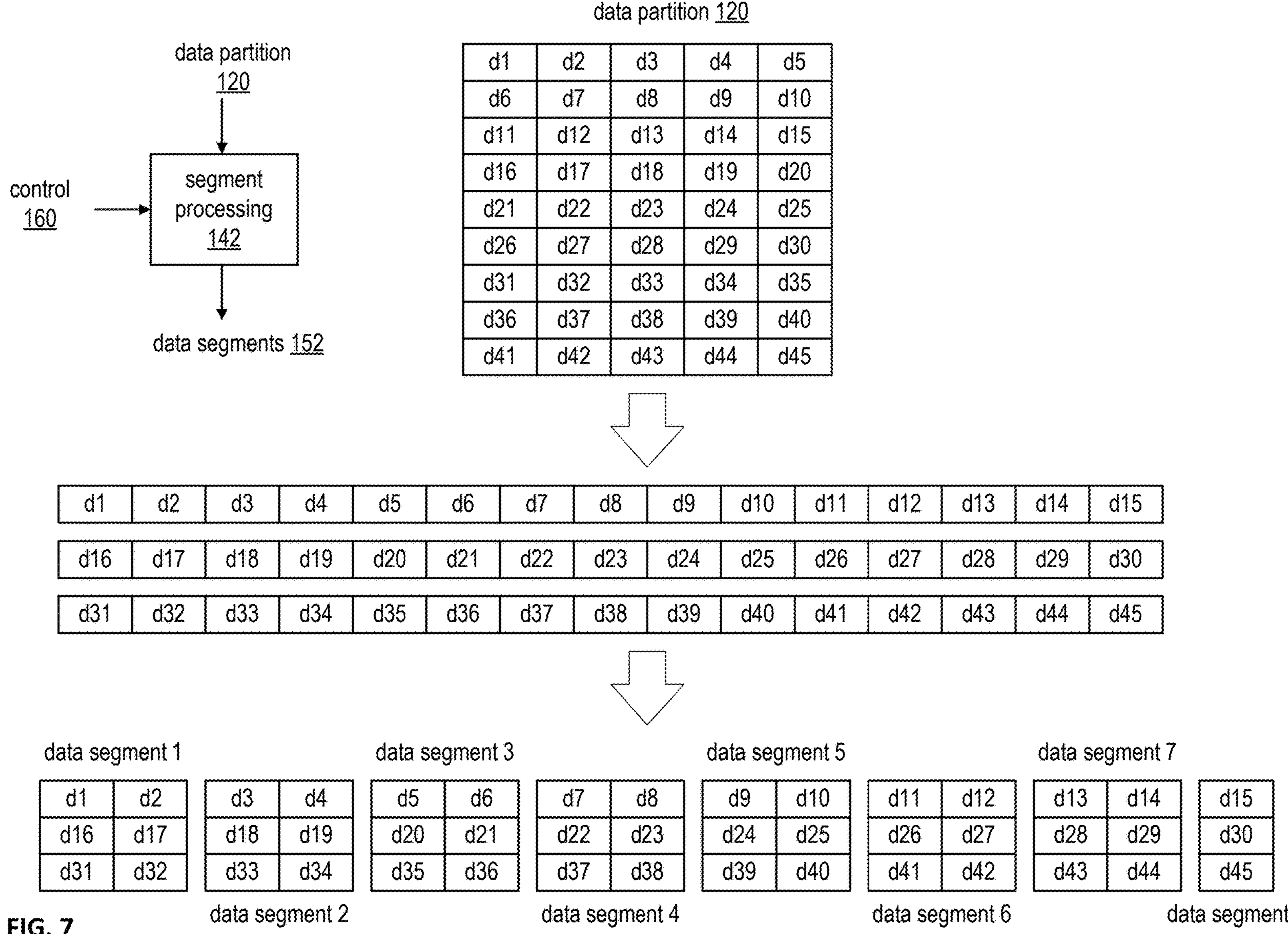
FIG. 7 is a diagram of an example of a segment processing of the dispersed error encoding in accordance with the present disclosure.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
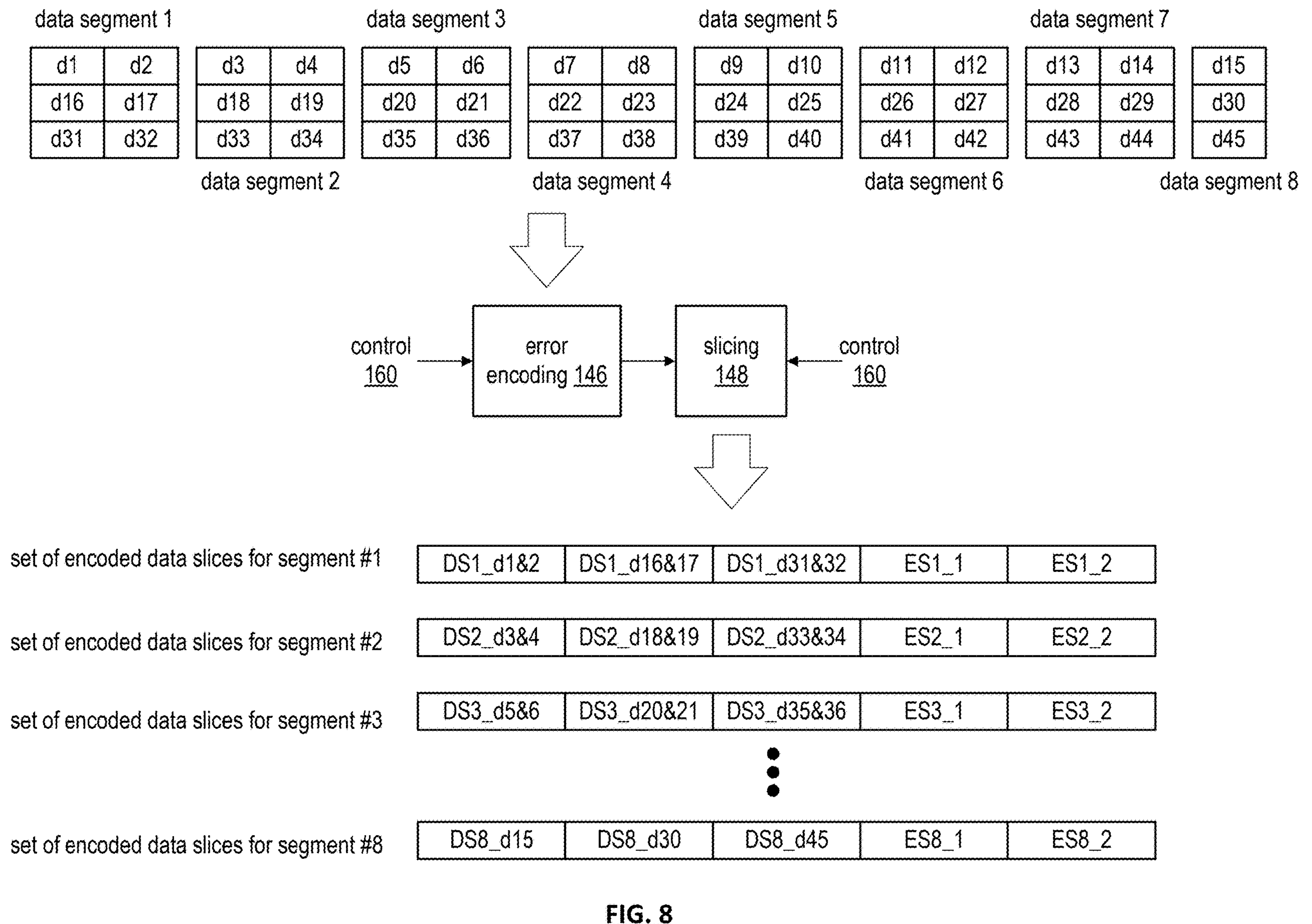
FIG. 8 is a diagram of an example of error encoding and slicing processing of the dispersed error encoding in accordance with the present disclosure.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_*d*1&2) of the first set of encoded data slices (e.g., corresponding to data segment 1) is substantially similar to content of the first word (e.g., d1 & d2); the content of the second encoded data slice (DS1_*d*16&17) of the first set of encoded data slices is substantially similar to content of the second word (e.g., d16 & d17); and the content of the third encoded data slice (DS1_*d*31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_*d*3&4) of the second set of encoded data slices (e.g., corresponding to data segment 2) is substantially similar to content of the first word (e.g., d3 & d4); the content of the second encoded data slice (DS2_*d*18&19) of the second set of encoded data slices is substantially similar to content of the second word (e.g., d18 & d19); and the content of the third encoded data slice (DS2_*d*33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
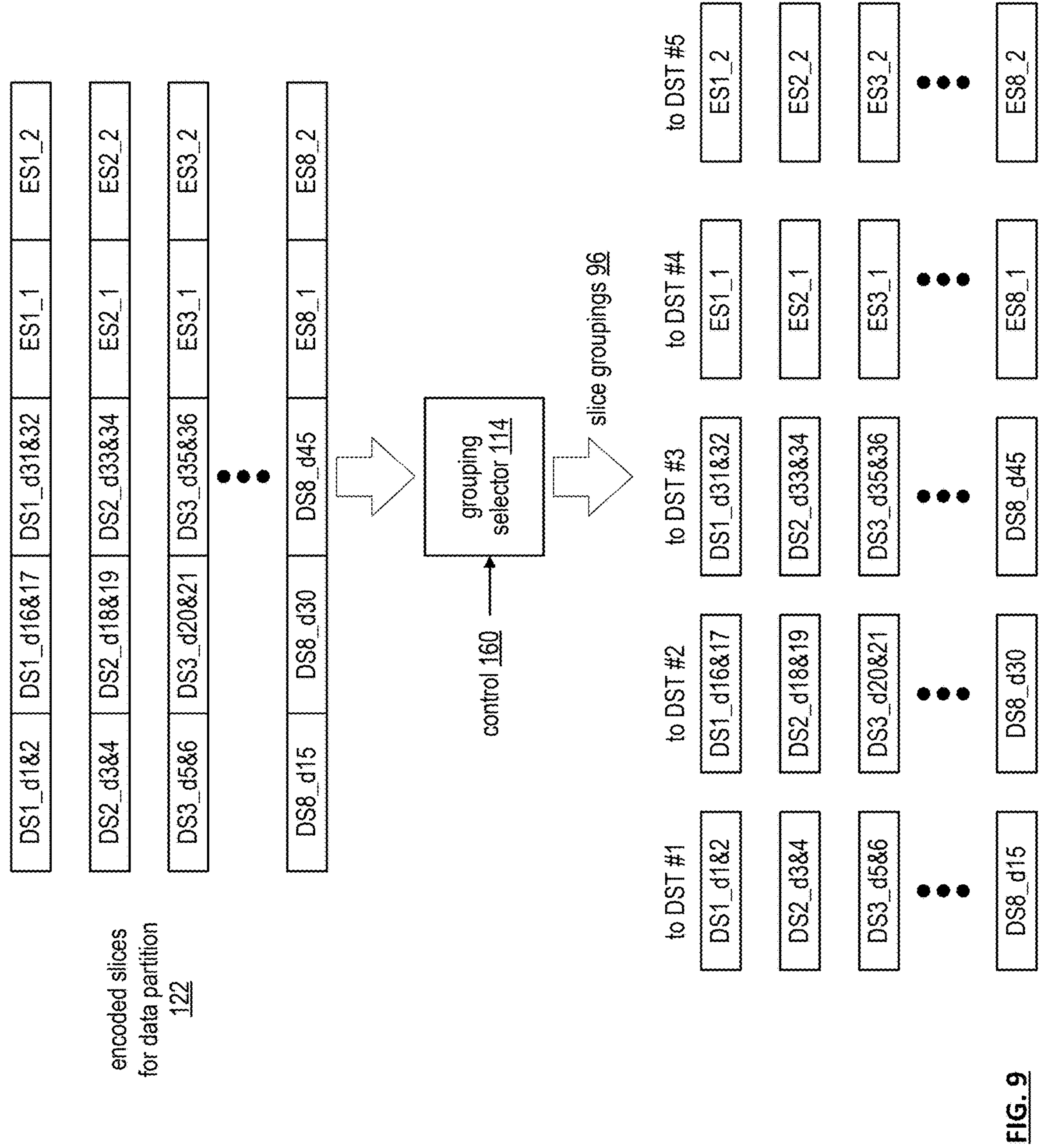
FIG. 9 is a diagram of an example of grouping selection processing of the outbound DST processing in accordance with the present disclosure.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

FIG. 10 is a diagram of an example of converting data 92 into slice groups that expands on the preceding figures. As shown, the data 92 is partitioned in accordance with a partitioning function 164 into a plurality of data partitions (1-*x*, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
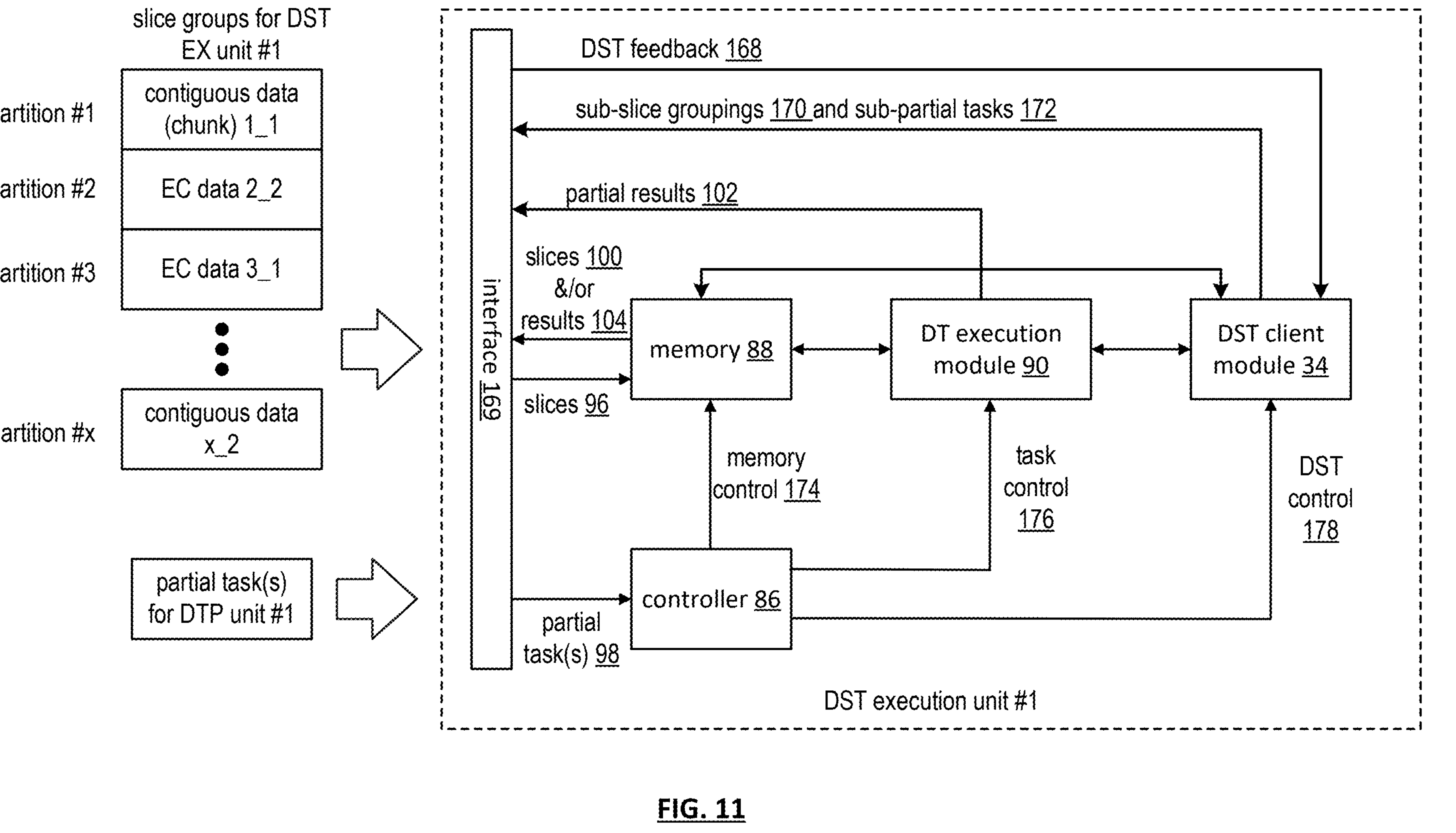
FIG. 11 is a schematic block diagram of an example of a DST execution unit in accordance with the present disclosure.

FIG. 11 is a schematic block diagram of an example of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
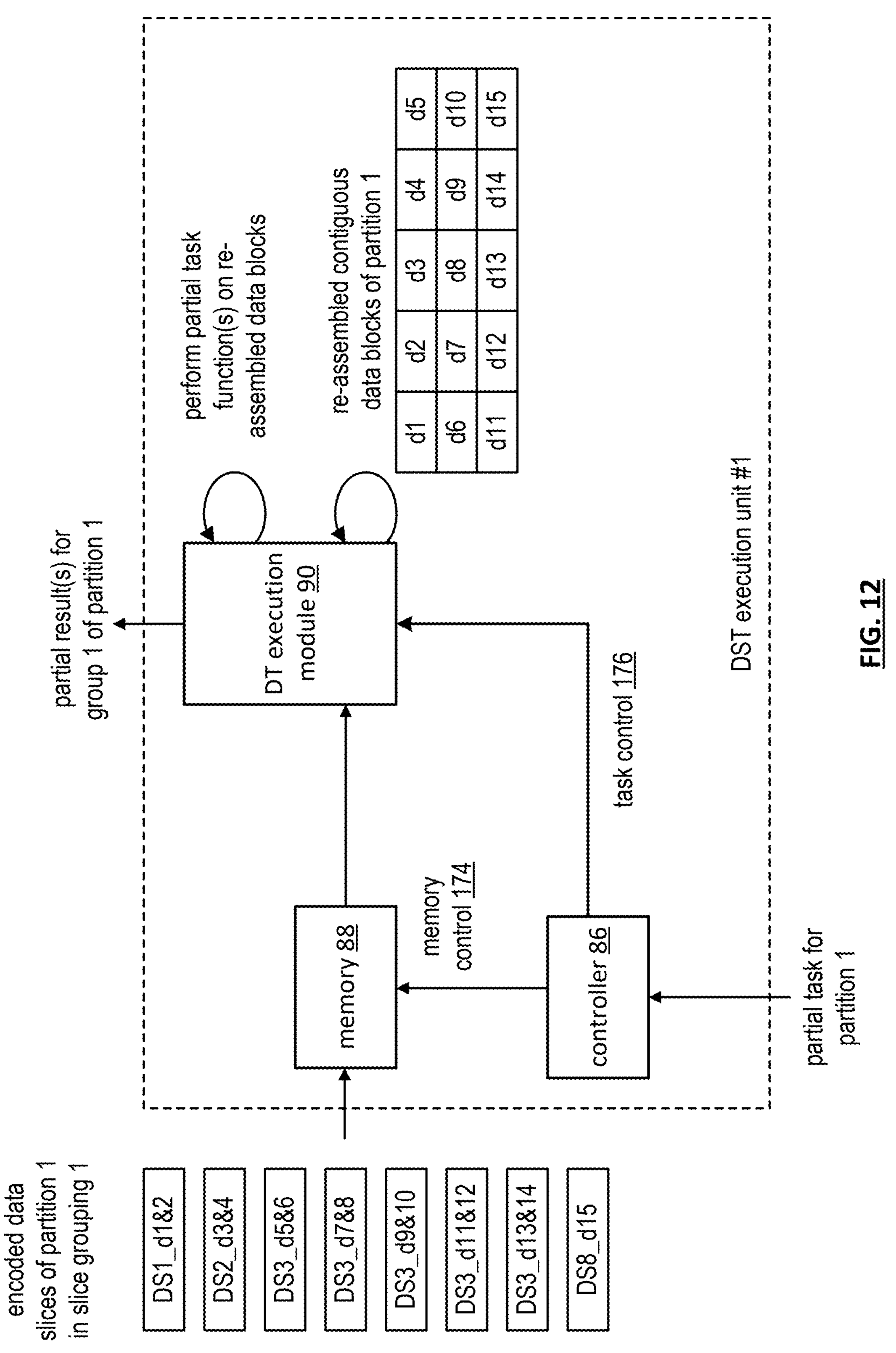
FIG. 12 is a schematic block diagram of an example of operation of a DST execution unit in accordance with the present disclosure.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
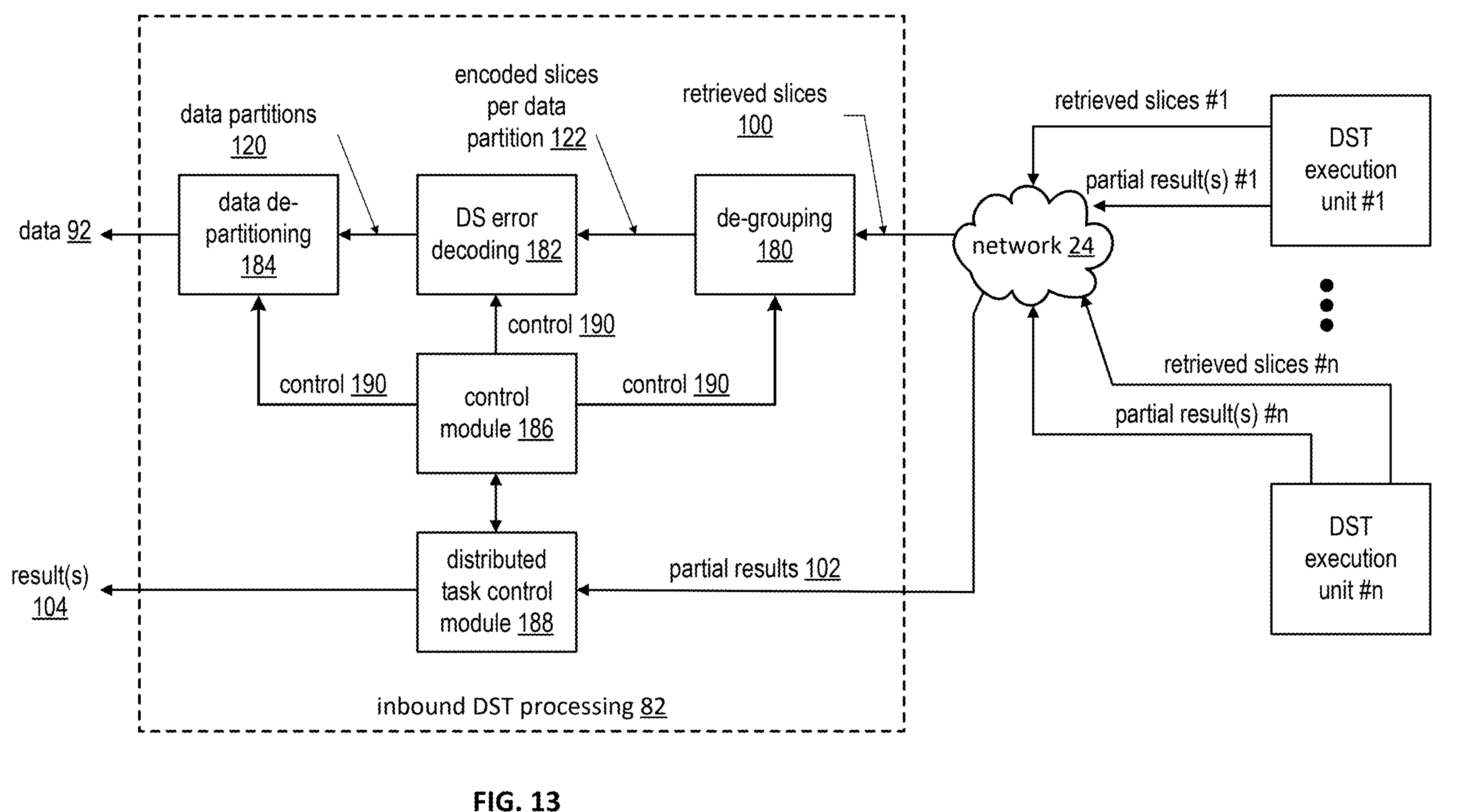
FIG. 13 is a schematic block diagram of an example of an inbound distributed storage and/or task (DST) processing in accordance with the present disclosure.

FIG. 13 is a schematic block diagram of an example of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
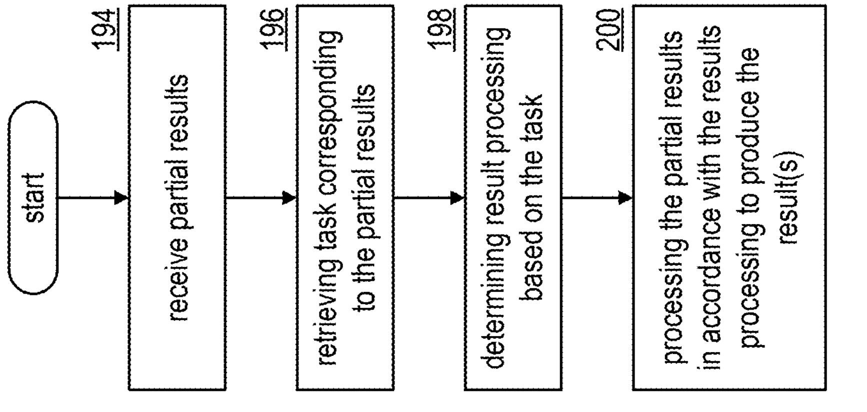
FIG. 14 is a logic diagram of an example of a method for inbound DST processing in accordance with the present disclosure.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
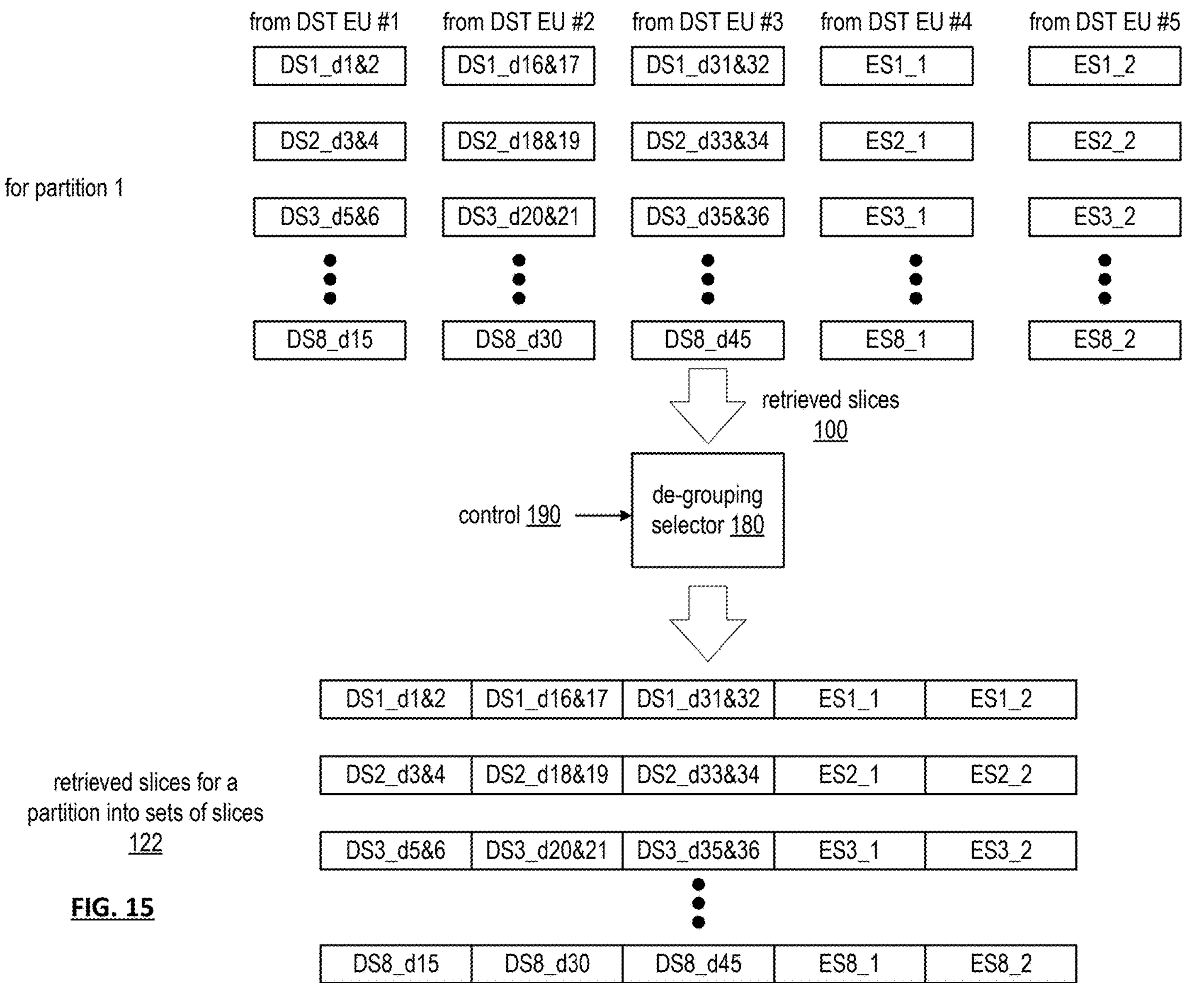
FIG. 15 is a diagram of an example of de-grouping selection processing of the inbound DST processing in accordance with the present disclosure.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
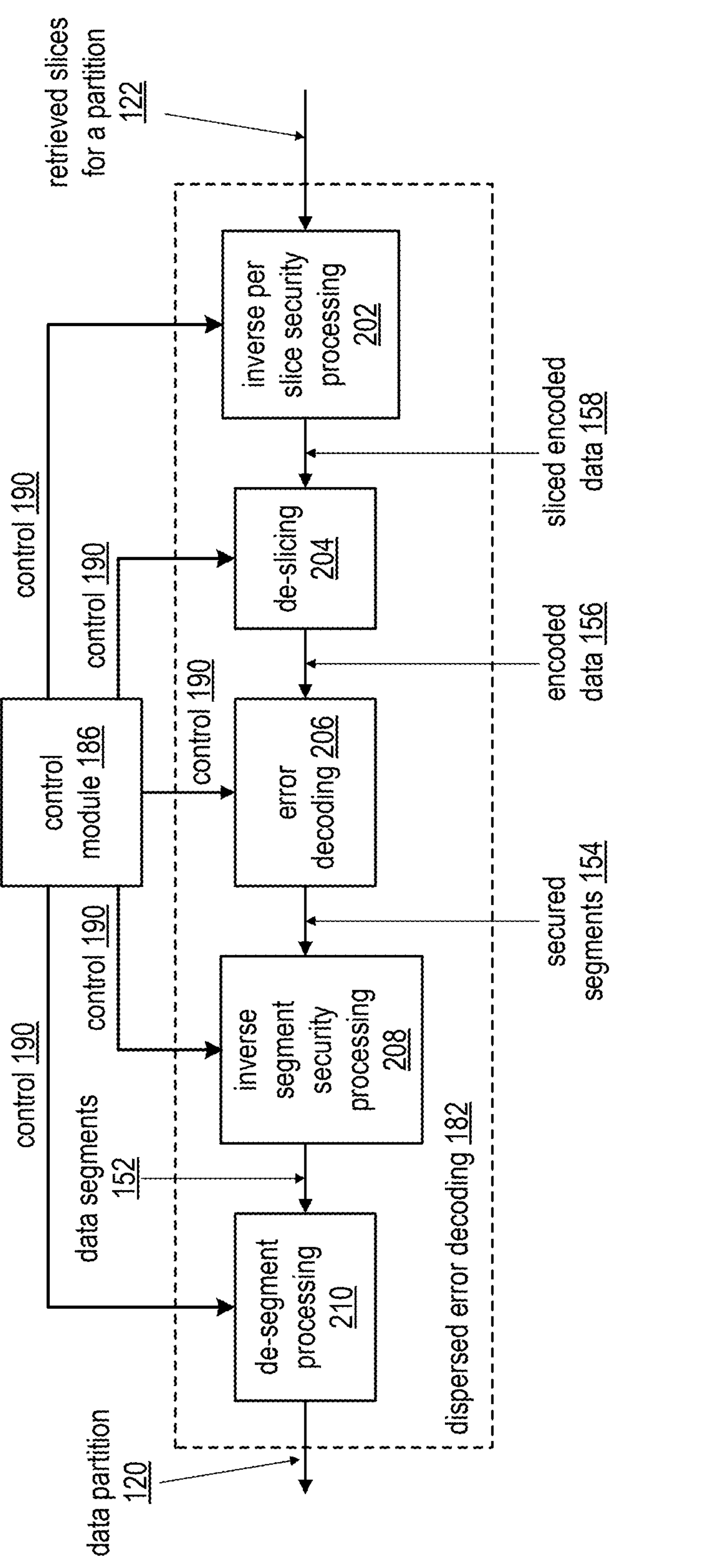
FIG. 16 is a schematic block diagram of an example of a dispersed error decoding in accordance with the present disclosure.

FIG. 16 is a schematic block diagram of an example of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
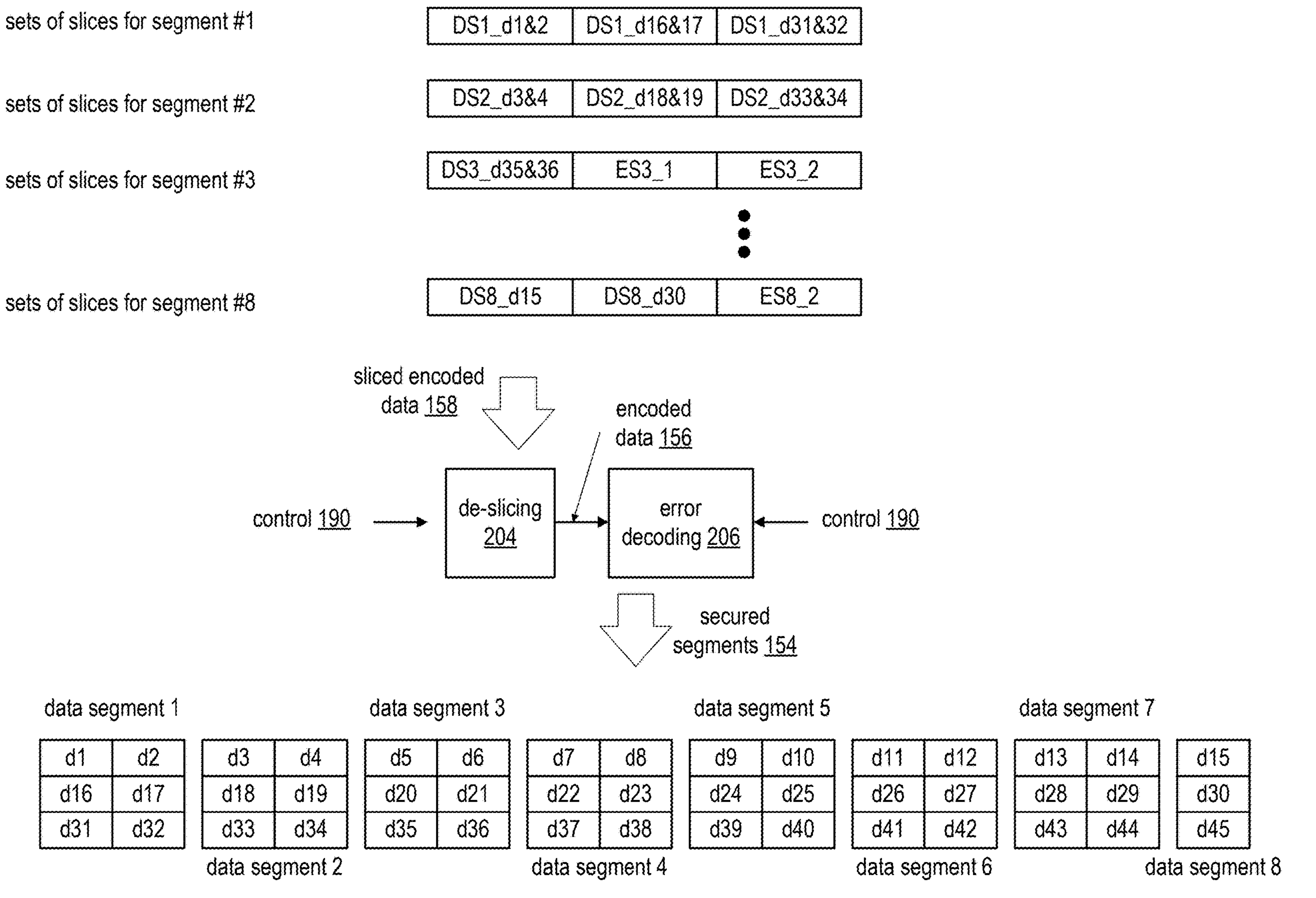
FIG. 17 is a diagram of an example of de-slicing and error decoding processing of the dispersed error decoding in accordance with the present disclosure.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_*d*1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
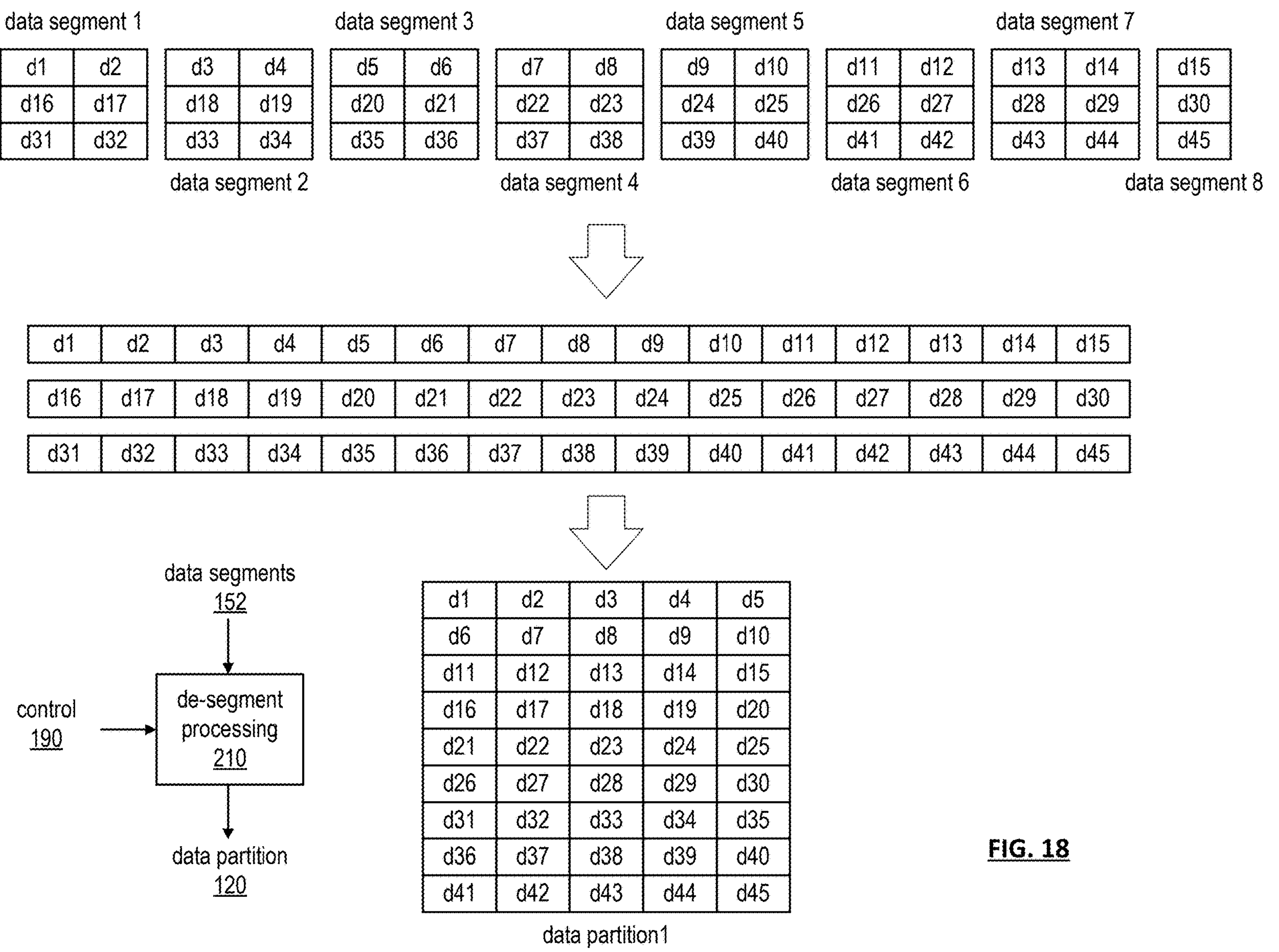
FIG. 18 is a diagram of an example of a de-segment processing of the dispersed error decoding in accordance with the present disclosure.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

FIG. 19 is a diagram of an example of converting slice groups into data 92 within an inbound distributed storage and task (DST) processing section. As shown, the data 92 is reconstructed from a plurality of data partitions (1-*x*, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
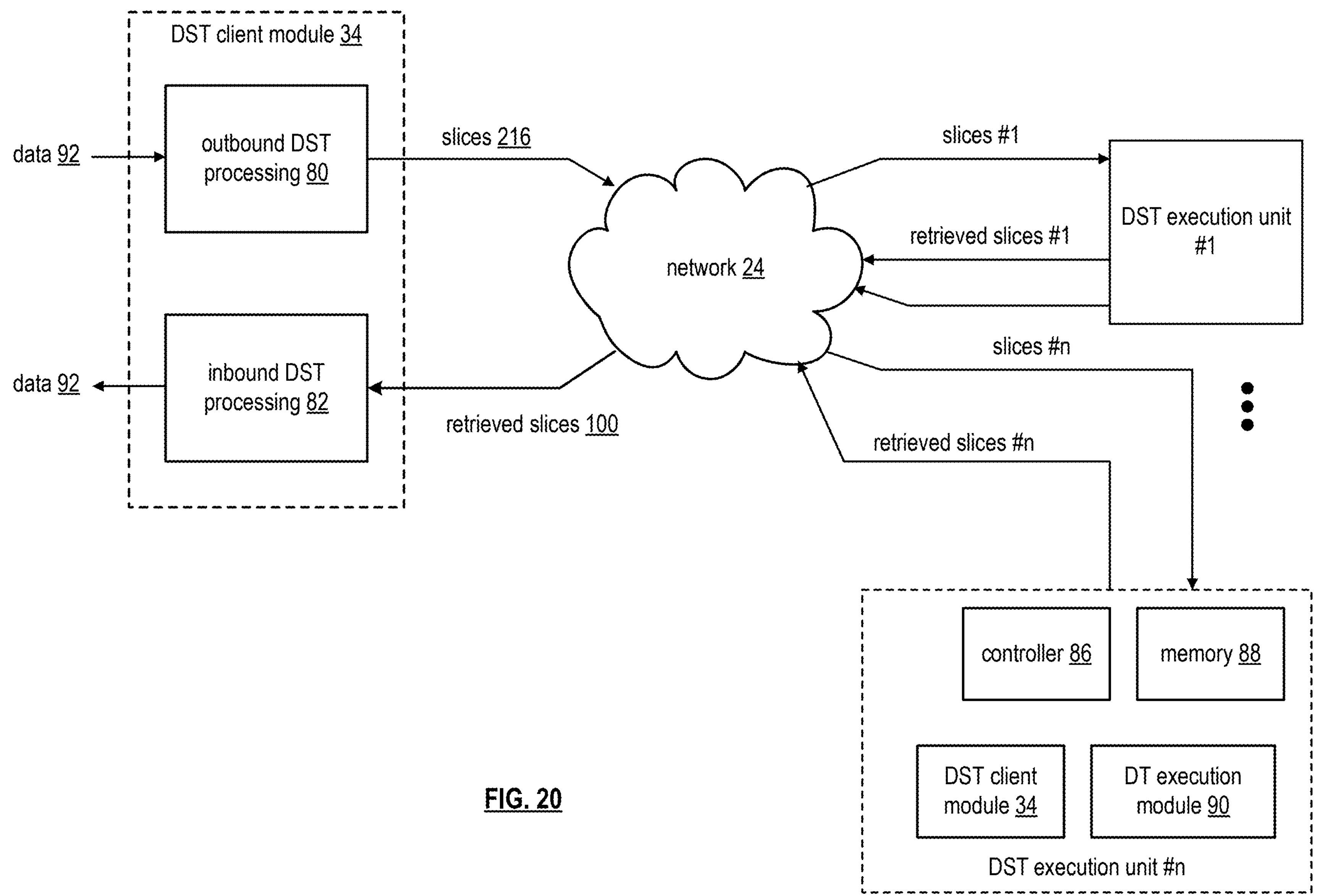
FIG. 20 is a diagram of an example of a distributed storage within the distributed computing system in accordance with the present disclosure.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
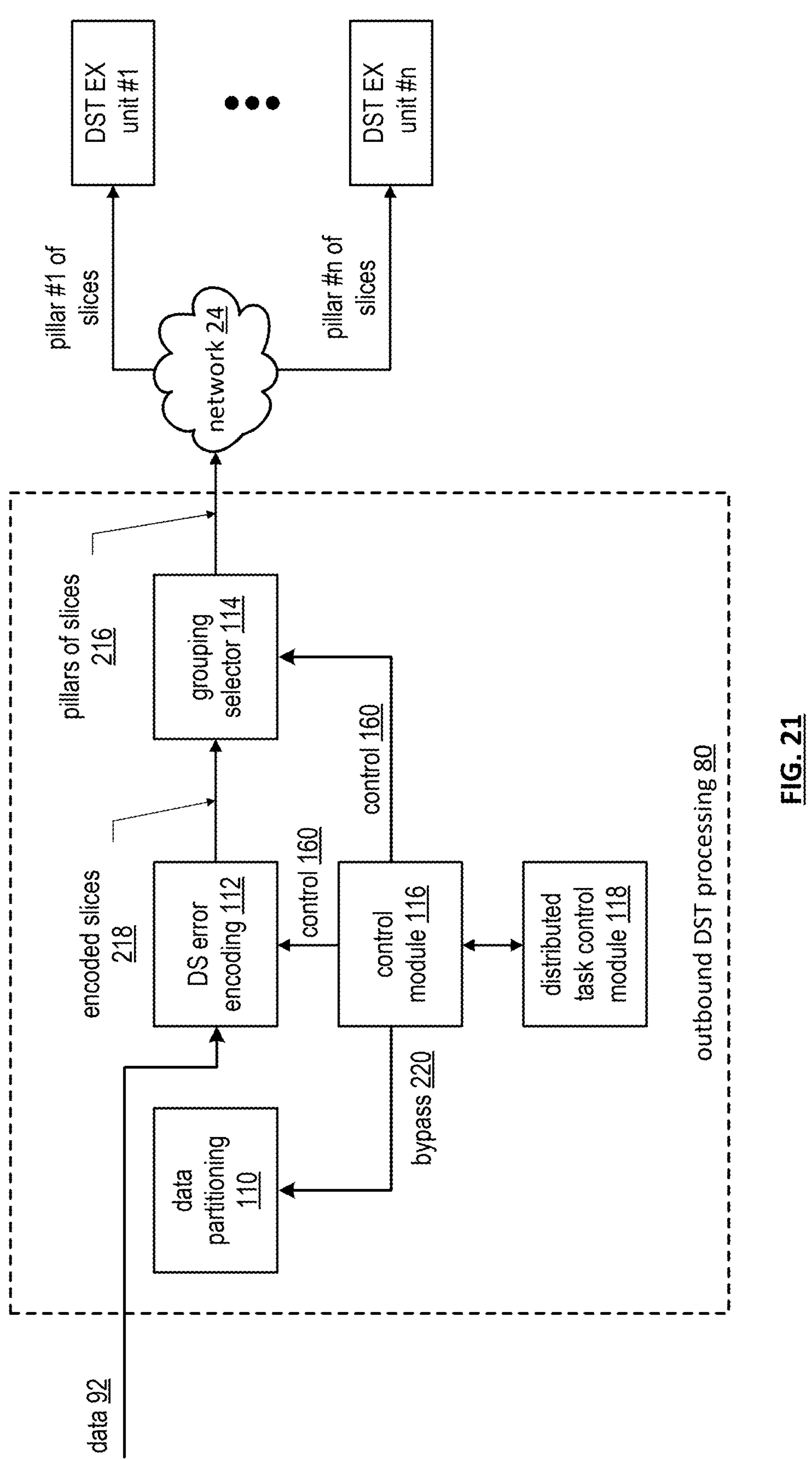
FIG. 21 is a schematic block diagram of an example of operation of outbound distributed storage and/or task (DST) processing for storing data in accordance with the present disclosure.

FIG. 21 is a schematic block diagram of an example of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
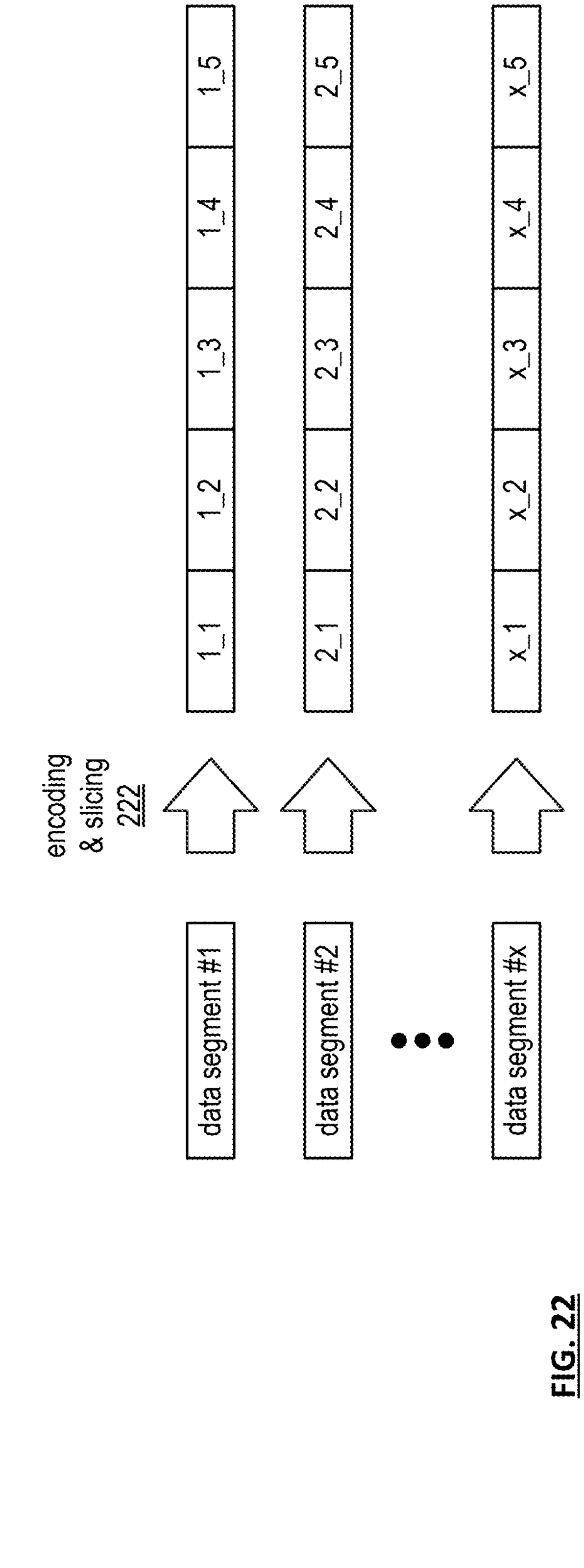
FIG. 22 is a schematic block diagram of an example of a dispersed error encoding for the example of FIG. 21 in accordance with the present disclosure.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

Figure 24:
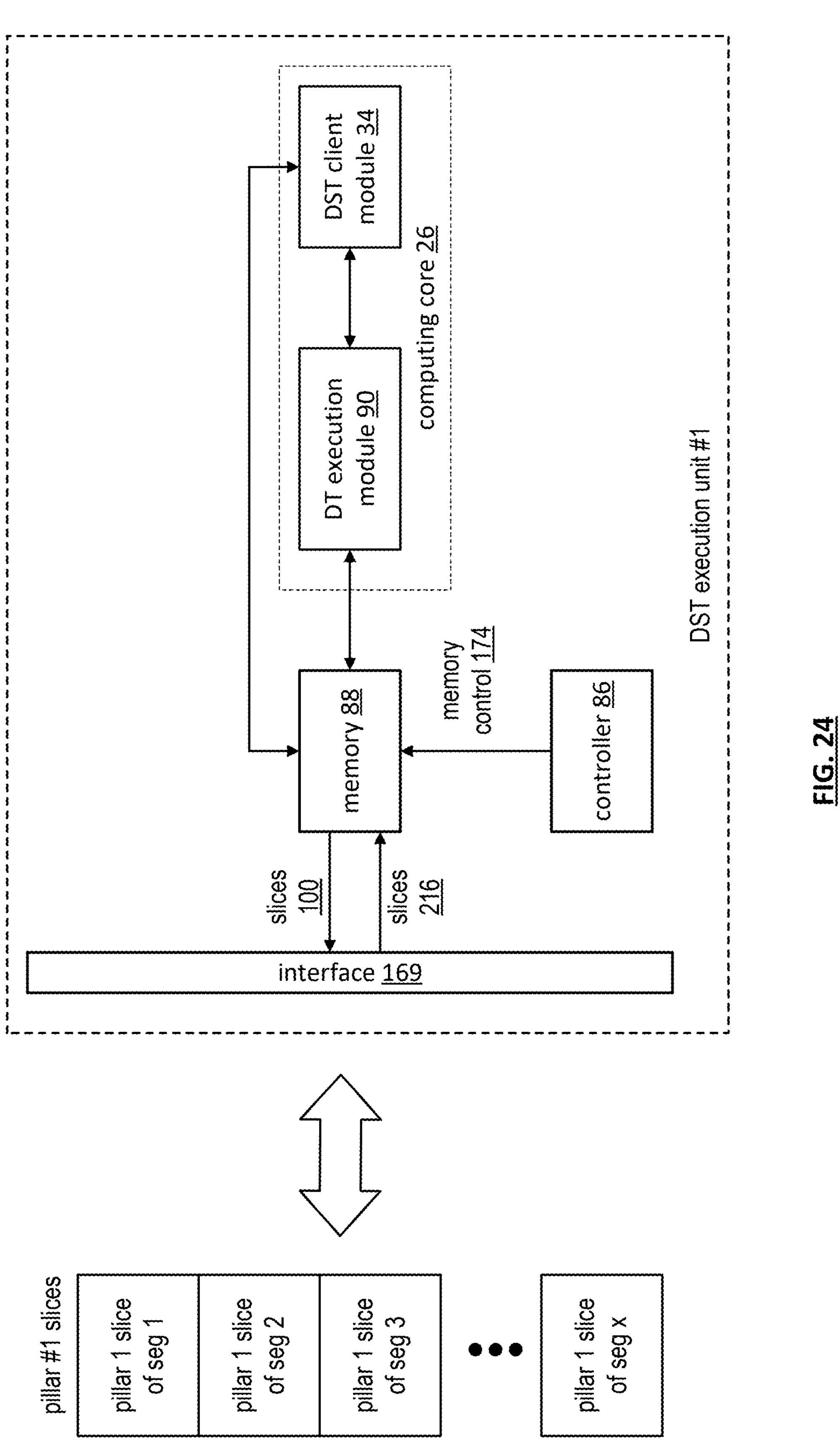
FIG. 24 is a schematic block diagram of an example of a storage operation of a DST execution unit in accordance with the present disclosure.

FIG. 24 is a schematic block diagram of an example of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
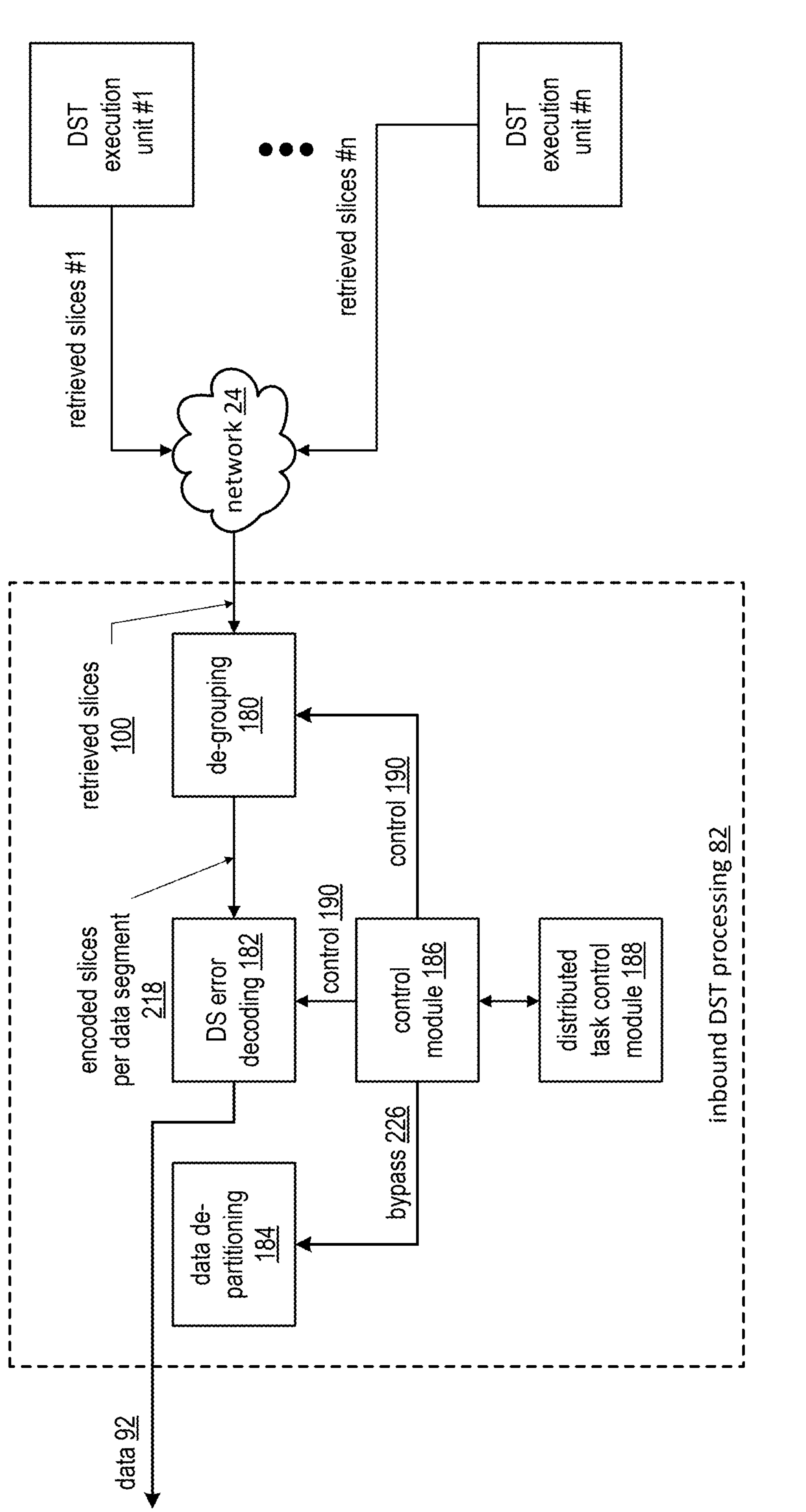
FIG. 25 is a schematic block diagram of an example of operation of inbound distributed storage and/or task (DST) processing for retrieving dispersed error encoded data in accordance with the present disclosure.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
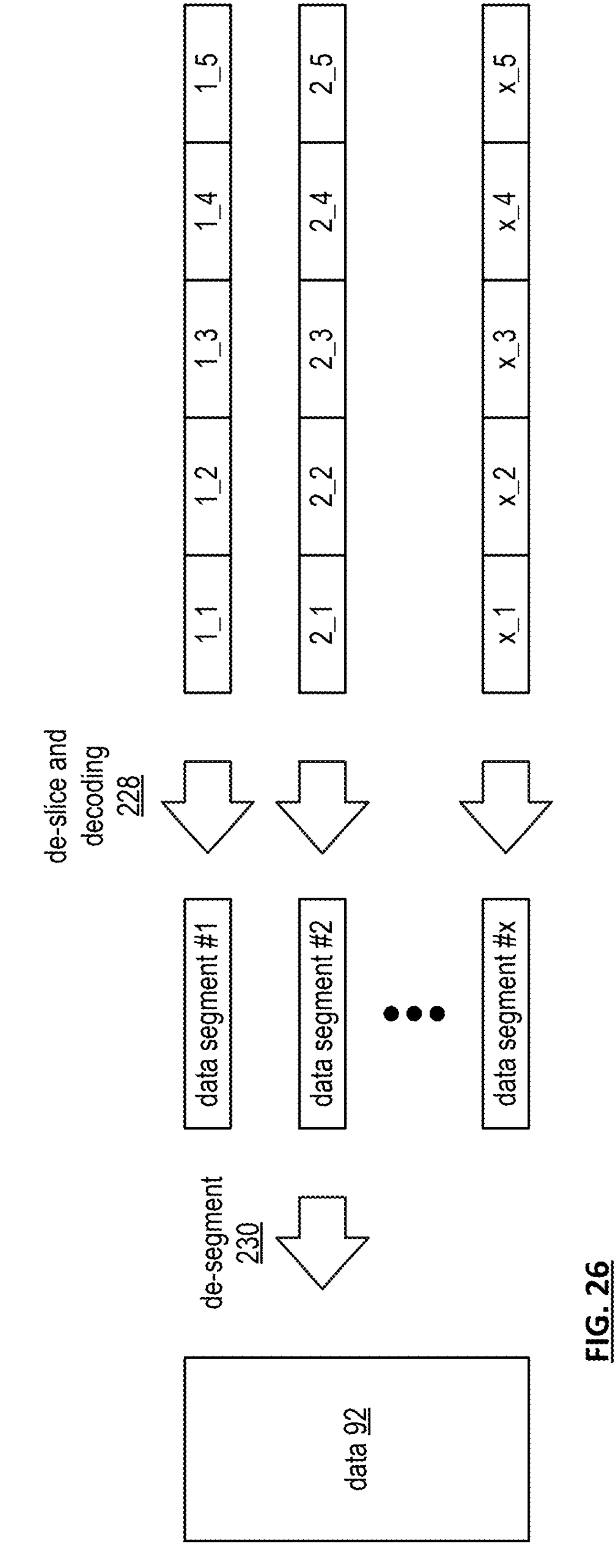
FIG. 26 is a schematic block diagram of an example of a dispersed error decoding for the example of FIG. 25 in accordance with the present disclosure.

FIG. 26 is a schematic block diagram of an example of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
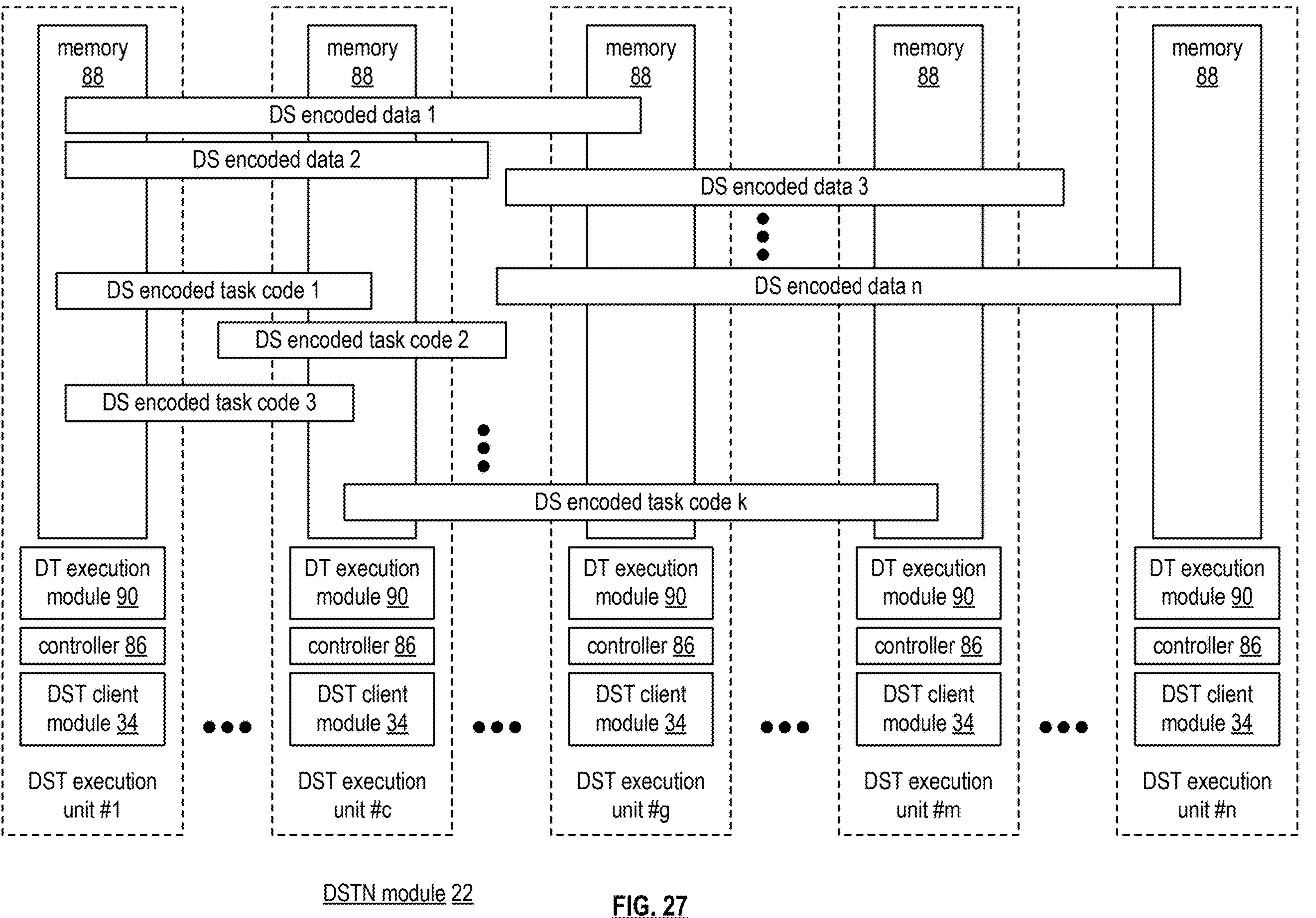
FIG. 27 is a schematic block diagram of an example of a distributed storage and task processing network (DSTN) module storing a plurality of data and a plurality of task codes in accordance with the present disclosure.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
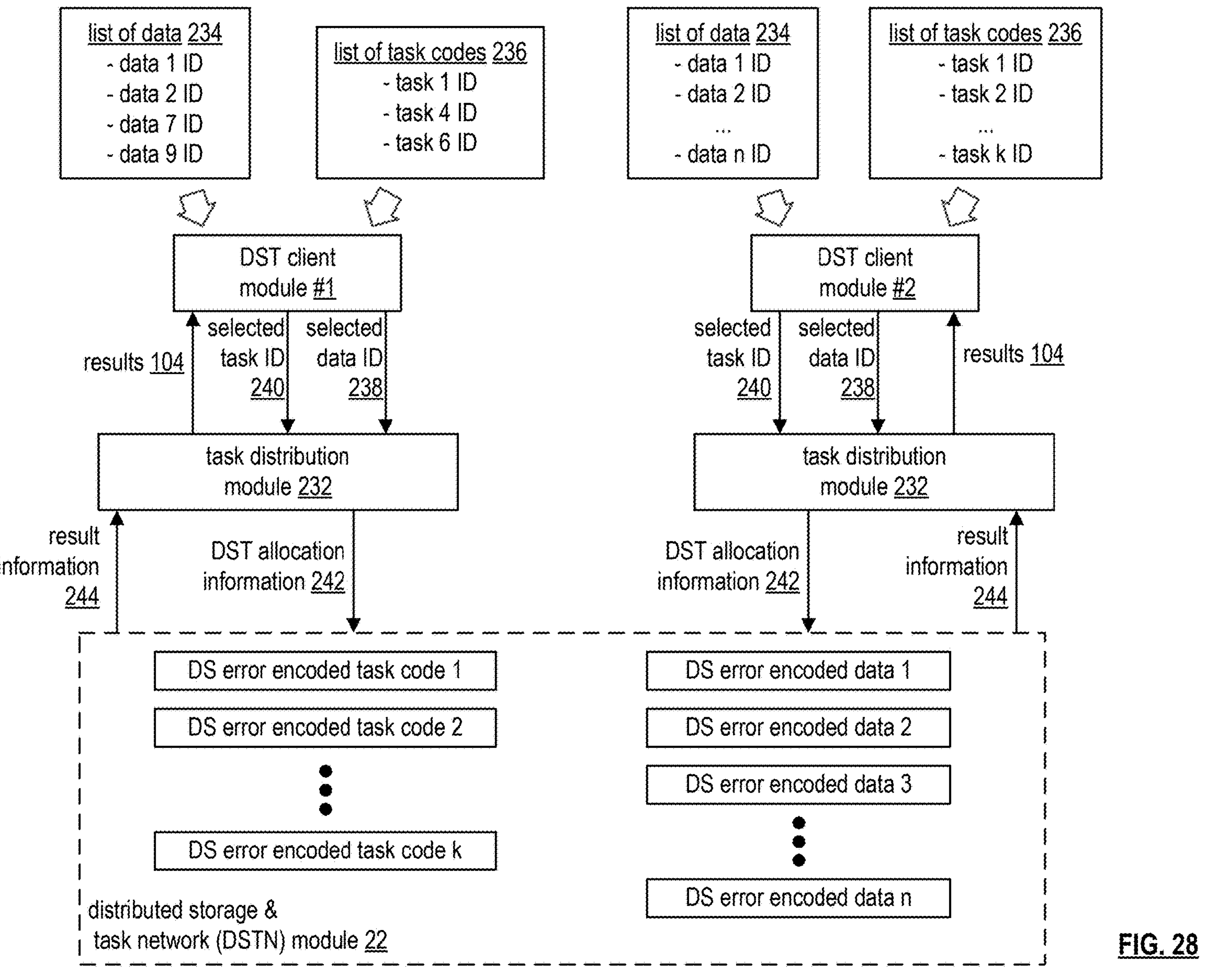
FIG. 28 is a schematic block diagram of an example of the distributed computing system performing tasks on stored data in accordance with the present disclosure.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
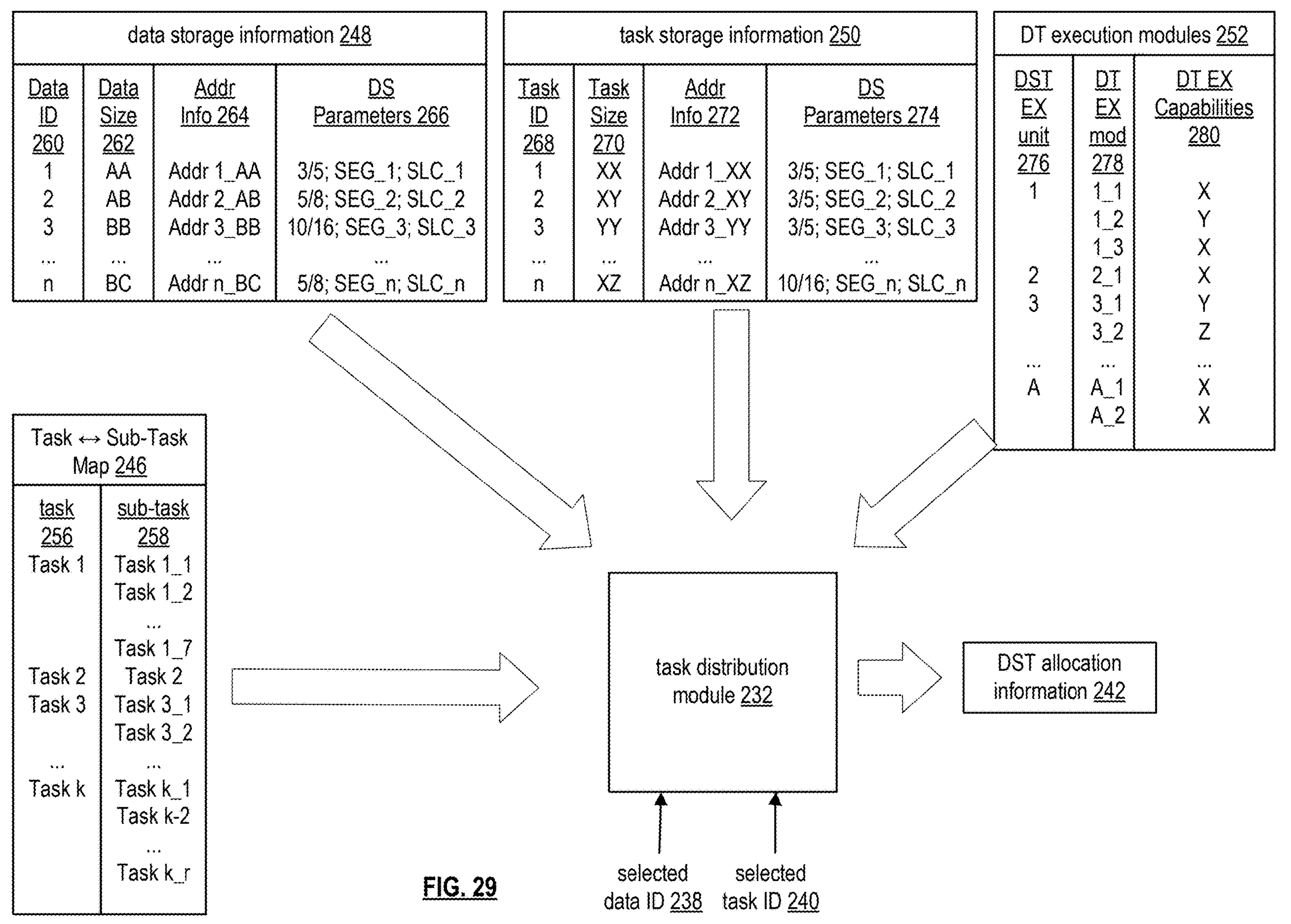
FIG. 29 is a schematic block diagram of an example of a task distribution module facilitating the example of FIG. 28 in accordance with the present disclosure.

FIG. 29 is a schematic block diagram of an example of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
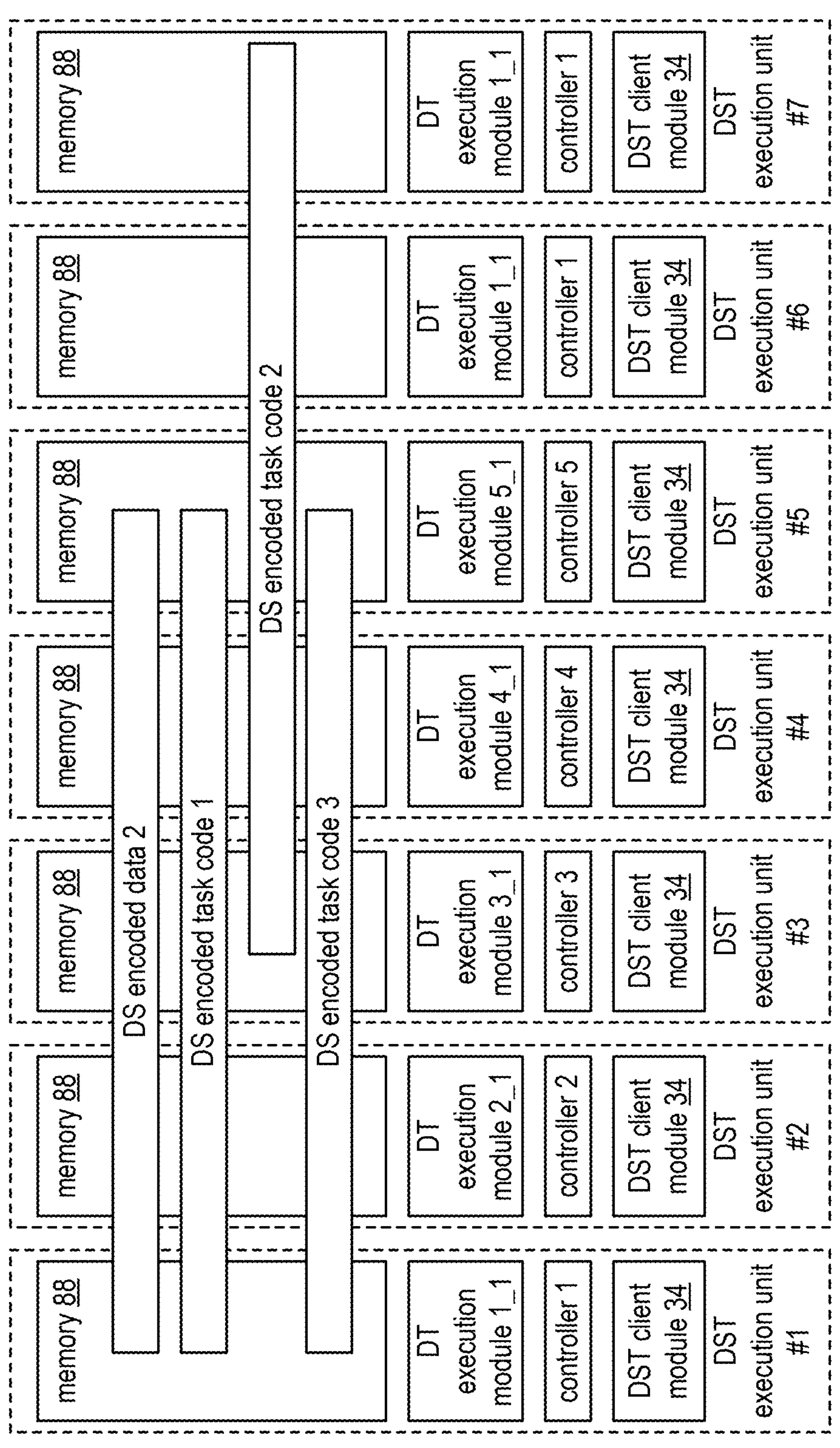
FIG. 31 is a schematic block diagram of an example of a distributed storage and task processing network (DSTN) module storing data and task codes for the example of FIG. 30 in accordance with the present disclosure.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_*z*) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_*z* by DT execution modules 1_1, 2_1, 3_1, 4_1, and 5_1. For instance, DT execution modules 1_1, 2_1, 3_1, 4_1, and 5_1 search for non-words in data partitions 2_1 through 2_*z* to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_*z* to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_*z* to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_*z*) with partitions of task 1-4 intermediate results partitions R1-4_1 through R1-4_*z* to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_*z*) with partitions of task 1-5 intermediate results partitions (R1-5_1 through R1-5_*z*) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_*z*) with partitions of task 1-5 intermediate results partitions (R1-5_1 through R1-5_*z*) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_*z* by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_*z* to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_*z* by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_*z*) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

Figures 33, 34, 35:
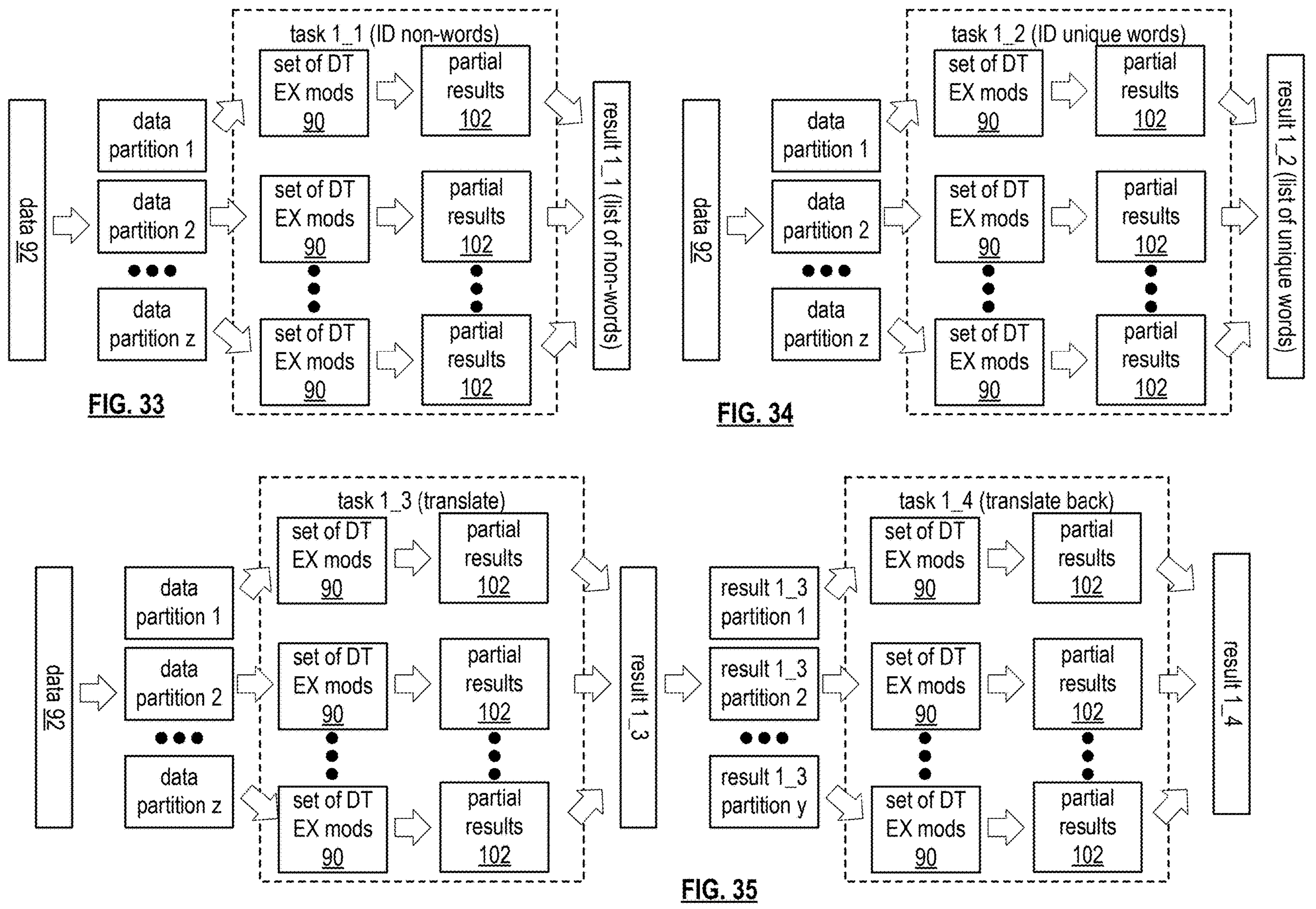

FIGS. 33-38 are schematic block diagrams of the distributed storage and task network (DSTN) module performing the example of FIG. 30. In FIG. 33, the DSTN module accesses the data 92 and partitions it into a plurality of partitions 1-*z* in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_*m*). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-*z* in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1st through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_*m*). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-*z* in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_*z*). For the data partitions, the allocated set of DT execution modules 90 executes task 1_3 to produce partial results 102 (e.g., 1st through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_*y*). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_*z*). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_*z*). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
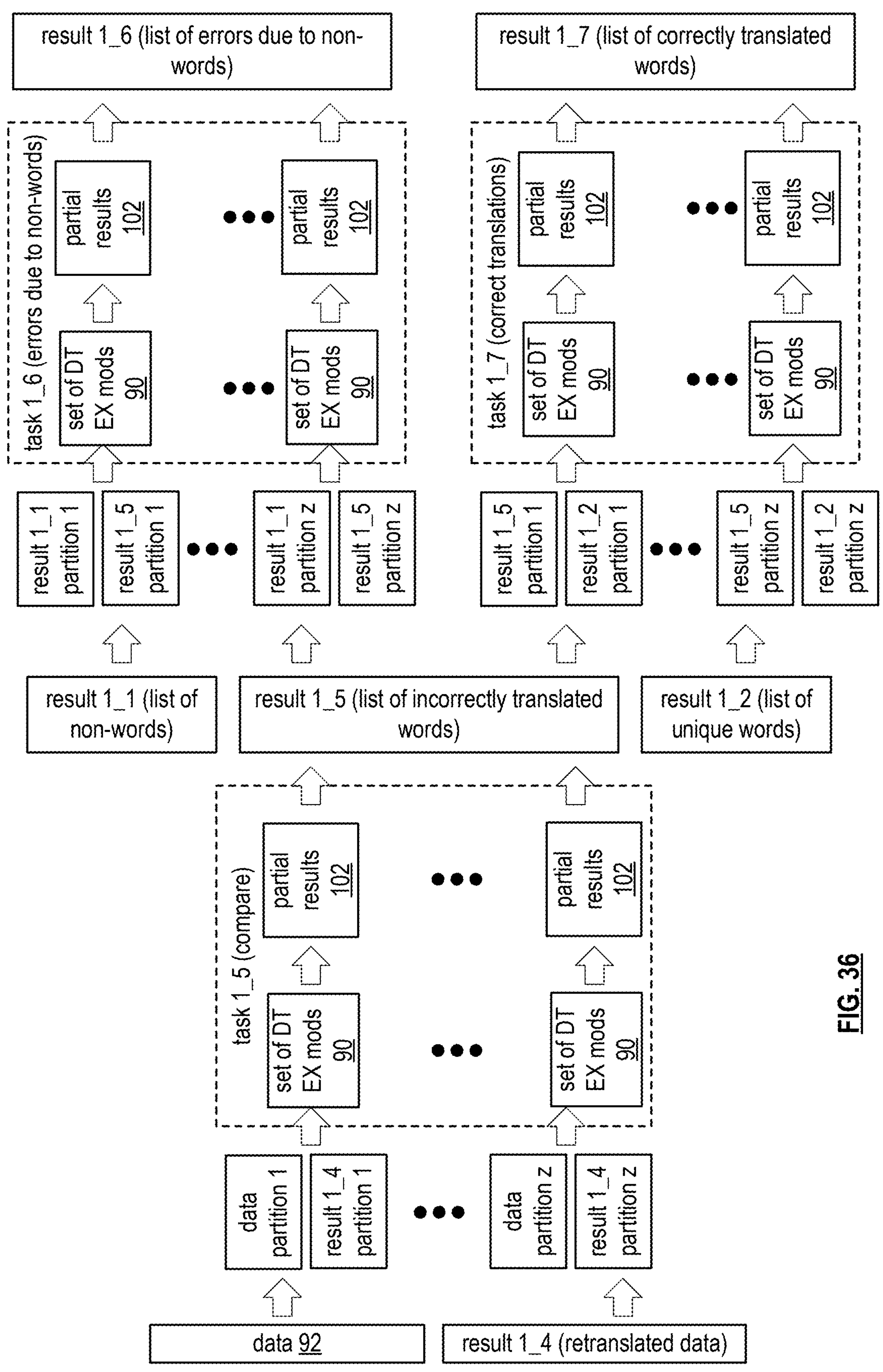

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_*z*). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_*z*). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1st through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1st through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1st through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figures 40A, 40B:
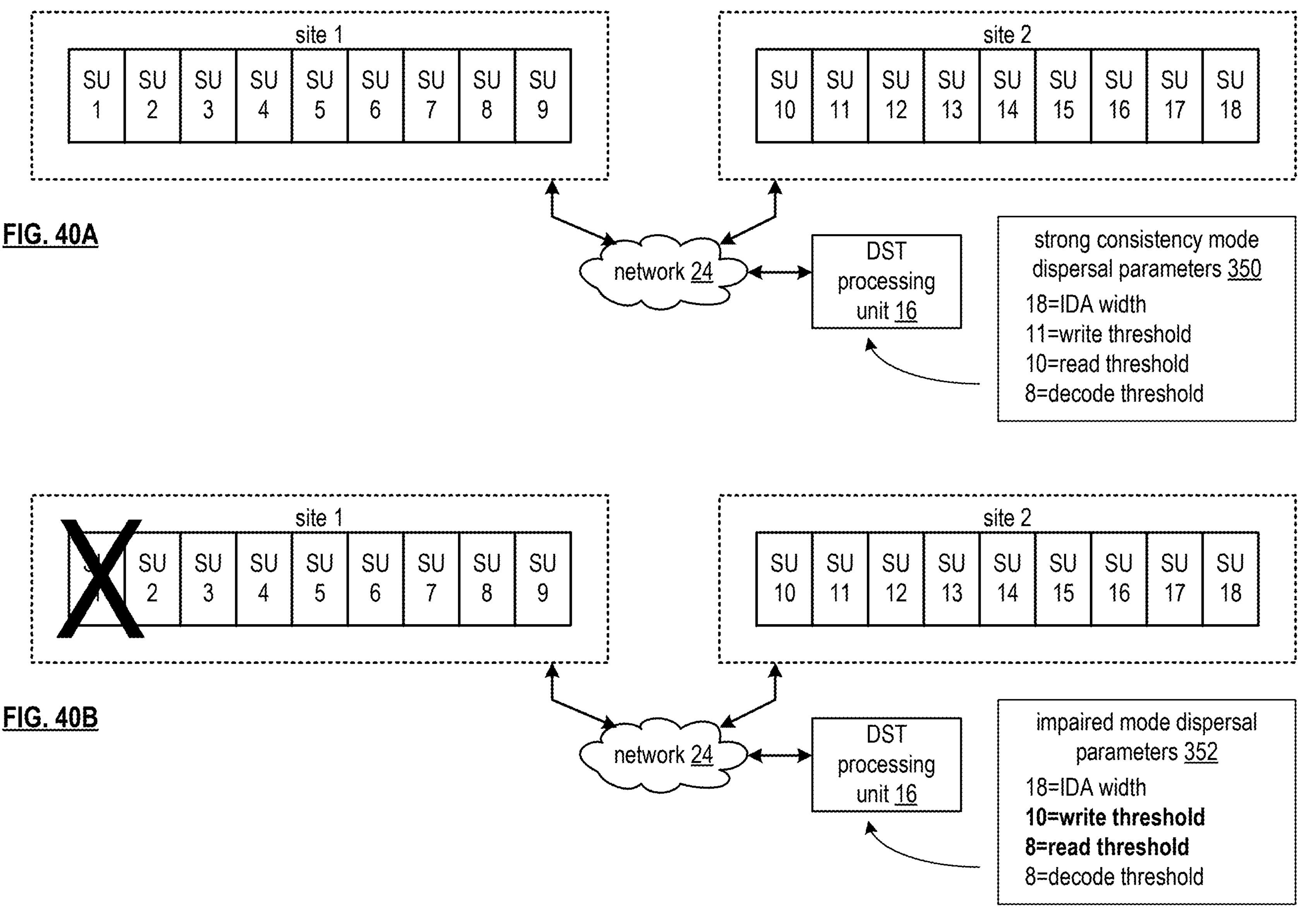
FIGS. 40A-40C are schematic block diagrams of an example of a dispersed storage network (DSN) in accordance with the present disclosure.
Figure 40C:
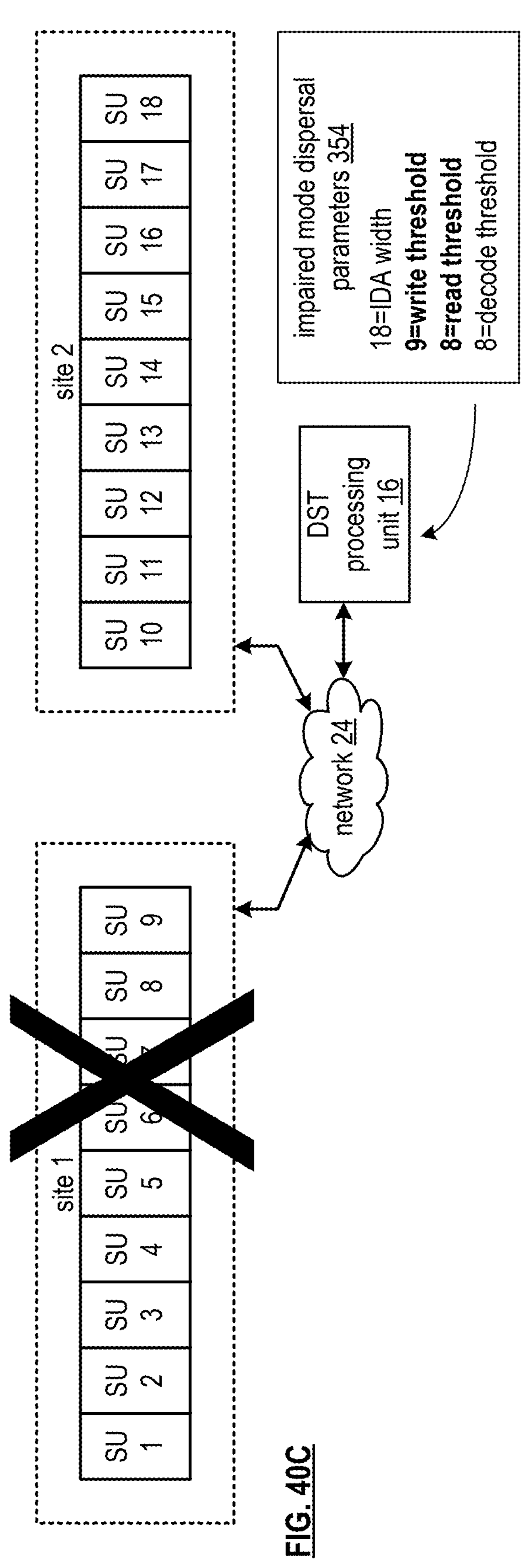

FIGS. 40A-C are schematic block diagrams of an example of a dispersed storage network (DSN) that includes at least two sites 1-2, the network 24 of FIG. 1, and the distributed storage and task (DST) processing unit 16 of FIG. 1. The at least two sites includes a set of storage units 1-18. Each storage unit may be implemented utilizing the DST execution unit 36 of FIG. 1. The set of storage units function to store sets of encoded data slices, where data is dispersed storage error encoded to produce the sets of encoded data slices in accordance with dispersal parameters.

The dispersal parameters may be established in accordance with a mode of operation of the set of storage units. The mode of operations includes a strong consistency mode and an impaired mode. The dispersal parameters includes one or more of an information dispersal algorithm (IDA) width number, a write threshold number, a read threshold number, and a decode threshold number. The set of storage units 1-18 includes an IDA width number of storage units (e.g., 18). At least two sites includes at least a decode threshold number of storage units such that the IDA width is greater than or equal to twice the decode threshold. For example, site 1 includes 9 storage units and site 2 includes 9 storage units when the decode threshold number is 8.

When the IDA width is greater than or equal to twice the decode threshold number, it is possible to recover a set of encoded data slices that includes a first decode threshold number of encoded data slices associated with the first revision and a second decode threshold number of encoded data slices associated with a second revision. A sum of a write threshold number and a read threshold number may be established to be greater than the IDA width number when all storage units are available or to be greater than a number of available units when less than all of the storage units are available to promote strongly consistent writes and reads to the set of storage units. With such a constraint, writes and reads to the set of storage units forces accessing at least one overlapping storage unit to expose any revision differences upon the reads.

The strong consistency mode is supported when all of the storage units are available and the read threshold plus the write threshold is greater than the IDA width number. The impaired mode is realized when less than all of the storage units are available and one or more of the write threshold number and the read threshold number are adjusted for operations with less than a full complement of the IDA width number of storage units.

FIG. 40A illustrates an example of operation when the strong consistency mode is supported. As an example of strong consistency mode dispersal parameters 350, the write threshold is selected to be 11 and the read threshold is selected to be 10 when the IDA width is 18 and the decode threshold is 8. It is possible to maintain these strong consistency mode dispersal parameters 350 even with failure of up to 7 storage units leaving 11 available storage units. If an eighth storage unit fails, it is not possible to maintain the write threshold of 11.

In an example of accessing data, the DST processing unit 16 determines to access the set of storage units (e.g., to read or write data). The DST processing unit 16 identifies the IDA width and the decode threshold number (e.g., via a lookup, receiving). The DST processing unit 16 determines a number of available storage units of the set of storage units. For example, the DST processing unit 16 issues a status query and interprets the status query responses. For instance, the DST processing unit 16 determines that all 18 storage units are available.

Having determined the number of available storage units, the DST processing unit 16 determines write threshold and read threshold numbers, where the write and read threshold numbers are greater than or equal to the decode threshold number and less than or equal to the number of available storage units, such that the read threshold plus the write threshold is greater than the number of available storage units. For example, the DST processing unit 16 selects a write threshold of 11 and a read threshold of 10 when all 18 storage units are available (e.g., the sum of the read threshold and the write threshold must be at least 19). Having selected the write and read threshold, the DST processing unit 16 accesses, via the network 24, at least some of the available storage units utilizing the determined write and read threshold numbers. For instance, the DST processing unit 16 issues 11 write slice requests to 11 of the 18 storage units when writing data. As another instance, the DST processing unit 16 issues 10 read slice requests to 10 of the 18 storage units when reading the data.

FIG. 40B illustrates an example of operation when the impaired mode is supported. As an example of impaired mode dispersal parameters 352, the write threshold is selected to be 10 and the read threshold is selected to be 8 when the IDA width is 18, the decode threshold is 8, and the number of available storage units is 17 (e.g., 18>17) to optimize consistency even in the impaired mode. If another storage unit fails, the write threshold may be lowered from 10 to 9 (e.g., since the read threshold is already at the decode threshold level of 8) and still optimize consistency.

In an example of accessing the data, the DST processing unit 16 determines to access the set of storage units (e.g., to read or write data). The DST processing unit 16 identifies the IDA width and the decode threshold number (e.g., via a lookup, receiving). The DST processing unit 16 determines a number of available storage units of the set of storage units. For instance, the DST processing unit 16 determines that 17 storage units are available.

Having determined the number of available storage units, the DST processing unit 16 determines write threshold and read threshold numbers, where the write and read threshold numbers are greater than or equal to the decode threshold number and less than or equal to the number of available storage units, such that the read threshold plus the write threshold is greater than the number of available storage units when supporting consistency. For example, the DST processing unit 16 selects the write threshold of 10 and the read threshold of 8 when 17 storage units are available (e.g., the sum of the read threshold and the write threshold must be at least 18 to support consistency). Having selected the write and read thresholds, the DST processing unit 16 accesses, via the network 24, at least some of the available storage units utilizing the determined write and read threshold numbers. For instance, the DST processing unit 16 issues 10 write slice requests to 10 available storage units of the 18 storage units when writing data. As another instance, the DST processing unit 16 issues 8 read slice requests to 8 available storage units of the 18 storage units when reading the data.

FIG. 40C illustrates another example of operation when the impaired mode is supported where at least one site is unavailable and at least one other site is available. As such, an entire subset of storage units (e.g., a storage target) of the set of storage units is unavailable. As another example of impaired mode dispersal parameters 354, the write threshold is selected to be 9 and the read threshold is selected to be 8 when the IDA width is 18, the decode threshold is 8, and the number of available storage units is 9. As such, each of the read and write threshold are greater than or equal to the decode threshold and less than or equal to the number of available storage units. When the number of available storage units is half of the IDA width or less, invoking an additional constraint of the read and write threshold numbers to support consistency is not possible. Storage and retrieval operations may continue with the available site. Special data synchronization must be addressed when site 1 becomes available again. The data synchronization is discussed in greater detail with reference to FIGS. 41A-E. If another storage unit fails (e.g., at site 2), the write threshold must be lowered from 9 to 8 (e.g., since the read threshold is already at the decode threshold level of 8).

In an example of accessing the data, the DST processing unit 16 determines to access the set of storage units (e.g., to read or write data). The DST processing unit 16 identifies the IDA width and the decode threshold number. The DST processing unit 16 determines a number of available storage units of the set of storage units. For instance, the DST processing unit 16 determines that 9 storage units are available.

Having determined the number of available storage units, the DST processing unit 16 determines the write threshold and read threshold numbers, where the write and read threshold numbers are greater than or equal to the decode threshold number and less than or equal to the number of available storage units. For example, the DST processing unit 16 selects the write threshold of 9 and the read threshold of 8 when 9 storage units are available. Having selected the write and read thresholds, the DST processing unit 16 accesses, via the network 24, at least some of the available storage units utilizing the determined write and read threshold numbers. For instance, the DST processing unit 16 issues 9 write slice requests to 9 available storage units at site 1. As another instance, the DST processing unit 16 issues 8 read slice requests to 8 available storage units at site 1.

Figure 40D:
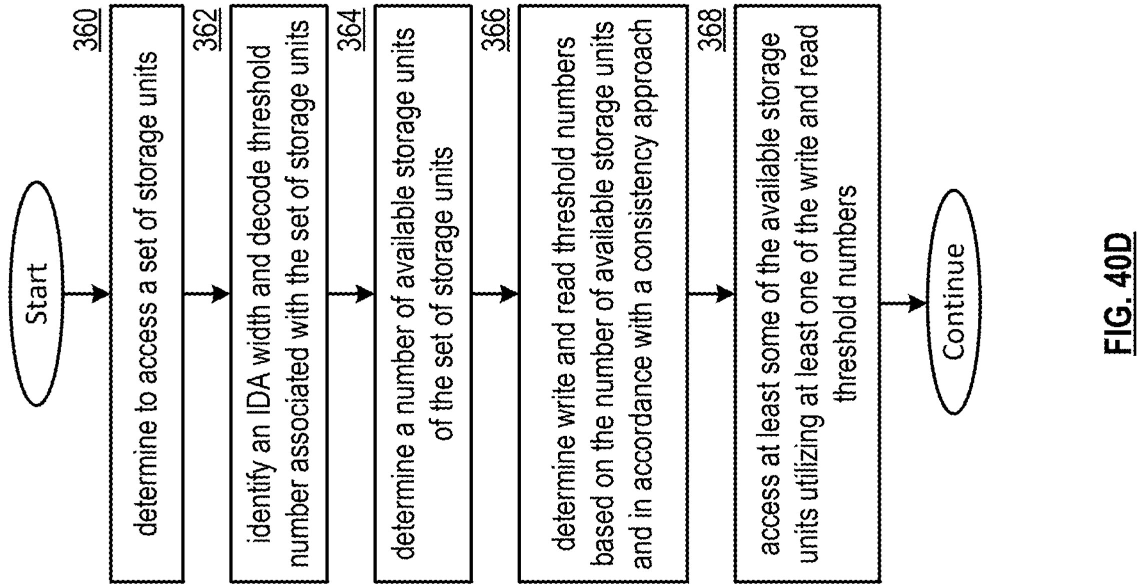
FIG. 40D is a flowchart illustrating an example of accessing a set of storage units in accordance with the present disclosure.

FIG. 40D is a flowchart illustrating an example of accessing a set of storage units. The method begins or continues at step 360 where a processing module (e.g., of a distributed storage and task (DST) processing unit) determines to access a set of storage units. The determining includes at least one of receiving a data access request, determining to store data, and determining to retrieve the data. The method continues at step 362 where the processing module identifies an information dispersal algorithm (IDA) width and a decode threshold number associated with the set of storage units. The identifying includes at least one of interpreting a portion of a system registry information, receiving the IDA width and decode threshold number, and determining one or more of the IDA width and the decode threshold number.

The method continues at step 364 where the processing module determines a number of available storage units of the set of storage units. The determining includes at least one of initiating a query, interpreting a query response, performing a test, interpreting an error message, performing a lookup, and generating an estimate. The method continues at step 366 where the processing module determines write and read threshold numbers based on the number of available storage units and in accordance with a consistency approach. For example, the processing module establishes each of the write and read threshold numbers to be greater than or equal to the decode threshold number and less than or equal to the number of available storage units. As another example, when the number of available storage units is greater than half of the IDA width, the processing module establishes the read and write threshold numbers with consistency constraints such that a sum of the read threshold and the write threshold is greater than the number of available storage units.

The method continues at step 368 where the processing module accesses at least some of the available storage units utilizing at least one of the write and read threshold numbers. For example, the processing module issues a write threshold number of write slice requests to a write threshold number of storage units of the available storage units when writing data. As another example, the processing module issues a read threshold number of read slice requests to a read threshold number of storage units of the available storage units when reading data.

Figure 40E:
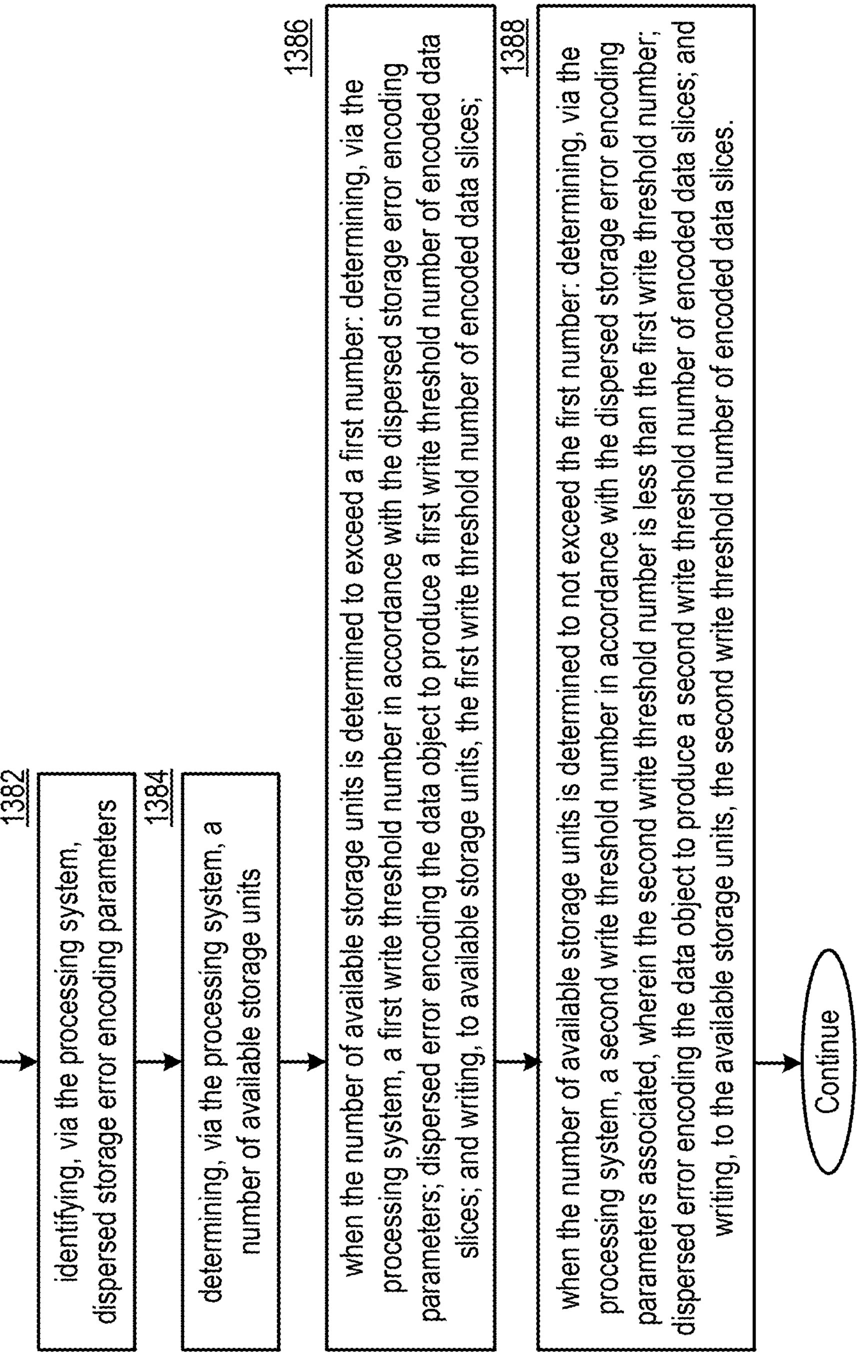
FIG. 40E is a flowchart illustrating an example of accessing a set of storage units in accordance with the present disclosure.

FIG. 40E is a flowchart illustrating an example of accessing a set of storage units. In particular a method is presented for use in conjunction with one or more functions and features of a storage network described in conjunction with this disclosure. Step 1380 includes receiving, via the processing system, a write request associated with a data object. Step 1382 includes identifying, via the processing system, dispersed storage error encoding parameters. Step 1384 includes determining, via the processing system, a number of available storage units. Step 1386 includes, when the number of available storage units is determined to exceed a first number: determining, via the processing system, a first write threshold number in accordance with the dispersed storage error encoding parameters; dispersed error encoding the data object to produce a first write threshold number of encoded data slices; and writing, to available storage units, the first write threshold number of encoded data slices. Step 1368 includes, when the number of available storage units is determined to not exceed the first number: determining, via the processing system, a second write threshold number in accordance with the dispersed storage error encoding parameters associated, wherein the second write threshold number is less than the first write threshold number; dispersed error encoding the data object to produce a second write threshold number of encoded data slices; and writing, to the available storage units, the second write threshold number of encoded data slices.

In various examples, identifying the dispersed storage error encoding parameters includes an information dispersal algorithm (IDA) width and a decode threshold number. Identifying the IDA width and the decode threshold number can include at least one of: interpreting a portion of a system registry information, receiving the IDA width and decode threshold number, determining the IDA width and the decode threshold number. Determining the number of available storage units can include initiating a query and interpreting a query response. Determining the number of available storage units can include at least one of: performing a test, interpreting an error message, performing a lookup, or generating an estimate.

In various examples, the dispersed storage error encoding parameters includes a decode threshold number. The first write threshold number can be greater than the decode threshold number and less than the number of available storage units. The first write threshold number can be greater than the decode threshold number and equal to the number of available storage units. The second write threshold number can be equal to the decode threshold number and equal to the number of available storage units. The second write threshold number can be equal to the decode threshold number and less than the number of available storage units.

In various examples, the method can be implemented via a processing system of a storage network that comprises at least one processor and a memory that stores operational instructions, that when executed by the at least one processor cause the processing system to perform operations that include the steps of the method.

FIGS. 41A-D are schematic block diagrams of an example of a dispersed storage network (DSN) that includes at least two sites 1-2, the network 24 of FIG. 1, and the distributed storage and task (DST) processing unit 16 of FIG. 1. The at least two sites includes a set of storage units 1-18. Each storage unit (SU) may be implemented utilizing the DST execution unit 36 of FIG. 1. Alternatively, the set of storage units may be implemented as two or more groups of storage units. Each set of storage units functions to store sets of encoded data slices, where data is divided into a plurality of data segments and each data segment is dispersed storage error encoded to produce a set of encoded data slices of the sets of encoded data slices in accordance with dispersal parameters.

The DST processing unit 16 may establish the dispersal parameters in accordance with a mode of operation of a plurality of modes of operation the set of storage units. The plurality of modes of operations includes a strong consistency mode (e.g., normal mode), an impaired mode (e.g., a group failure), and a reintegration mode (e.g., to reintegrate stored encoded data slices from group failure to normal mode). The dispersal parameters includes one or more of an information dispersal algorithm (IDA) width number, a write threshold number, a read threshold number, and a decode threshold number, where a decode threshold number of encoded data slices of each set of encoded data slices of the sets of encoded data slices is required to enable recovery of the data. For example, the set of storage units 1-18 includes an IDA width number of storage units (e.g., 18). The two groups of storage units each includes at least a decode threshold number of storage units such that the IDA width is greater than or equal to twice the decode threshold. For example, site 1 includes 9 storage units and site 2 includes 9 storage units when the decode threshold number is 8.

When the IDA width is greater than or equal to twice the decode threshold number, it is possible to recover a set of encoded data slices of the sets of encoded data slices that includes a first decode threshold number of encoded data slices associated with a first revision of a particular data segment and a second decode threshold number of encoded data slices associated with a second revision of the particular data segment. The DST processing unit 16 may establish the write threshold number and the read threshold number such that a sum of a write threshold number and a read threshold number is greater than the IDA width number when all storage units are available (e.g., normal mode) or to be greater than a number of available units when less than all of the storage units are available to promote strongly consistent writes and reads to and from the set of storage units. With such a consistency constraint, writes and reads to the set of storage units forces accessing at least one overlapping storage unit of two or more groups of storage units to expose any revision differences when reading the particular data segment.

The strong consistency mode is supported when all of the storage units are available and the read threshold plus the write threshold is greater than the IDA width number. When the impaired mode (e.g., group failure mode) is realized (e.g., less than all of the storage units are available), the DST processing unit 16 adjusts one or more of the write threshold number and the read threshold number for operations with less than a full complement of the IDA width number of storage units. The impaired mode is discussed in greater detail with reference to FIG. 41B. The reintegration mode is realized when previously unavailable storage units are now fully available. The reintegration mode is discussed in greater detail with reference to FIG. 41C.

Figure 41A:
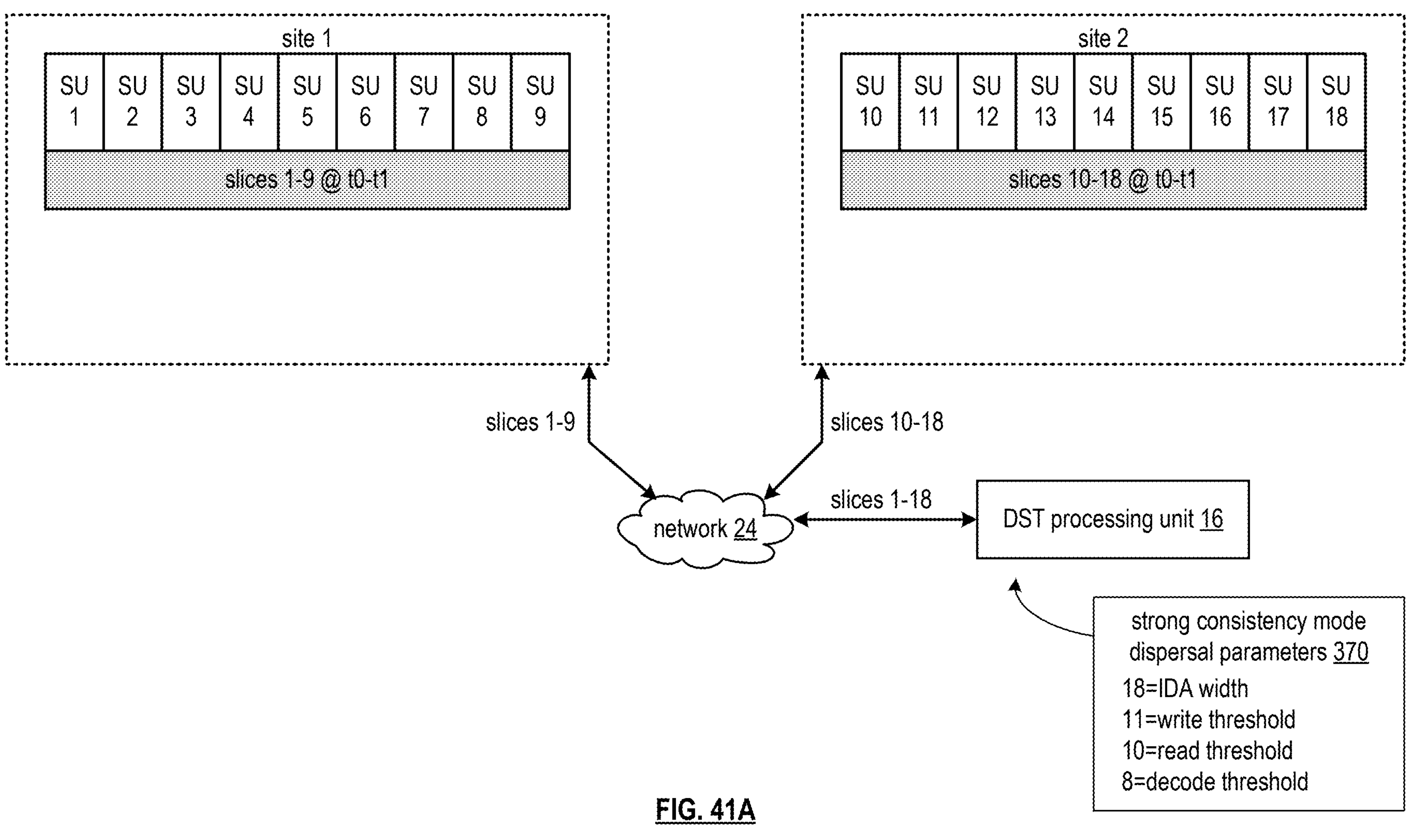
FIGS. 41A-41D are schematic block diagrams of another of a dispersed storage network (DSN) in accordance with the present disclosure.

FIG. 41A illustrates an example of operation when the strong consistency mode is supported. As an example of strong consistency mode dispersal parameters 370, the DST processing unit 16 selects the write threshold to be 11 and the read threshold to be 10 when the IDA width is 18 and the decode threshold is 8. It is possible to maintain these strong consistency mode dispersal parameters 370 even with failure of up to 7 storage units leaving 11 available storage units. If an eighth storage unit fails, it is not possible to maintain the write threshold of 11.

In an example of accessing data, the DST processing unit 16 determines to access the set of storage units (e.g., to read or write data). The DST processing unit 16 identifies the IDA width and the decode threshold number (e.g., via a lookup, receiving). The DST processing unit 16 determines a number of available storage units of the set of storage units. For example, the DST processing unit 16 issues a status query and interprets status query responses. For instance, the DST processing unit 16 determines that all 18 storage units are available (e.g., normal mode).

Having determined the number of available storage units, the DST processing unit 16 determines write threshold and read threshold numbers, where the write and read threshold numbers are greater than or equal to the decode threshold number and less than or equal to the number of available storage units, such that the read threshold plus the write threshold is greater than the number of available storage units. For example, the DST processing unit 16 selects a write threshold of 11 and a read threshold of 10 when all 18 storage units are available (e.g., the sum of the read threshold and the write threshold must be at least 19). Having selected the write and read threshold, the DST processing unit 16 accesses, via the network 24, at least some of the available storage units utilizing the determined write and read threshold numbers. For instance, the DST processing unit 16 issues 11 write slice requests to 11 of the 18 storage units when writing data. As another instance, the DST processing unit 16 issues 10 read slice requests to 10 of the 18 storage units when reading the data. More generally, while in the normal strong consistency mode, the DST processing unit 16, issues slice access requests 1-9 to the first group of storage units (e.g., storage units 1-9) during a first time frame (e.g., t0-t1) and simultaneously issues slice access requests 10-18 to the second group of storage units (e.g., storage units 10-18) during the first time frame such that the encoded data slices 1-9 are accessed using the first group of storage units and encoded data slices 10-18 are accessed using the second group of storage units.

In another example of operation of the accessing of the data utilizing the DSN that stores a set of encoded data slices, where a data segment is dispersed storage error encoded into the set of encoded data slices, where the set of encoded data slices includes a width number of encoded data slices, where the data segment is recoverable from a decode threshold number of encoded data slices of the set of encoded data slices, and where the width number (e.g., IDA width) is equal to or greater than two times the decode threshold number, the DST processing unit 16 (e.g., a requesting entity) sends a normal data segment access request to the first and the second groups of storage units of the DSN. Each of the first and second groups of storage units is allocated a unique subset of encoded data slices of the set of encoded data slices, where each unique subset of encoded data slices includes at least the decode threshold number of encoded data slices, and where the normal data segment access request is regarding a first number of encoded data slices of the set of encoded data slices that exceeds the at least the decode threshold number of encoded data slices in each of the unique subsets of encoded data slices (e.g., 11 or 10 access requests).

In another example of operation of the accessing of the data, the requesting entity (e.g., the DST processing unit 16) sends a normal data segment read request as the normal data segment access request to the first and second groups of storage units of the DSN. For instance, the DST processing unit 16 issues, via the network 24, a read slice request to the storage unit 9 and read slice requests 10-18 to the storage units 10-18 (e.g., a total of 10 read slice requests). Having issued the normal data segment read request, the DST processing unit 16 receives first encoded data slices of the unique subset of encoded data slices stored by the first group of storage units. For instance, the DST processing unit 16 receives, via the network 24, an encoded data slice 9 from the first group of storage units, where the receiving of the encoded data slice 9 includes receiving a revision number associated with the unique subset of encoded data slices stored by the first group of storage units. Having received the first encoded data slices, the DST processing unit 16 receives second encoded data slices of the unique subset of encoded data slices stored by the second group of storage units. For example, the DST processing unit 16 receives, via the network 24, encoded data slices 10-18 from the second group of storage units, where the receiving of the encoded data slices 10-18 includes receiving revision numbers associated with each of the unique subset of encoded data slices stored by the second group of storage units. Having received the first and second encoded data slices, the DST processing unit 16 determines data consistency of the first and second encoded data slices. For instance, the DST processing unit 16 indicates favorable data consistency when the revision numbers are substantially the same across the two groups of storage units (e.g., a common highest revision number is the same).

Figure 41B:
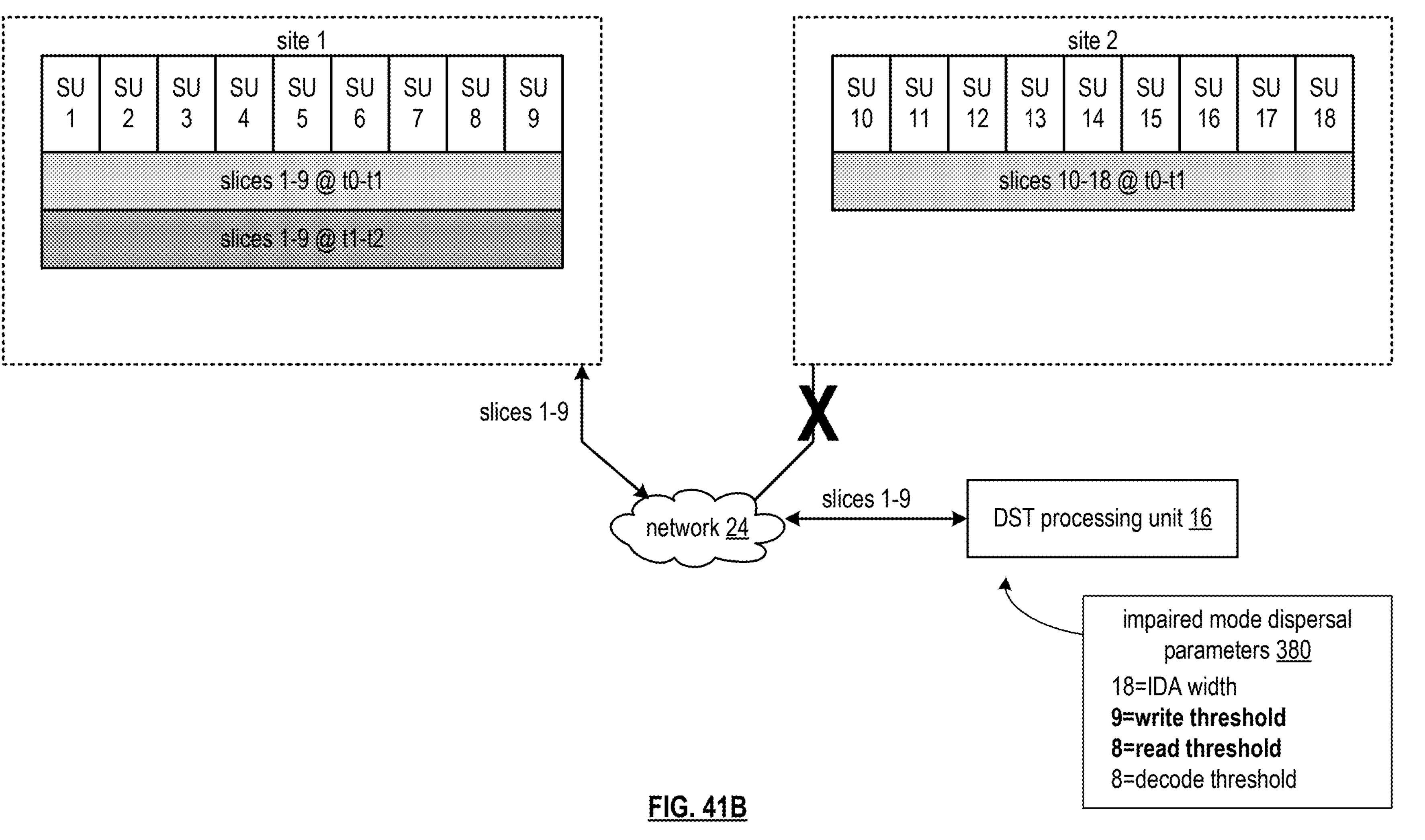

FIG. 41B illustrates an example of operation when the impaired mode is supported where at least one site (e.g., group of storage units) is unavailable and at least one other site (e.g., one other group of storage units) is available. As such, an entire group of storage units (e.g., a storage target) of the set of storage units is unavailable (e.g., the second group of storage units is unavailable). As an example of impaired mode dispersal parameters 380, the DST processing unit 16 selects the write threshold to be 9 and the read threshold to be 8 when the IDA width is 18, the decode threshold is 8, and the number of available storage units is 9. As such, each of the read and write threshold are greater than or equal to the decode threshold and less than or equal to the number of available storage units. When the number of available storage units is half of the IDA width or less, invoking an additional constraint of the read and write threshold numbers to support consistency is not possible. Storage and retrieval operations may continue with the available site. Special data synchronization must be addressed when site 2 becomes available again. If another storage unit fails (e.g., at site 1), the write threshold must be lowered from 9 to 8 (e.g., since the read threshold is already at the decode threshold level of 8).

In an example of operation of accessing the data during the impaired mode, the DST processing unit 16 determines to access the set of storage units (e.g., to read or write data). The DST processing unit 16 identifies the IDA width and the decode threshold number. The DST processing unit 16 determines a number of available storage units of the set of storage units. For instance, the DST processing unit 16 determines that 9 storage units are available (e.g., all at site 1).

Having determined the number of available storage units, the DST processing unit 16 determines the write threshold and read threshold numbers, where the write and read threshold numbers are greater than or equal to the decode threshold number and less than or equal to the number of available storage units. For example, the DST processing unit 16 selects the write threshold to be 9 and the read threshold to be 8 when 9 storage units are available. Having selected the write and read thresholds, the DST processing unit 16 accesses, via the network 24, at least some of the available storage units utilizing the determined write and read threshold numbers. For instance, the DST processing unit 16 issues 9 write slice requests to 9 available storage units at site 1 to store encoded data slices 1-9 at site 1 during a second time frame t1-t2. As another instance, the DST processing unit 16 issues 8 read slice requests to 8 available storage units at site 1.

In another example of operation of accessing the data during the impaired mode, the DST processing unit 16 sends a group failure data segment access request to the first group of storage units when the second group of storage units has less than the decode threshold number of encoded data slices of the corresponding unique subset of encoded data slices available, where the group failure data segment access request is regarding a second number of encoded data slices of the set of encoded data slices that is equal to or less than the at least the decode threshold number of encoded data slices in each of the unique subsets of encoded data slices and is equal to or greater than the decode threshold number. When the second group of storage units has less than the decode threshold number of encoded data slices of the corresponding unique subset of encoded data slices available and the group failure data segment access request is a read request, the DST processing unit 16 establishes the second number as the read threshold number 8. For instance, the DST processing unit 16 sends, via the network 24, read slice access requests 1-8 to the first group of storage units. When the second group of storage units has less than the decode threshold number of encoded data slices of the corresponding unique subset of encoded data slices available and the group failure data segment access request is a write request, the DST processing unit 16 establishes the second number as the write threshold number 9. For instance, the DST processing unit 16 sends, via the network 24, write slice access requests 1-9 to the first group of storage units.

Figure 41C:
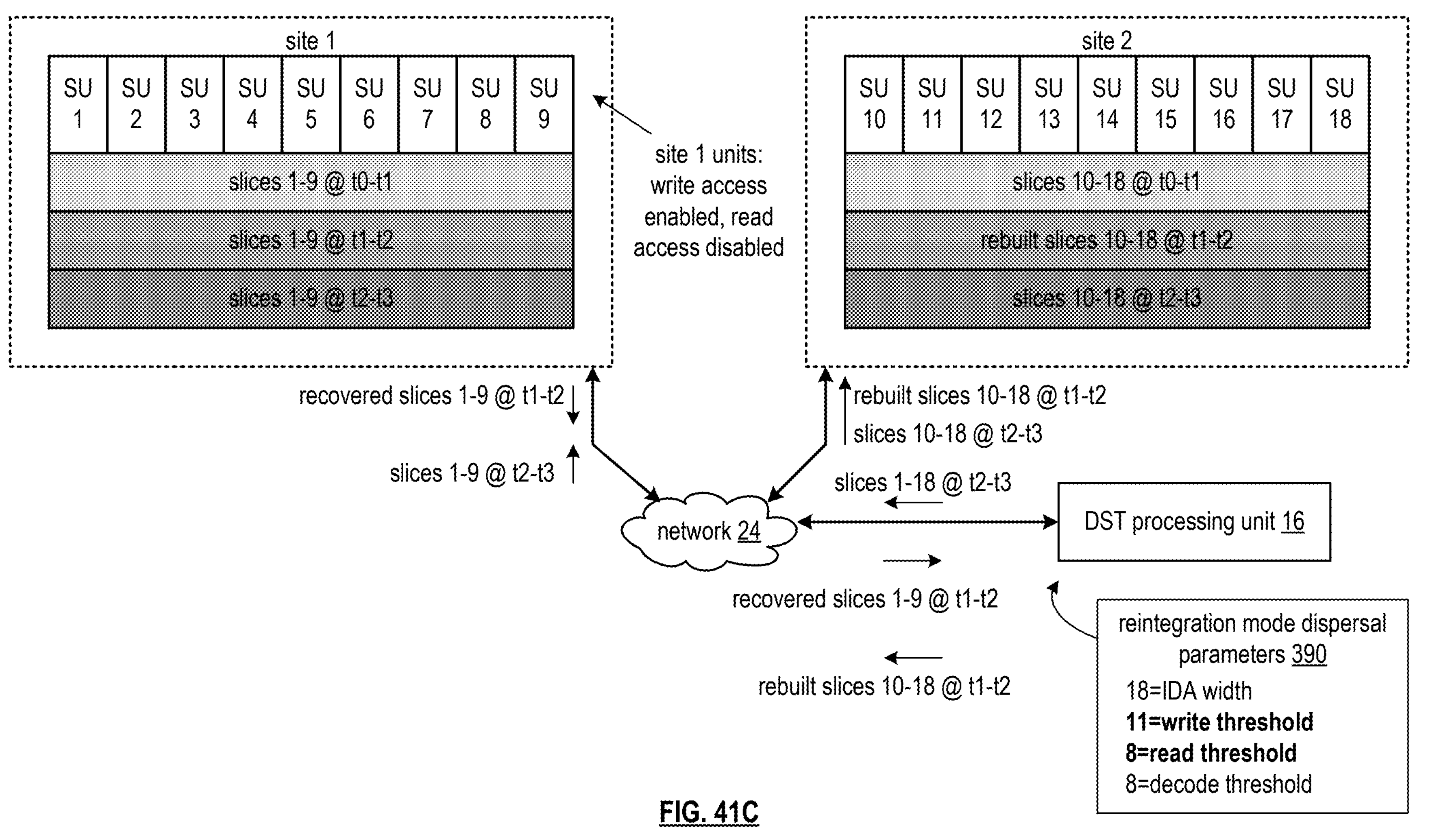

FIG. 41C illustrates an example of operation where the DSN operates in the reintegration mode when the site 2 becomes available and utilizes reintegration mode dispersal parameters. In a specific example of operation, the DST processing unit 16 determines that a threshold number of previously unavailable storage units are now available. The determining includes at least one of interpreting an error message, receiving a status indicator, initiating a query, interpreting a query response, performing a test, and interpreting a test result. For example, the DST processing unit 16 determines that the storage units 10-18 of site 2 have become available.

Having detected that site 2 is available, the DST processing unit 16 establishes that the newly available storage units are write access enabled (e.g., to enable all writing) and read access disabled (e.g., to prohibit reading slices that may not be at a current revision level). The DST processing unit 16 updates the write threshold based on a number of available storage units. For example, the DST processing unit 16 reverts the write threshold back to a previous write threshold level that was utilized when site 1 was previously available. For instance, the DST processing unit 16 updates the write threshold from 9 back to 11. The DST processing unit 16 leaves the read threshold unchanged at 8 from the impaired mode dispersal parameters. As such, the reintegration mode dispersal parameters include the write threshold of 11 and the read threshold of 8.

Having updated the write threshold, when the second group of storage units has reestablished that the at least the decode threshold number of encoded data slices of the corresponding unique subset of encoded data slices is available, the DST processing unit 16 determines whether at least one encoded data slice of the corresponding unique subset of encoded data slices of the second group of storage units requires rebuilding (e.g., determines whether an encoded data slice of a latest revision stored by the first group storage units is missing from the second group of storage units). When the at least one encoded data slice of the corresponding unique subset of encoded data slices of the second group of storage units requires rebuilding, the DST processing unit 16 rebuilds the at least one encoded data slice. For example, the DST processing unit 16 identifies missing encoded data slices, recovers other encoded data slices from other storage units (e.g., recovered encoded data slices 1-9 associated with time frame t1-t2), produces rebuilt encoded data slices (e.g., rebuilt encoded data slices 10-18 of time frame t1-t2) from the recovered encoded data slices, and sends, via the network 24, the rebuilt encoded data slices 10-18 to the newly available storage units 10-18.

As another specific example of the accessing of the data, the DST processing unit 16 sends a re-integration data segment write request to the first and second groups of storage units when the second group of storage units has reestablished that the at least the decode threshold number of encoded data slices of the corresponding unique subset of encoded data slices is available, where the re-integration data segment write request is regarding the at least the decode threshold number of encoded data slices. For example, the DST processing unit 16 issues a write threshold number (e.g., 11) of write slice requests, via the network 24, to the storage units 8-9 (e.g., write slice requests 8-9 and to the storage units 10-18 (e.g., write slice requests 10-18) during a third time frame t2-t3.

As yet another specific example of the accessing of the data, the DST processing unit 16 sends a re-integration data segment read request to the first group of storage units when the second group of storage units has reestablished that the at least the decode threshold number of encoded data slices of the corresponding unique subset of encoded data slices is available, where the re-integration data segment read request is regarding the second number of encoded data slices. For example, the DST processing unit 16 issues a read threshold number (e.g., 8) of read slice requests, via the network 24, to the storage units 1-8 (e.g., read slice requests 1-8).

Figure 41D:
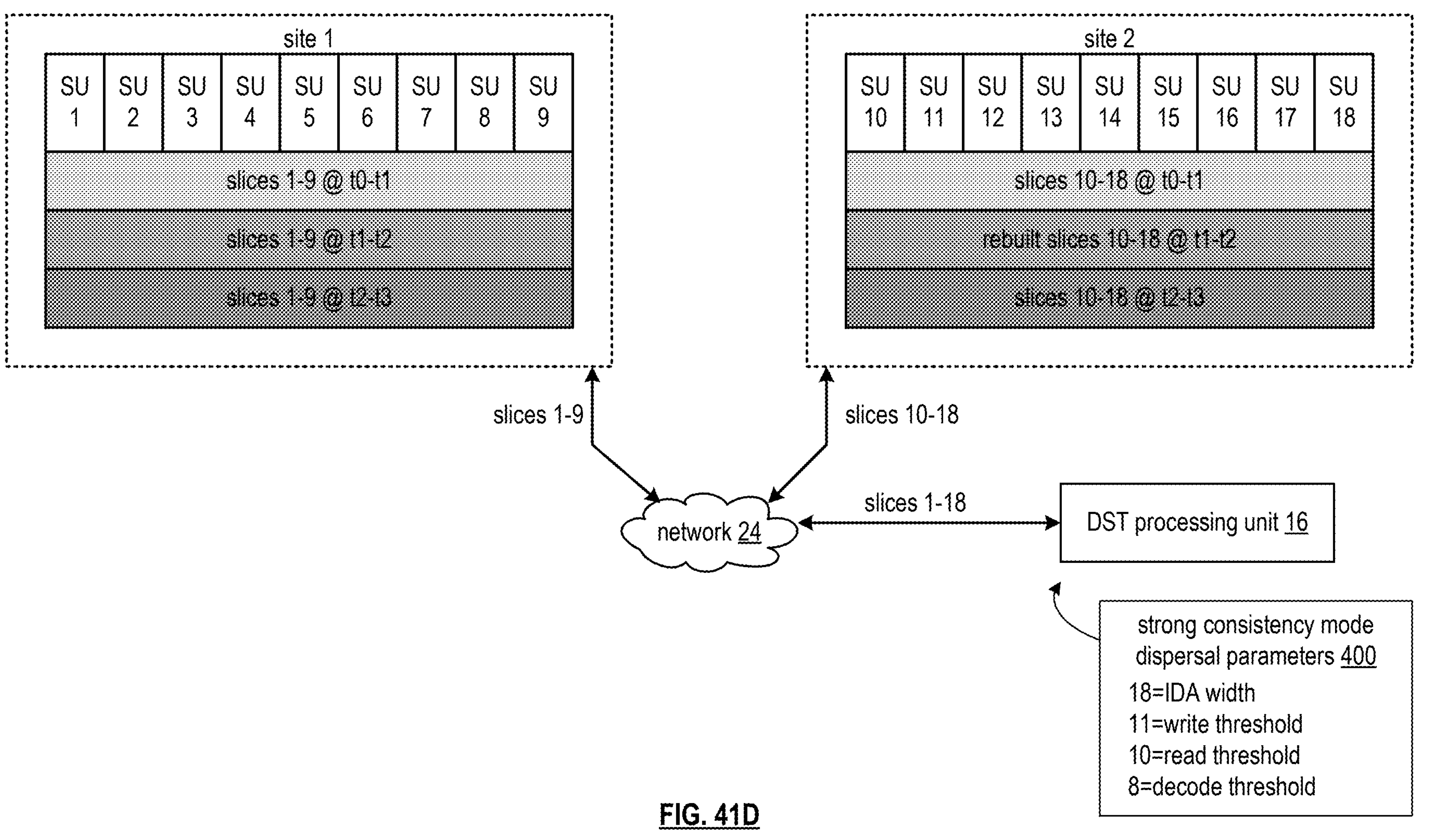

FIG. 41D illustrates an example of operation where the DSN operates in the strong consistency mode again to return to use of the normal data segment access request when the rebuilding has been completed. When returning to use of the normal data segment access request, the DST processing unit 16 re-establishes the newly available storage units as write and read access enabled. The DST processing unit 16 updates the read threshold level associated with the strong consistency mode. For instance, the DST processing unit 16 changes the read threshold from 8 to 10. When utilizing the normal data segment access request, the DST processing unit 16 issues, via the network 24, slice access requests 1-18, to the two or more groups of storage units.

Figure 41E:
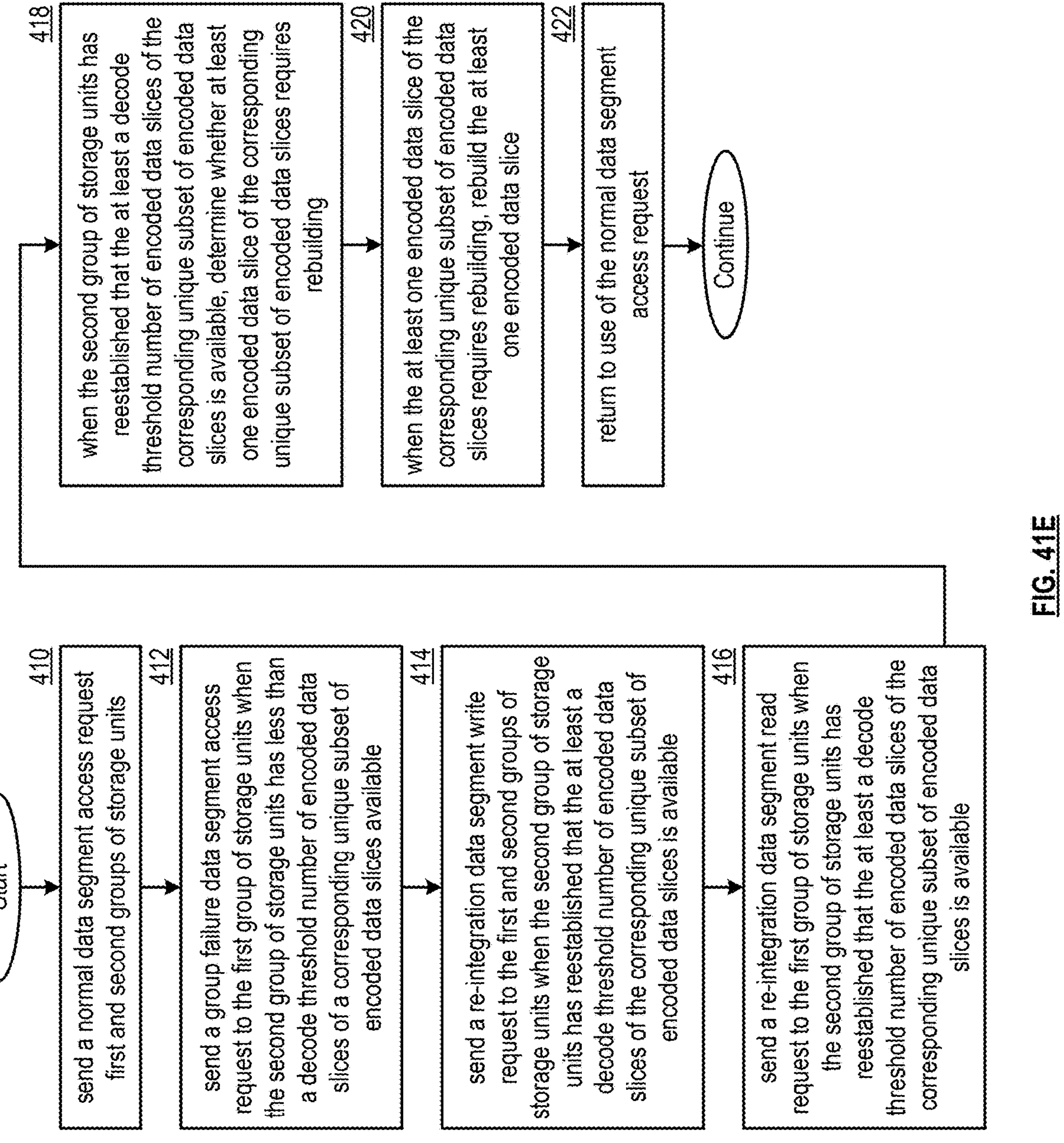
FIG. 41E is a flowchart illustrating an example of synchronizing stored data in accordance with the present disclosure.

FIG. 41E is a flowchart illustrating an example of synchronizing stored data. In particular, a method is presented for use in conjunction with one or more functions and features described in conjunction with FIGS. 1-39, 41A-D, and also FIG. 41E. A method begins or continues execution with step 410 by one or more processing modules of one or more computing devices of a dispersed storage network (DSN) that stores a set of encoded data slices, where a data segment is dispersed storage error encoded into the set of encoded data slices, where the set of encoded data slices includes a width number of encoded data slices, where the data segment is recoverable from a decode threshold number of encoded data slices of the set of encoded data slices, and where the width number is equal to or greater than two times the decode threshold number, where the processing module (e.g., a requesting entity) sends a normal data segment access request to first and second groups of storage units of the DSN.

Each of the first and second groups of storage units is allocated a unique subset of encoded data slices of the set of encoded data slices, where each unique subset of encoded data slices includes at least the decode threshold number of encoded data slices, and where the normal data segment access request is regarding a first number of encoded data slices of the set of encoded data slices that exceeds the at least the decode threshold number of encoded data slices in each of the unique subsets of encoded data slices. For example, the processing module sends a normal data segment read request as the normal data segment access request to the first and second groups of storage units of the DSN, receives first encoded data slices of the unique subset of encoded data slices stored by the first group of storage units, receives second encoded data slices of the unique subset of encoded data slices stored by the second group of storage units, and determines data consistency of the first and second encoded data slices.

The method continues at step 412 where the processing module sends a group failure data segment access request to the first group of storage units when the second group of storage units has less than the decode threshold number of encoded data slices of the corresponding unique subset of encoded data slices available, where the group failure data segment access request is regarding a second number of encoded data slices of the set of encoded data slices that is equal to or less than the at least the decode threshold number of encoded data slices in each of the unique subsets of encoded data slices and is equal to or greater than the decode threshold number. When the second group of storage units has less than the decode threshold number of encoded data slices of the corresponding unique subset of encoded data slices available and the group failure data segment access request is a read request, the processing module establishes the second number as a read threshold number. When the second group of storage units has less than the decode threshold number of encoded data slices of the corresponding unique subset of encoded data slices available and the group failure data segment access request is a write request, the processing module establishes the second number as a write threshold number.

The method continues at step 414 where the processing module sends a re-integration data segment write request to the first and second groups of storage units when the second group of storage units has reestablished that the at least the decode threshold number of encoded data slices of the corresponding unique subset of encoded data slices is available, where the re-integration data segment write request is regarding the at least the decode threshold number of encoded data slices. The method continues at step 416 where the processing module sends a re-integration data segment read request to the first group of storage units when the second group of storage units has reestablished that the at least the decode threshold number of encoded data slices of the corresponding unique subset of encoded data slices is available, where the re-integration data segment read request is regarding the second number of encoded data slices.

When the second group of storage units has reestablished that the at least the decode threshold number of encoded data slices of the corresponding unique subset of encoded data slices is available, the method continues at step 418 where the processing module determines whether at least one encoded data slice of the corresponding unique subset of encoded data slices requires rebuilding. When the at least one encoded data slice of the corresponding unique subset of encoded data slices requires rebuilding, the method continues at step 420 where the processing module rebuilds the at least one encoded data slice. The method continues at step 422 where the processing module returns to use of the normal data segment access request (e.g., loops back to step 410).

Alternatively, or in addition to, the processing module facilitates storing, by a plurality of groups of storage units, the set of encoded data slices, where the width number is equal to or greater than n times the number of groups in the plurality of groups, and where the plurality of groups of storage units includes the first and second groups of storage units, where each of the plurality of groups of storage units is allocated a unique subset of encoded data slices of the set of encoded data slices. The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figures 42A, 42B:
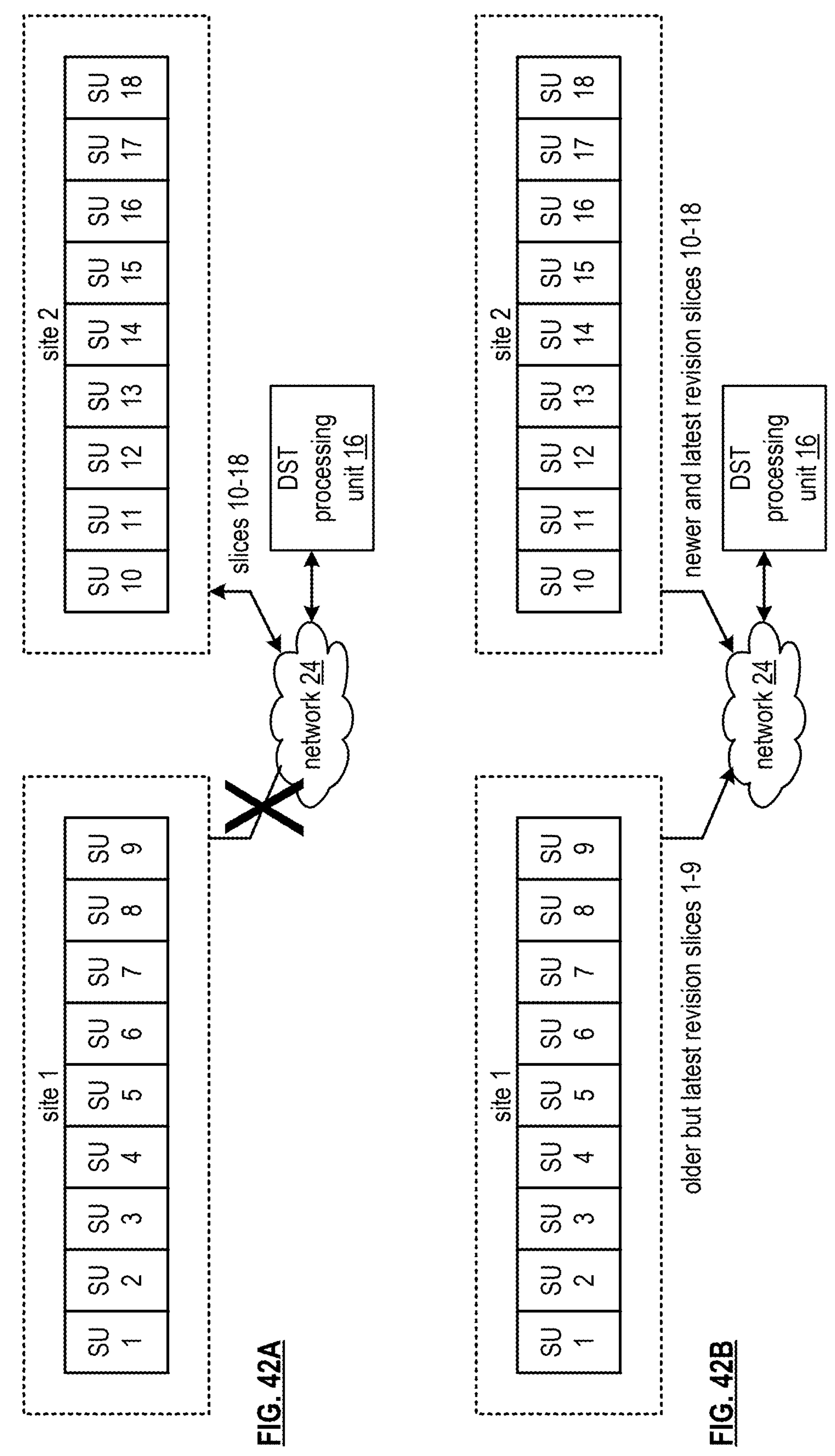
FIGS. 42A-42B are schematic block diagrams of a dispersed storage network (DSN) in accordance with the present disclosure.

FIGS. 42A-B are schematic block diagrams of another example of a dispersed storage network (DSN). The DSN may be implemented with the DSN of FIG. 40A. The DSN functions to synchronize stored data when recovering from a site failure. FIG. 42A illustrates an example of operation where the DSN operates in an impaired mode when site 1 is unavailable and utilizes impaired mode dispersal parameters. For example, the DST processing unit 16 accesses, via the network 24, the storage units 10-18 at the site 2 to store and retrieve encoded data slices 10-18 while the DSN is in the impaired mode. As such, up-to-date data is maintained as long as site 2 continues to include at least a decode threshold number of available storage units. Read and write thresholds may be reduced during this timeframe.

FIG. 42B illustrates an example of operation when the DSN transitions from the impaired mode to the consistency mode as the storage units associated with site 1 become available. The DST processing unit 16 detects that the previously unavailable site 1 is now available. The detecting includes at least one of interpreting an error message and receiving a status indicator.

Having detected that the previously unavailable site 1 is now available, the DST processing unit 16 initiates rebuilding of missing encoded data slices of the now available site 1. For example, the DST processing unit 16 identifies missing encoded data slices (e.g., by listing revisions of newer and latest revision encoded data slices 10-18 from site 2 and comparing to associated older but latest revision encoded data slices 1-9 from site 1), retrieving encoded data slices from site 2 associated with the missing encoded data slices, generating rebuilt encoded data slices from the retrieved encoded data slices (e.g., decode, re-encode), and storing the rebuilt encoded data slices in the storage units of site 1.

Having initiating the rebuilding, the DST processing unit 16 receives a read data request to recover data previous to completion of the rebuilding. The DST processing unit 16 identifies storage units associated with the most recent revision of the data. For example, the DST processing unit 16 prioritizes utilizing storage units of a site (e.g., site 2) that remained active during the impaired mode. As another example, the DST processing unit 16 accesses a dispersed hierarchical index to recover an entry that indicates where the most recent revision of the data was stored (e.g., site 2 only, site 2 and 1, site 1 only) and selects storage units of a site associated with storage of the desired data. Having identified the storage units, the DST processing unit 16 accesses the identified storage units to recover encoded data slices for decoding to reproduce the data.

Figure 42C:
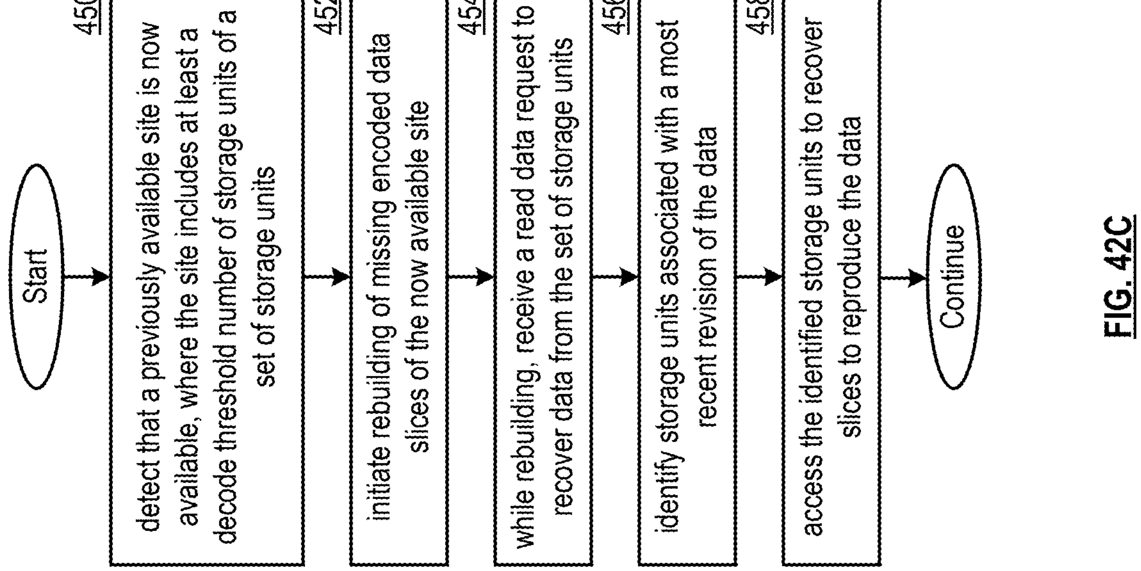
FIG. 42C is a flowchart illustrating another example of synchronizing stored data in accordance with the present disclosure.

FIG. 42C is a flowchart illustrating another example of synchronizing stored data. The method begins or continues at step 450 where a processing module (e.g., of a distributed storage and task (DST) processing unit) detects that a previously available site is now available, where the site includes at least the decode threshold number of storage units of a set of storage units. For example, the processing module interprets an error message. As another example, the processing module receives a status indicator that a site is now online.

The method continues at step 452 where the processing module initiates rebuilding of missing encoded data slices of the now available site. For example, the processing module detects missing encoded data slices, retrieves other encoded data slices from another site, generates rebuilt encoded data slices from the retrieved encoded data slices, and stores the rebuilt encoded data slices in storage units of the now available site.

When rebuilding, the method continues at step 454 where the processing module receives a read data request to recover data from the set of storage units. The method continues at step 456 where the processing module identifies storage units associated with a most recent revision of the data. For example, the processing module determines that the data was not stored during an impaired mode and retrieves encoded data slices from any of the storage units of the set of storage units (e.g., including from the now available site). As another example, the processing module determines that the data was stored during the impaired mode and retrieves the encoded data slices from storage units of another site that was available during the impaired mode.

The method continues at step 458 where the processing module accesses the identified storage units to recover encoded data slices to reproduce the data. For example, the processing module issues read slice requests to the identified storage units, receives encoded data slices, and dispersed storage error decodes the received encoded data slices to reproduce the data.

Figures 43A, 43B:
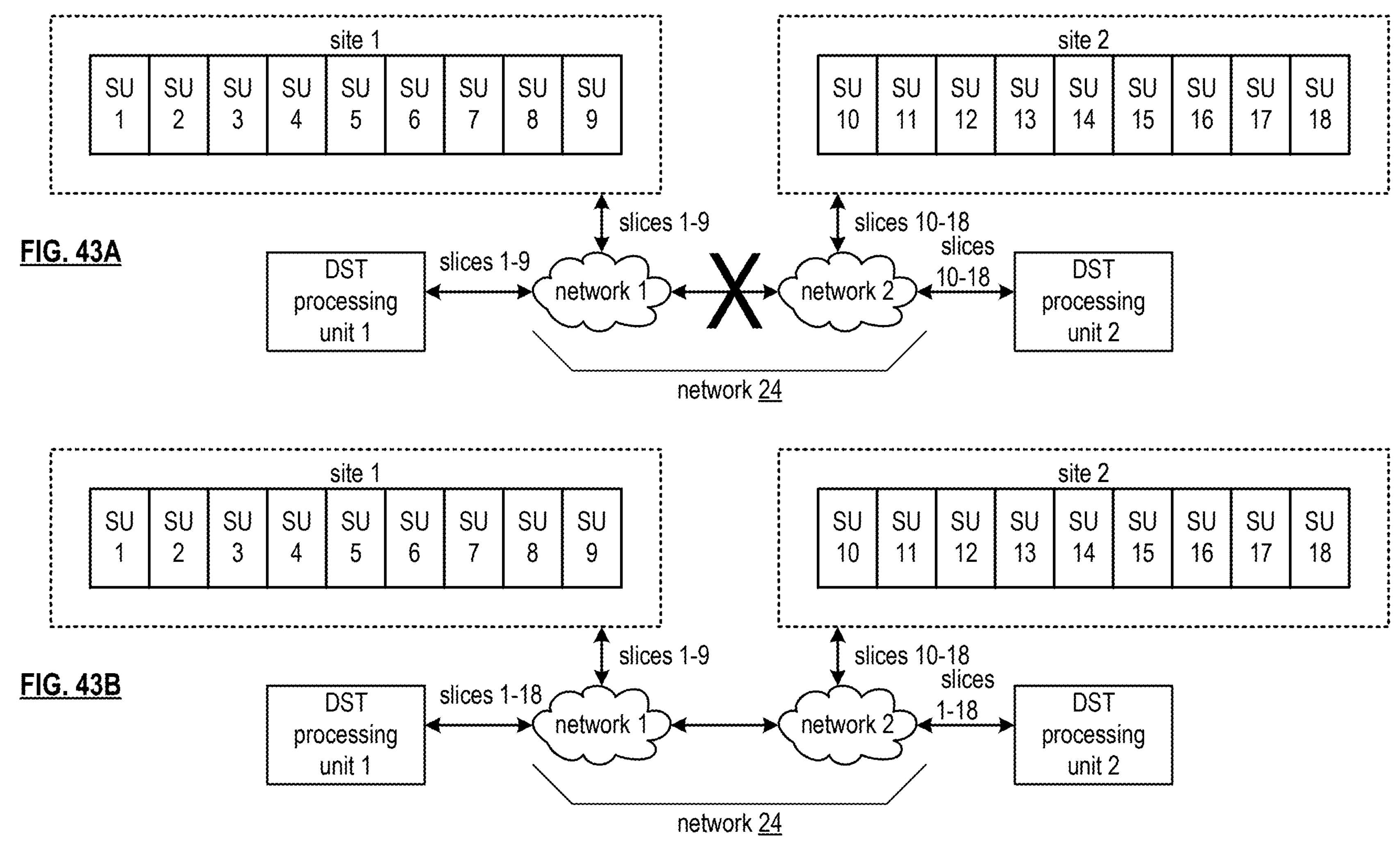
FIGS. 43A-43B are schematic block diagrams of a dispersed storage network (DSN) in accordance with the present disclosure.

FIGS. 43A-B are schematic block diagrams of another example of a dispersed storage network (DSN) that includes the DSN of FIG. 40A and DST processing units 1-2, where the network 24 may experience an outage that bifurcates the network 24 into a network 1 and a network 2. Each DST processing unit 1-2 may be implemented utilizing the DST processing unit 16 of FIG. 40A.

FIG. 43A illustrates an example of operation during the outage, where the DST processing unit 1 may access, via the network 1, the site 1 and the DST processing unit 2 may access, via the network 2, the site 2. During the outage, each DST processing unit 1-2 may continue to store new data at the sites 1-2 based on connectivity provided by networks 1-2. Each DST processing unit detects the outage and generates an operation log entry. The detecting includes at least one of issuing a query, interpreting a query response, initiating a test, interpreting a test result, issuing a write request, and interpreting a write response. The DST processing unit generates the operation log entry to include one or more of slice names and revision numbers associated with failed write slice requests, storage unit identifiers associated with the write failures, and a site identifiers associated with storage units of the write failures. As an example of operation subsequent to detecting the write failures, the DST processing unit 1 accesses, via the network 1, encoded data slices 1-9 at the storage units of site 1 and the DST processing unit 2 accesses, via the network 2, encoded data slices 10-18 at the storage units of site 2.

In an example of operation of detecting the write failures and generating the operation log, the DST processing unit 1 attempts to send, via the network 24, a set of encoded data slices 1-18 to the set of storage units 1-18. The DST processing unit 1 detects a write failure to site 2. Hereafter, the storage units associated with a site made be interchangeably referred to as a partition of the set of storage units, a subset of storage units, or a storage target. Having detected the write failure, the DST processing unit 1 generates the operation log entry to identify site 2 and slice names associated with encoded data slices generated for storage in storage units 10-18. The DST processing unit 1 stores the operation log entry in one or more of a local memory and in a dispersed hierarchical index stored in storage units of site 1. Alternatively, or in addition to, the DST processing unit 1 indicates that subsequent reads associated with the slice names of the write failure may not be guaranteed to recover a most recent written revision.

FIG. 43B illustrates an example of operation of synchronizing the stored data when the unavailable site becomes available. In the example of operation of the synchronizing of the stored data, the DST processing unit 1 detects restoration of storage units associated with the previous write failure. For example, the DST processing unit 1 detects the restoration of access to site 2. In a similar fashion, as another example, DST processing unit 2 detects the restoration of access to site 1.

Having detected the restoration, the DST processing unit identifies uncompleted write operations. For example, the DST processing unit 1 accesses operation logs (e.g., generated by all DST processing units) to identify the uncompleted write operations. Having identified the uncompleted write operations, the DST processing unit facilitates completion of the write operations. For example, DST processing unit 1 facilitates rebuilding of encoded data slices to be stored in storage units of site 2 based on the operation logs associated with DST processing unit 1. For instance, the DST processing unit 1 identifies missing encoded data slices 10-18, retrieves encoded data slices 1-9, generates rebuilt encoded data slices 10-18 using the retrieved encoded data slices 1-9, and stores, via the network 24, the rebuilt encoded data slices 10-18 in the storage units 10-18 of site 2. Upon completion of rebuilding encoded data slices, the DST processing unit indicates that subsequent read operations are guaranteed to recover the most recently written revisions.

Figure 43C:
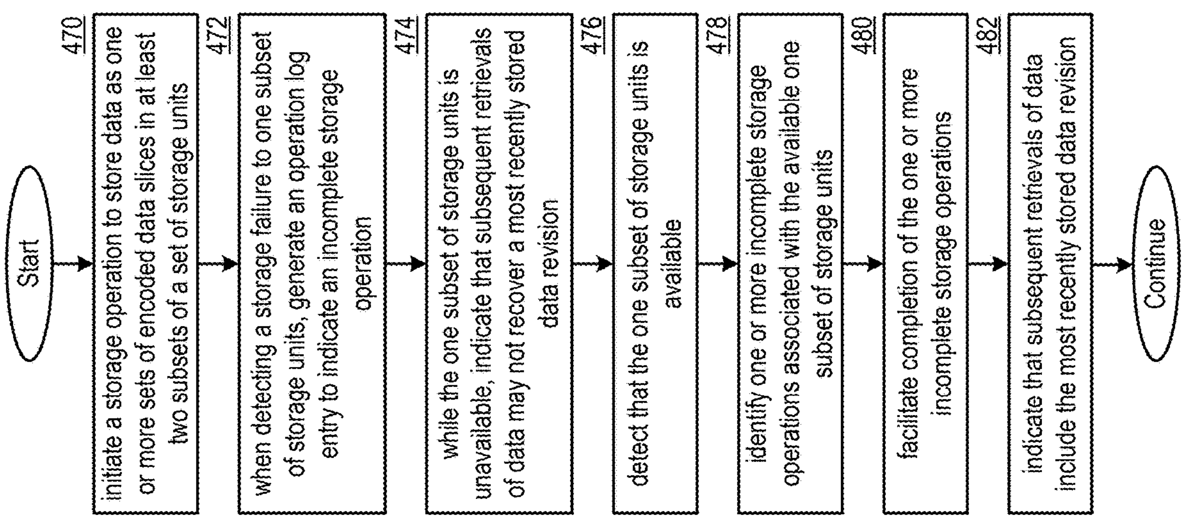
FIG. 43C is a flowchart illustrating another example of synchronizing stored data in accordance with the present disclosure.

FIG. 43C is a flowchart illustrating another example of synchronizing stored data. The method begins or continues at step 470 where a processing module (e.g., of a distributed storage and task (DST) processing unit) initiates a storage operation to store data as one or more sets of encoded data slices in at least two subsets of a set of storage units. For example, the processing module dispersed storage error encodes the data to produce the one or more sets of encoded data slices, identifies the at least two subsets of the set of storage units, and sends the one or more sets of encoded data slices to the set of storage units.

When detecting a storage failure to one subset of storage units, the method continues at step 472 where the processing module generates an operation log entry to indicate an incomplete storage operation. The detecting includes at least one of receiving an error message and detecting that a wait timeframe has expired without receiving a write slice response. The generating includes generating the operation log entry to include one or more of slice names of the write slice responses corresponding to the storage failure, storage unit identifiers, and a side identifier. The generating may further include the processing module storing the operation log entry in at least one of a local memory and a dispersed hierarchical index associated with an available subset of storage units.

While the one subset of storage units is unavailable, the method continues at step 474 where the processing module indicates that subsequent retrievals of data may not recover a most recently stored data revision. For example, the processing module sets a status indicator associated with slice names associated with the one subset of storage units. The method continues at step 476 where the processing module detects that the one subset of storage units is available. The detecting includes at least one of interpreting a status indicator, initiating a test, and interpreting a test result.

The method continues at step 478 where the processing module identifies one or more incomplete storage operations associated with the available one subset of storage units. For example, the processing module accesses the operation log entry and interprets the entry to identify the one or more incomplete storage operations. For instance, the processing module identifies slice names associated with missing slices of the one subset.

The method continues at step 480 where the processing module facilitates completion of the one or more incomplete storage operations. For example, the processing module generates a rebuilt encoded data slice utilizing retrieved encoded data slices from another subset of storage units and stores the rebuilt encoded data slices and the one subset of storage units. The method continues at step 482 where the processing module indicates that subsequent retrievals of data includes the most recently stored data revision. For example, the processing module sets the status indicator associated with the slice names of the one subset of storage units. As another example the processing module deletes this task indicator associated with the slice names of the one subset of storage units.

Figures 44A, 44B:
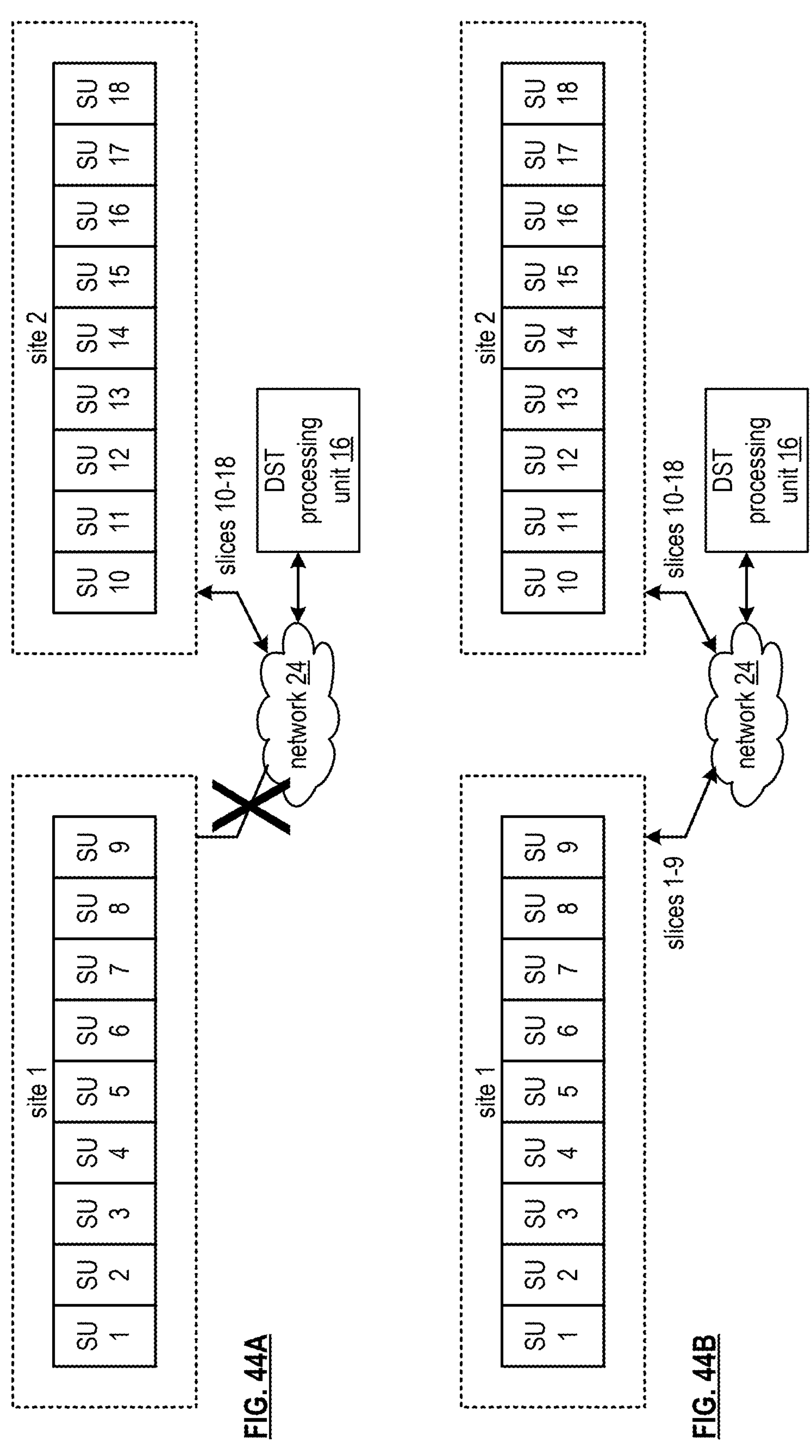
FIGS. 44A-44B are schematic block diagrams of a dispersed storage network (DSN) in accordance with the present disclosure.

FIGS. 44A-B are schematic block diagrams of another example of a dispersed storage network (DSN). The DSN may be implemented utilizing the DSN of FIG. 40A. The DSN functions to synchronize stored data when recovering from a site failure. FIG. 44A illustrates an example of operation where the DSN operates in the impaired mode when site 1 is unavailable and utilizes impaired mode dispersal parameters. As a specific example, the DST processing unit 16 accesses, via the network 24, the storage units 10-18 at the site 2 to store and retrieve encoded data slices 10-18 while the DSN is in the impaired mode. As such, up-to-date data is maintained as long as site 2 continues to include at least a decode threshold number of available storage units. Read and write thresholds may be reduced during this timeframe.

As another specific example, the DST processing unit 16 initiates a write/delete operation to storage units at site 1 and site 2. For instance, the DST processing unit 16 sends, via the network 24, encoded data slices 1-9 to the storage units 1-9 at site 1 and sends, via the network 24, encoded data slices 10-18 to the storage units 10-18 at site 2. The DST processing unit 16 generates an operation log entry to include attributes associated with the write/delete operation (e.g., storage unit identifiers, slice names associated with encoded data slices 1-18). The DST processing unit 16 stores the operation log entry in one or more of a local memory and in a dispersed hierarchical index stored in at least a decode threshold number of storage units of the set of storage units. When detecting unavailability of one of the sites, the DST processing unit 16 indicates that subsequent reads associated with the slice names that correspond to storage units of the unavailable site may not be guaranteed to recover a most recent written revision.

FIG. 44B illustrates an example of operation when the DSN transitions from the impaired mode to the consistency mode as the storage units associated with site 1 become available. The DST processing unit 16 detects that the previously unavailable site 1 is now available. The detecting includes at least one of interpreting an error message and receiving a status indicator.

Having detected that the previously unavailable site is now available, the DST processing unit 16 determines an eventual consistent approach of a plurality of approaches. The plurality of approaches includes at least one of a retain all file revisions approach where older revisions are never deleted, a retain the latest file revision approach where older revisions are deleted, and a merge fields of multiple files approach where multiple fields of metadata stored in multiple files are merged into one composite file for storage. The determining includes at least one of interpreting a system registry, receiving an input, selecting based on a data type, and selecting based on available DSN storage capacity.

Having determined the eventual consistent approach, the DST processing unit 16 synchronizes store data between the two or more sites based on eventual consistent approach. For example, the DST processing unit 16 rebuilds missing slices of each revision when a retain all file revisions approach is determined. As another example, the DST processing unit 16 rebuilds encoded data slices of just latest revisions and delete slices of other revisions when a only retain latest file revision approach is determined. As yet another example, the DST processing unit 16 recovers each version of each revision, merges fields into one file, stores the one file, and deletes all other revisions when a merge fields approach has been determined.

Figure 44C:
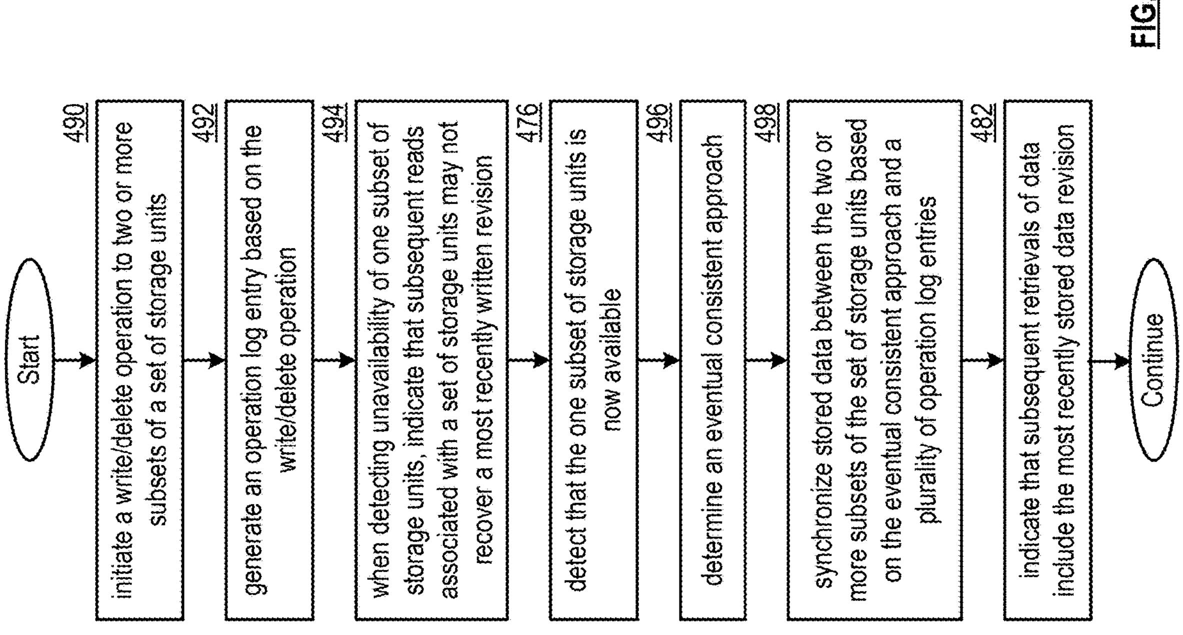
FIG. 44C is a flowchart illustrating another example of synchronizing stored data in accordance with the present disclosure.

FIG. 44C is a flowchart illustrating another example of synchronizing stored data, which include similar steps to FIG. 43C. The method begins or continues at step 490 where a processing module (e.g., of a distributed storage and task (DST) processing unit) initiates a write/delete operation to two or more subsets of a set of storage units. The initiating includes issuing write slice requests to the two or more subsets of storage units.

The method continues at step 492 where the processing module generates an operation log entry based on the write/delete operation. The generating includes generating the operation log to include one or more of slice names, storage unit identifiers, a sight identifier, and a write or delete indicator. Alternatively, the processing module skips the step of generating the operation log entry in favor of subsequent scanning to resolve storage of slices of the different revisions.

When detecting unavailability of one subset of storage units, the method continues at step 494 where the processing module indicates that subsequent reads associated with a set of storage units may not recover a most recently written revision. The processing module detects the unavailability of the one subset of storage units by at least one of receiving an error message and receiving a status message. As an example of indicating that subsequent reads may not recover a most recently written revision, the processing module issues a message indicating that the subsequent reads associated with a set of storage units may not recover most recently written revisions of stored data. Alternatively, the processing module may skip the indication step.

The method continues with step 476 of FIG. 43C where the processing module detects that one subset of storage units is now available. The method continues at step 496 where the processing module determines an eventual consistent approach. The determining includes at least one of interpreting a system registry, receiving a manager input, and interpreting a storage reliability goal.

The method continues at step 498 where the processing module synchronizes stored data between the two or more subsets of the set of storage units based on the eventual consistent approach and a plurality of operation log entries. As a specific example of the synchronizing, the processing module rebuilds missing slices from each revision when the approach is to retrain all file revisions. As another specific example of the synchronizing, the processing module rebuilds slices of a latest revision and deletes slices of other revisions when the approaches to store the latest revision. As yet another specific example of the synchronizing, the processing module recovers revisions, merges data to produce a new file, and stores the new file when the approach is to merge fields. The processing module may identify desired stored revisions based on the plurality of operation log entries. The processing module may further identify actual stored revisions by performing list slice operations. When the stored data has been synchronized, the method continues with step 482 of FIG. 43C where the processing module indicates that subsequent retrievals of data includes the most recently stored data revisions.

Figure 45A:
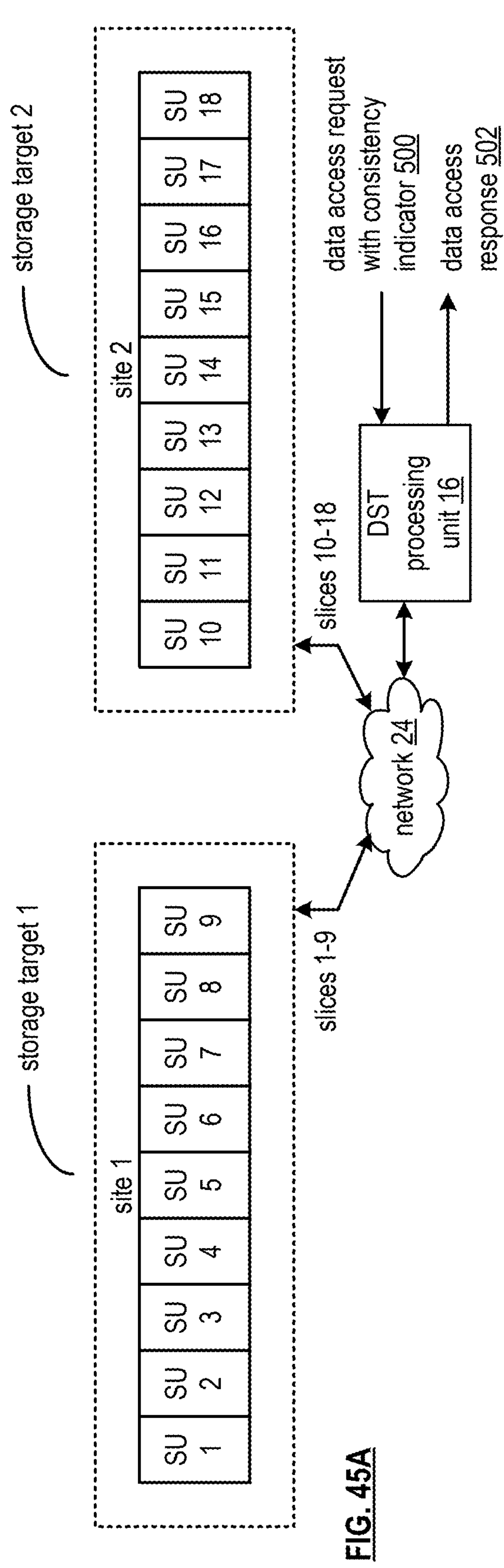
FIG. 45A is a schematic block diagram of a dispersed storage network (DSN) in accordance with the present disclosure.

FIG. 45A is a schematic block diagram of another example of a dispersed storage network (DSN). The DSN may be implemented utilizing the DSN of FIG. 40A. The DSN functions to access data stored in the set of storage units 1-18.

Some situations or applications require strongly consistent operations. For example, something like a data structure can only be updated in valid ways when the latest version of the components of the data structure are known. Therefore, when using an eventually consistent DSN memory, it may be impossible to implement certain applications or use cases.

To overcome this limitation, a read or write request to a DS processing unit may indicate whether the read or write must be made with full consistency guarantees. To support strongly consistent operations in a DSN memory having multiple storage targets, the concept of a read threshold and write threshold must be extended to also indicate the number of storage targets, such that a strongly consistent read must succeed against a "read storage target threshold" number of storage targets, while a strongly consistent write must succeed against a "write storage target threshold" number of storage targets, where (read storage target threshold+write storage target threshold>number of storage targets). For example, with "read storage target threshold=1" then "write storage target threshold=number of storage targets" or with "read storage target threshold=number of storage targets" then "write storage target threshold=1", or they may be any other number such that their sum is greater than the number of storage targets.

When a requester performs a read request and does not send an indicator to make the read strongly consistent or otherwise sends a weak consistency indicator, then the DS processing unit may read from only a single storage target and return whatever result it gets from that storage target (which is not guaranteed to be the latest). However, if the read strongly consistent indicator is sent with the request, then the DS processing unit must read from at least a read storage target threshold number of storage targets, and return the latest discovered version of that object. This result is guaranteed to be the latest version of any strongly consistent write operation that was performed. Note that when write storage target threshold=1, then all writes may be considered strongly consistent, but only strongly consistent reads are guaranteed to see the latest version.

When a write request does not include an indicator to perform a strongly consistent write or otherwise sends a weak consistency indicator, then the DS processing unit may return success after writing to at least one storage target and writing an entry to an operation log in the event of failures. If, however, the request includes a strongly consistent write indicator, the DS processing unit must write to at least a write storage target threshold number of storage targets before returning success. If the DS processing unit cannot reach this threshold, it will return a failure indicator, and also optionally indicate the number of storage locations it was able to write to. Note that even in cases where a write request was not requested to be strongly consistent, a DS processing unit may still succeed in performing the operation against all storage targets. In this case the DS processing unit may return an indicator to the requester to notify the requester that the write was made strongly consistent.

In an example of operation of the accessing of the data, the DST processing unit 16 receives a data access request with consistency indicator 500. For example, the consistency indicator can indicate a threshold number of storage targets, where the set of storage targets includes two or more storage targets each representing a different storage site (e.g., site 1, site 2, etc.) and where each storage target includes at least a decode threshold number of storage units. As such, the consistency indicator indicates a minimum number of storage targets to be utilized in the accessing of the data.

The request further includes at least one of a read data request or a write data request. The threshold number indicates one of a read storage targets threshold and a write storage target threshold, where the read storage target threshold plus the write storage target threshold is greater than a number of storage targets when providing strong data consistency. For example, the write storage target threshold is 2 when the read storage target threshold is 1 and the number of storage targets is 2. As another example, the read storage target threshold is 1 when the write storage target threshold is 2 and the number of storage targets is 2.

Having received the data access request with consistency indicator 500, the DST processing unit 16 accesses a threshold number of storage targets to perform the data access request. For example, the DST processing unit 16 accesses storage units of one storage target when the threshold number is 1. As another example, the DST processing unit 16 accesses all storage units of storage targets 1 and 2 when the threshold number is 2. The accessing includes issuing, via the network 24, either read slice requests or write slice requests.

Having accessed the threshold number of storage targets, the DST processing unit 16 issues a data access response 502 to a requesting entity based on the accessing of the threshold number of storage targets. For example, the DST processing unit 16 issues a data access response 502 that includes a status indicator indicating a number of storage targets accessed when writing data. As another example, the DST processing unit 16 issues another data access response 502 that includes the latest revision of data and the status indicator indicating the number of storage targets accessed when reading the data.

Figure 45B:
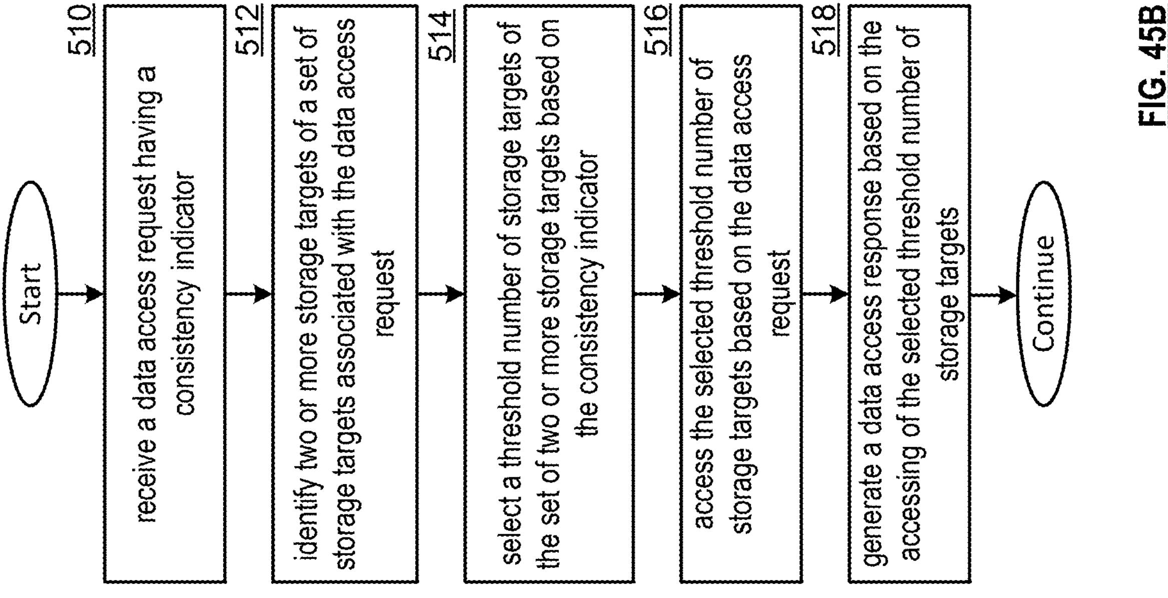
FIG. 45B is a flowchart illustrating another example of accessing a set of storage units in accordance with the present disclosure.

FIG. 45B is a flowchart illustrating another example of accessing a set of storage units. In particular, a method is presented for use with any of the examples disclosed herein. In step 510 where a processing module (e.g., of a distributed storage and task (DST) or other DS processing unit) receives a data access request having a consistency indicator. The consistency indicator can be a strong consistency indicator or a weak consistency indicator that indicates a relatively weaker consistency when compared with the strong consistency indicator. For example, the consistency indicator can indicate a threshold number of storage targets, where the set of storage targets includes two or more storage targets (e.g., site 1, site 2) and where each storage target includes at least a decode threshold number of storage units. As such, the consistency indicator indicates a minimum number of different sites to be utilized in the accessing of the data.

In step 512, the processing module identifies two or more storage targets of a set of storage units associated with the data access request. The identifying can include at least one of interpreting system registry information, receiving an input, initiating a query, and interpreting a query response.

In step 514, the processing module selects a threshold number of storage targets of the two or more storage targets based on the consistency indicator. The selecting includes at least one of interpreting an operation log to identify a most recent revision, interpreting an error message, and interpreting the system registry information, and receiving an input.

In step 516, the processing module accesses the selected threshold number of storage targets based on the data access request. For example, when writing data, the processing module issues read slice requests to storage units associated with the selected storage targets and receives read slice responses. As another example, when reading data, the processing module issues read slice requests to the storage units associated with the selected storage targets, receives read slice responses, identifies a most recent revision, and decode slices associated with the most recent revision to reproduce the data. The accessing may further include identifying the number of storage targets utilized.

In step 518, the processing module generates a data access response based on the accessing of the selected threshold number of storage targets. For example, when writing the data, the processing module indicates the number of storage targets accessed. As another example, when reading the data, the processing module indicates the number of storage targets accessed and generates the data access response to include the data that was read.

In a further example of operation, when the data access request corresponds to a write request, the threshold number of storage targets corresponds to a write storage target threshold. When the data access request corresponds to a read request, the threshold number of storage targets corresponds to a read storage target threshold, and wherein the sum of the write storage target threshold and the read storage target threshold is greater that a number of the set of two or more storage targets.

In various examples, a non-transitory computer readable storage medium includes at least one memory section that stores operational instructions that, when executed by a processing system of a dispersed storage network (DSN) that includes a processor and a memory, causes the processing system to perform operations including: receiving a data access request having a consistency indicator; identifying a set of two or more storage targets associated with the data access request; selecting a threshold number of storage targets of the two or more storage targets, based on the consistency indicator; accessing the selected threshold number of storage targets based on the data access request; and generating a data access response, based on the accessing of the selected threshold number of storage targets.

Figure 46A:
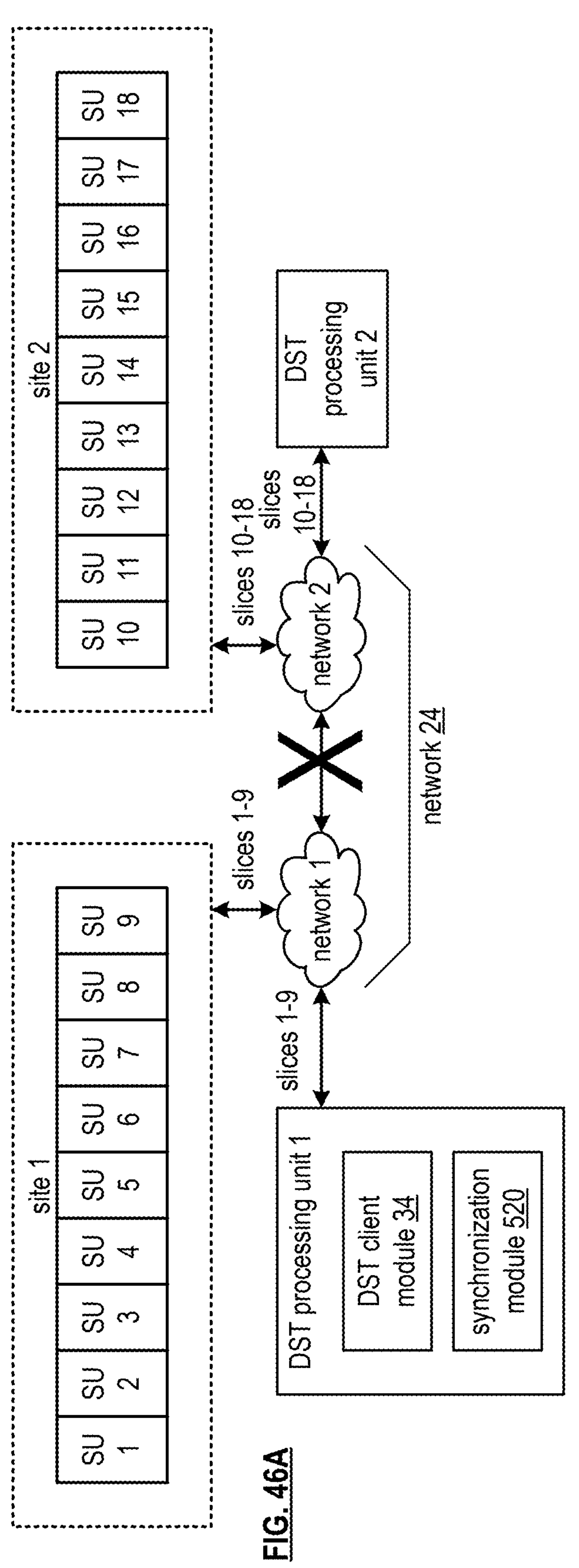
FIG. 46A is a schematic block diagram of a dispersed storage network (DSN) in accordance with the present disclosure.

FIG. 46A is a schematic block diagram of an example of a dispersed storage network (DSN). The DSN may be implemented utilizing the DSN of FIG. 43A. The DST processing units 1-2 further includes the distribute storage and task (DST) client module 34 of FIG. 1 and a synchronization module 520. The synchronization module 520 may be implemented utilizing the processing module 84 of FIG. 3. The DSN functions to access data stored in the set of storage units and to synchronize store data when transitioning from the impaired mode to the strong consistency mode.

In an example of operation, the DST client module 34 of DST processing unit 1 initiates writing data to two or more sites (e.g., to two or more partitions). For example, the DST client module 34 dispersed storage error encodes a data segment to produce a set of encoded data slices 1-18, sends, via the network 1, encoded data slices 1-9 to the site 1 (e.g., a first partition) and attempts to send, via the network 2, encoded data slices 10-18 to the site 2 (e.g., a second partition).

Having sent the encoded data slices 10-18 to the site 2, the DST client module 34 detects a write failure to site 2 (e.g., does not receive favorable write slice responses within a time frame). Having detected the write failure, the DS client module 34 generates an operation log entry to indicate the write failure (e.g., storing slice names, a storage unit identifier, and a site identifier).

The synchronization module 520 initiates synchronization of stored revisions of data across the two or more sites when the two or more sites are again available. For example, the synchronization module 520 retrieves encoded data slices 1-9 corresponding to missing revisions of encoded data slices associated with site 2, generates a rebuilt encoded data slices 10-18 from the retrieved encoded data slices, and stores the rebuilt encoded data slices in the storage units of site 2.

To enable stabilization of the synchronization of the store data and further writing, the synchronization module 520 inhibits further writing of data by the DST client module 34 while a threshold number of synchronization operations remain open. When the threshold number of synchronization operations have completed, the synchronization module 520 enables the further writing of the data.

Figure 46B:
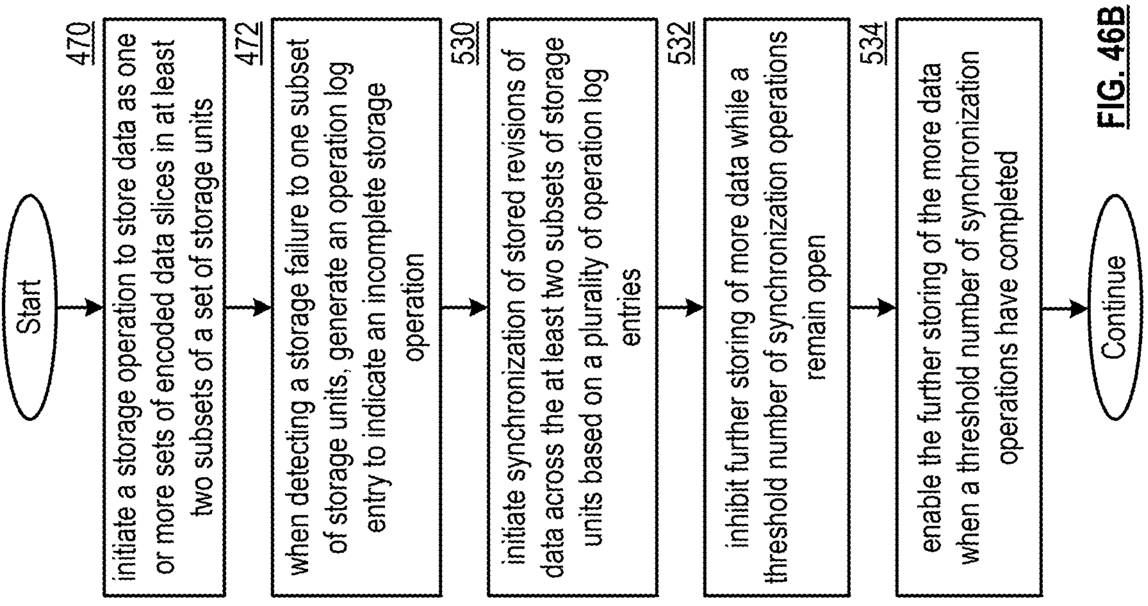
FIG. 46B is a flowchart illustrating another example of synchronizing stored data in accordance with the present disclosure.

FIG. 46B is a flowchart illustrating another example of synchronizing stored data, which include similar steps to FIG. 43C. The method begins or continues with steps 470 and 472 of FIG. 43C where a processing module (e.g., of a distributed storage and task (DST) processing unit) initiates a storage operation to store data as one or more sets of encoded data slices in at least two subsets of a set of storage units and when detecting a storage failure to one subset of storage units, generates an operation log entry to indicate an incomplete storage operation.

The method continues at step 530 where the processing module initiates synchronization of stored revisions of data across the at least two subsets of storage units based on a plurality of operation log entries. The initiating includes detecting that the two or more subsets of storage units are available. The initiating further includes obtaining the plurality of operation log entries, identifying missing encoded data slices, rebuilding rebuilt encoded data slices corresponding to the missing encoded data slices, and storing the rebuilt encoded data slices.

The method continues at step 532 where the processing module inhibits further storing of more data while a threshold number of synchronization operations remain open. When a threshold number of synchronization operations have been completed, the method continues at step 534 where the processing module enables the further storing of the more data. For example, the processing module detects that the threshold number of synchronization operations have been completed and indicates that the storing of the data is enabled. The method may look back to the step where the processing module initiates the storage operation to store data.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A method for execution by a processing system of a storage network that includes a processor, the method comprises:

identifying, via the processing system, dispersed storage error encoding parameters associated with a data object to be written, wherein the dispersed error coding parameters include an information dispersal algorithm (IDA) width and a decode threshold number generated based on at least one of: interpreting a portion of a system registry information, receiving the IDA width and decode threshold number, determining the IDA width and the decode threshold number;

determining, via the processing system, a number of available storage units;

writing, based on the number of available storage units, the data object to one or more of the available storage units by:

when the number of available storage units is determined to exceed a first number:

determining, via the processing system, a write threshold number to be equal to a first write threshold number that is based on the number of available storage units exceeding the first number;

dispersed error encoding the data object to produce a first write threshold number of encoded data slices; and writing, to one or more of available storage units, the first write threshold number of encoded data slices;

when the number of available storage units is determined to not exceed the first number:

determining, via the processing system, the write threshold number to be equal to a second write threshold number that is based on the number of available storage units not exceeding the first number, wherein the second write threshold number is less than the first write threshold number;

dispersed error encoding the data object to produce a second write threshold number of encoded data slices; and writing, to one or more of the available storage units, the second write threshold number of encoded data slices.

2. The method of claim 1, wherein determining the number of available storage units includes initiating a query and interpreting a query response.

3. The method of claim 1, wherein determining the number of available storage units includes at least one of: performing a test, interpreting an error message, performing a lookup, or generating an estimate.

4. The method of claim 1, wherein the dispersed storage error encoding parameters includes a decode threshold number.

5. The method of claim 4, wherein the first write threshold number is greater than the decode threshold number and less than the number of available storage units.

6. The method of claim 4, wherein the first write threshold number is greater than the decode threshold number and equal to the number of available storage units.

7. The method of claim 4, wherein the second write threshold number is equal to the decode threshold number and equal to the number of available storage units.

8. The method of claim 4, wherein the second write threshold number is equal to the decode threshold number and less than the number of available storage units.

9. A processing system of a storage network comprises:

at least one processor;

a memory that stores operational instructions, that when executed by the at least one processor cause the processing system to perform operations including:

identifying, via the processing system, dispersed storage error encoding parameters associated with a data object to be written, wherein the dispersed error coding parameters include an information dispersal algorithm (IDA) width and a decode threshold number generated based on at least one of: interpreting a portion of a system registry information, receiving the IDA width and decode threshold number, determining the IDA width and the decode threshold number;

determining, via the processing system, a number of available storage units; writing, based on the number of available storage units, the data object to one or more of the available storage units by:

when the number of available storage units is determined to exceed a first number: determining, via the processing system, a write threshold number to be equal to a first write threshold number that is based on the number of available storage units exceeding the first number;

dispersed error encoding the data object to produce a first write threshold number of encoded data slices; and writing, to one or more of available storage units, the first write threshold number of encoded data slices;

when the number of available storage units is determined to not exceed the first number:

determining, via the processing system, the write threshold number to be equal to a second write threshold number that is based on the number of available storage units not exceeding the first number, wherein the second write threshold number is less than the first write threshold number;

dispersed error encoding the data object to produce a second write threshold number of encoded data slices; and writing, to one or more of the available storage units, the second write threshold number of encoded data slices.

10. The processing system of claim 9, wherein determining the number of available storage units includes initiating a query and interpreting a query response.

11. The processing system of claim 9, wherein determining the number of available storage units includes at least one of: performing a test, interpreting an error message, performing a lookup, or generating an estimate.

12. The processing system of claim 9, wherein the dispersed storage error encoding parameters includes a decode threshold number.

13. The processing system of claim 12, wherein the first write threshold number is greater than the decode threshold number and less than the number of available storage units.

14. The processing system of claim 12, wherein the first write threshold number is greater than the decode threshold number and equal to the number of available storage units.

15. The processing system of claim 12, wherein the second write threshold number is equal to the decode threshold number and equal to the number of available storage units.

16. The processing system of claim 12, wherein the second write threshold number is equal to the decode threshold number and less than the number of available storage units.

* * * * *